US008541716B2

(12) United States Patent
Gu et al.

(10) Patent No.: US 8,541,716 B2
(45) Date of Patent: Sep. 24, 2013

(54) HEATER CONTROL WITH HIGH-LIMIT THERMAL SAFETY SHUTDOWN

(75) Inventors: Youfan Gu, Superior, CO (US); Jeffrey D. Kiernan, Frederick, CO (US); Charles C. Lawhead, Boulder, CO (US); William C. Bohlinger, Buffalo City, WI (US); Eric E. Ellis, Columbia, MO (US); Curtis A. Foster, Columbia, MO (US); James P. Hentges, Fountain City, WI (US); Mark Louis-Gilmer Hoven, Winona, WI (US); James H. Kreisel, Winona, WI (US); Shawn Leininger, Columbia, MO (US); Robert O. Moran, Conway, AR (US); Kurt W. Peterson, La Crosse, WI (US); Jason R. Powell, Columbia, MO (US); Dale T. Wolfe, Trempealeau, WI (US)

(73) Assignees: MKS Instruments, Inc, Andover, MA (US); Watlow Electronic Manufacturing Company, St. Louis, MO (US)

( * ) Notice: Subject to any disclaimer, the term of this patent is extended or adjusted under 35 U.S.C. 154(b) by 218 days.

(21) Appl. No.: 13/048,824

(22) Filed: Mar. 15, 2011

(65) Prior Publication Data

US 2012/0061369 A1 Mar. 15, 2012

Related U.S. Application Data

(62) Division of application No. 11/278,800, filed on Apr. 5, 2006, now Pat. No. 7,932,480.

(51) Int. Cl.
*H05B 1/02* (2006.01)
(52) U.S. Cl.
USPC ........... 219/482; 219/481; 219/494; 219/497; 219/508; 374/120

(58) Field of Classification Search
CPC ........................................................ H05B 1/02
USPC ................ 219/492, 497, 501, 505, 494, 481, 219/509, 510; 374/101, 120
See application file for complete search history.

(56) References Cited

U.S. PATENT DOCUMENTS 3,675,046 A 7/1972 Harkenrider et al.
3,679,871 A 7/1972 Evalds (Continued)

FOREIGN PATENT DOCUMENTS

DE 4416798 11/1995
EP 0762257 3/1997
EP 1869535 B1 12/2007

OTHER PUBLICATIONS

Non-Final Office Action mailed May 21, 2010, in U.S. Appl. No. 11/278,800, filed Apr. 5, 2006.

(Continued)

*Primary Examiner* — Mark Paschall
(74) *Attorney, Agent, or Firm* — James R. Young; Cochran Freund & Young LLC

(57) ABSTRACT

A multiple heater control system includes cables, connectors, and junction boxes for user-friendly daisy chain connections of heater controllers and heaters in various configurations or combinations of individually controlled heater series and/or master and slave heater series. The heater controllers include process control of AC power to the heaters and upper-limit safety shutoff that is substantially independent from the process control. The heater controllers also have variable levels of control, adjustment, display, and communications functionality in a base module that is expandable to various levels with expansion modules that are attachable to and detachable from the base module. Connector, cable, and junction configurations, adapters, and latch features enhance user friendliness.

26 Claims, 33 Drawing Sheets

(56) References Cited

U.S. PATENT DOCUMENTS

| | | | |
|---|---|---|---|
| 3,689,886 | A | 9/1972 | Durkee |
| 3,752,956 | A | 8/1973 | Cahill et al. |
| 3,789,190 | A | 1/1974 | Orosy et al. |
| 3,796,977 | A | 3/1974 | Elliott et al. |
| 3,869,597 | A | 3/1975 | Strange |
| 4,086,466 | A | 4/1978 | Scharlack |
| 4,177,375 | A | 12/1979 | Meixner |
| 4,184,139 | A | 1/1980 | Hara |
| 4,186,366 | A | 1/1980 | Mc Vey |
| 4,189,697 | A | 2/1980 | Hara |
| 4,189,698 | A | 2/1980 | Hara |
| 4,198,617 | A | 4/1980 | Hara |
| 4,210,893 | A | 7/1980 | Hara |
| 4,227,169 | A | 10/1980 | Mc Vey et al. |
| 4,237,369 | A | 12/1980 | Jones |
| 4,259,656 | A | 3/1981 | Smith |
| 4,268,813 | A | 5/1981 | Burch |
| 4,268,818 | A | 5/1981 | Davis et al. |
| 4,272,466 | A | 6/1981 | Harris |
| 4,281,307 | A | 7/1981 | Hara |
| 4,286,248 | A | 8/1981 | Hara |
| 4,290,056 | A | 9/1981 | Chow |
| 4,329,569 | A | 5/1982 | Hjortsberg et al. |
| 4,400,688 | A | 8/1983 | Johnston et al. |
| 4,418,333 | A | 11/1983 | Schwarzbach et al. |
| 4,446,462 | A | 5/1984 | Ouellette et al. |
| 4,474,825 | A | 10/1984 | Schmidt |
| 4,491,723 | A | 1/1985 | Cole |
| 4,506,146 | A | 3/1985 | Rice et al. |
| 4,507,546 | A | 3/1985 | Fortune et al. |
| 4,517,144 | A | 5/1985 | Harland et al. |
| 4,527,144 | A | 7/1985 | Arikawa |
| 4,540,875 | A | 9/1985 | Buttolph |
| 4,990,987 | A | 2/1991 | Boucher et al. |
| 5,304,974 | A | 4/1994 | Denton |
| 5,632,919 | A | 5/1997 | MacCracken et al. |
| 5,658,480 | A | 8/1997 | Tennant et al. |
| 5,714,738 | A | 2/1998 | Hauschulz et al. |
| 5,900,179 | A | 5/1999 | Bilenko et al. |
| 6,002,114 | A | 12/1999 | Lee |
| 6,080,971 | A | 6/2000 | Seitz et al. |
| 6,590,188 | B2 * | 7/2003 | Cline et al. ............ 219/497 |
| 6,894,254 | B2 | 5/2005 | Hauschulz |
| 6,943,325 | B2 | 9/2005 | Pittman |
| 7,286,752 | B2 * | 10/2007 | Gourand ............ 392/479 |
| 2002/0008101 | A1 | 1/2002 | Hauschulz |

OTHER PUBLICATIONS

International Search Report mailed Mar. 25, 2008, in PCT Application No. PCT/US07/66078, International filing date Apr. 5, 2007.

\* cited by examiner

HEATER CONTROL WITH HIGH-LIMIT THERMAL SAFETY SHUTDOWN

BACKGROUND OF THE INVENTION

1. Field of the Invention

The present invention is related to power and control systems for heaters, for example, to apparatus and methods for powering and controlling multiple heaters used for heating pipes and other components in vacuum, process, delivery, transport, and other systems, developed by HPS Division of MKS Instruments, Inc., and Watlow Electric Manufacturing Company, parties to a joint research agreement (35 U.S.C. 103I(2)C)).

2. State of the Prior Art

Many vacuum, process, delivery, transport, and other systems used in industry for conducting or moving various gaseous, liquid, or solid materials from one point to another include pipes of various lengths, sizes, and shapes that have to be heated to maintain the pipes and/or materials in the pipes within certain temperature ranges. Pipe heaters for heating pipes for these and other purposes are well known to persons skilled in the art and have ranged from simple resistive wires and tape wrapped around the pipes to more sophisticated, insulated pipe heaters, such as those described in U.S. Pat. No. 5,714,738 (Hauschultz et al.), which is incorporated herein by reference, as well as many such heater products that are available commercially.

Along with the development of pipe heaters for various pipe heating applications, there was also a need for better pipe heater control systems for regulating heat output from the heaters along lengths of pipe and for monitoring and controlling such heater operations. There are many kinds and configurations of such heater control systems, such as the ones described in U.S. Pat. No. 6,894,254 (Hauschultz), which is also incorporated herein by reference. As good as such heater monitoring and control systems are, however, there are still problems that they have not solved.

For example, in higher temperature installations, the heat produced by the pipe heaters can be conducted to heat controller components that are mounted directly on the pipe heaters, thereby potentially raising the temperatures of such controller components to levels that can damage or destroy them or that can corrupt or degrade data in logic circuits or memories in the controller systems. Some power control systems are hard wired to heater components of the systems making it difficult to quickly replace them. Also, most industrial pipe heaters are equipped with thermal high limit fuses or thermal activated switches that cut the power to pipe heaters if the temperature reaches a maximum temperature threshold, regardless of the cause, for the safety of personnel, to prevent damage to capital equipment, and for safety agency certification. This function has been provided with a variety of thermal limit devices, none of which are entirely satisfactory for this application.

For example, standard, commercially available thermal switches are inaccurate and unreliable due to their wide set point tolerances and contact mechanisms, which can erode or, even worse, self-weld to a closed position that renders them totally inoperative and can allow a thermal runaway of the heater until either the heater element burns out or starts a fire. These problems are exacerbated when the thermal switches are placed in or on the heaters where they need to be for accurate response to the actual temperature of the heater and pipes, because the high heat at the heater is a major cause for such degradation of the thermal switches. Yet, the thermal switches cannot be placed off or away from the heaters, because they would not be able to respond to actual temperatures of the heaters or pipes.

Thermal fuses are more dependable and available commercially, but once they expire, i.e., "blow" or "burn out", they cannot be reset. Since thermal fuses are typically embedded in the pipe heater structure near the heating element to be sure they are exposed to the heat near its source, they are not accessible without destructive mutilation of the heater components and materials. Therefore, a blown or burned out thermal fuse renders the heater completely useless so it has to be replaced. Also, thermal fuses age over time, and the higher the temperatures to which they are exposed, the faster they age. Such aging often causes thermal fuses to burn out at lower temperatures and eventually to burn out within the normal operating range of the pipe heaters, thus rendering the otherwise good pipe heaters unusable. Also, commercially available thermal fuses are bulky and difficult to install in pipe heaters.

There are sometimes circumstances that cause the temperatures of pipes, thus of the pipe heaters, to exceed such upper temperature limits that have nothing to do with a runaway or uncontrollable heater. For example, it is not uncommon to purge or clean process chambers upstream from the pipe systems by sending high temperature gases or reactive chemicals through them, which can cause the pipe temperature, thus also the pipe heater temperature, to temporarily exceed the upper temperature limit and thereby cause the thermal fuse to expire and open the power circuit to disable the heater. When the thermal fuse expires and cannot be reset or replaced, good heaters are ruined by such routine maintenance and other occurrences unrelated to the pipe heaters themselves.

Also, there is a need for more options and versatility in both connection and control configurations to accommodate a wider variety of piping configurations, applications, and user requirements. Each pipe installation is different and many operators need custom pipe heater and control systems to accommodate their particular requirements, but designing and manufacturing custom pipe heater systems is expensive, time consuming, and often not feasible for most applications. For example, some operators want a control mechanism for each heater in a heated pipe system, whereas other operators prefer to avoid the cost of individual controls on each heater and instead use a strategy wherein a single controller is used to operate an entire zone comprising a number of individual heaters. Such "zoning" or "single point" control heater systems often require complex wiring, which can create confusion and increases the probability of wiring errors, or it can require custom heaters to be designed and built to accommodate slaving and prevent wiring error, which adds costs and complexity to the system.

Another example is that some operators require remote communications with heater controllers and remote heater system control capabilities so that they can view operating status information and modify operating parameters from a remote location, whereas others want to be able to view such operating status information and to modify operating parameters locally at each heater within a system. Still others require only basic, pre-programmed control at each heater. Of course, there are also operators who want any combination or all of these functions for a group of heaters with only single point control.

These and other requirements in industrial and commercial use of pipe heaters creates a need for a more flexible system of pipe heater controls and wiring components that can be configured easily, neatly, and effectively to meet a wider variety of operator requirements.

BRIEF DESCRIPTION OF THE EXAMPLE DRAWINGS

The accompanying drawings, which are incorporated in and form a part of the specification, illustrate several example embodiments and/or components that are presented to support the description, but not to limit the scope of the claims in any way. In the drawings:

DETAILED DESCRIPTION OF THE EXAMPLE EMBODIMENTS

Figure 1:
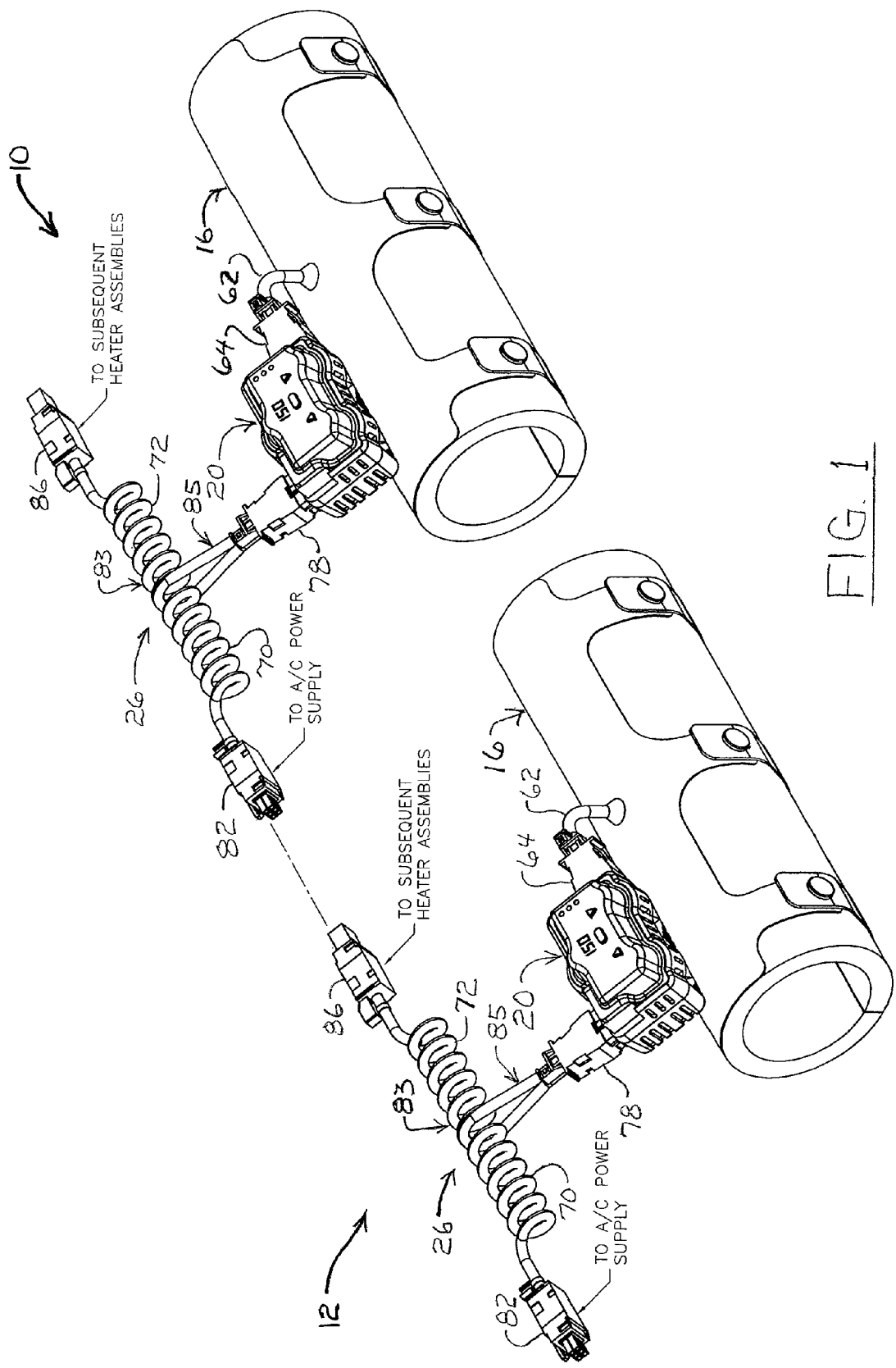
FIG. 1 is an isometric view of an example individual heater control arrangement of the multiple heater control system.
Figure 2:
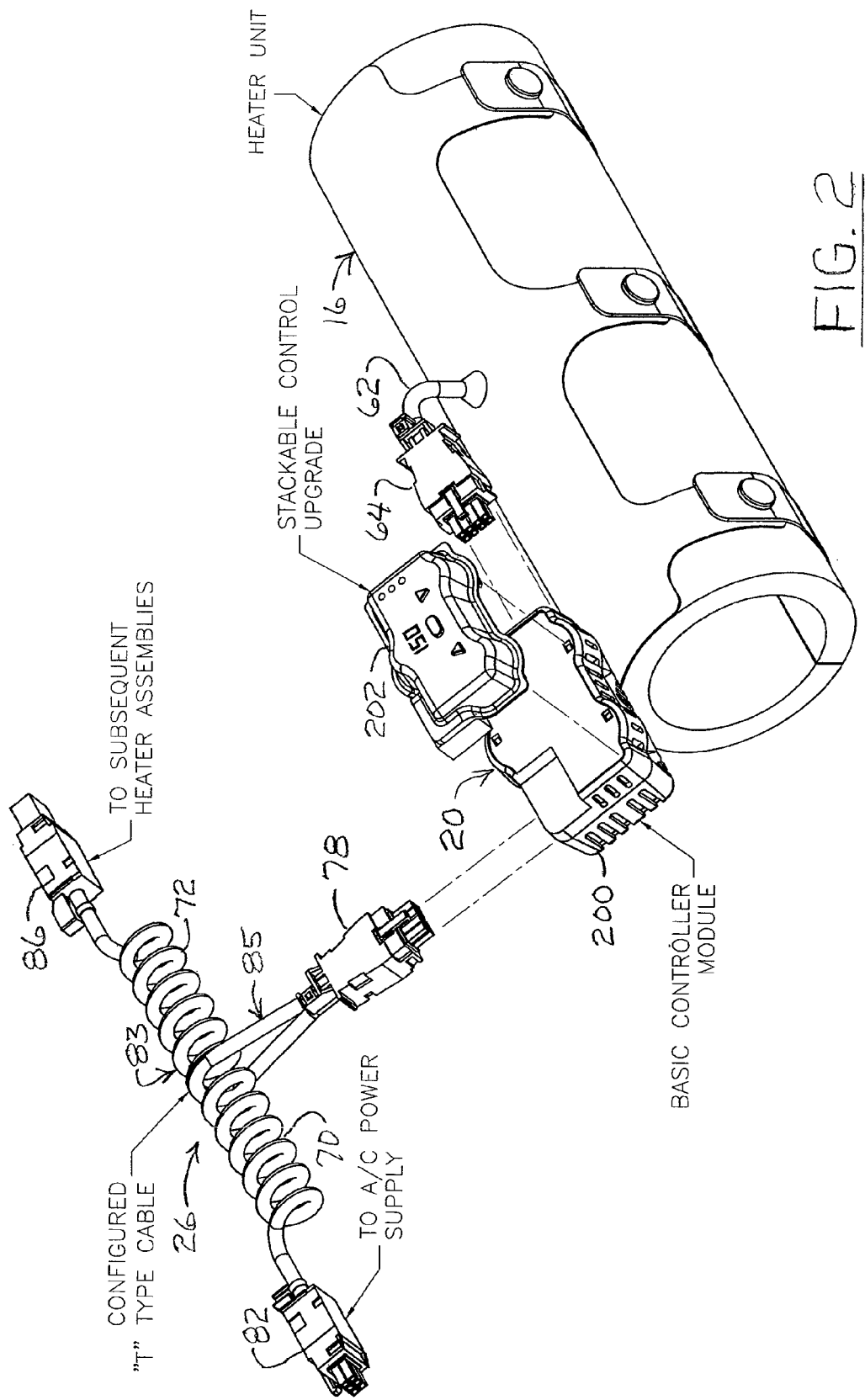
FIG. 2 is an isometric view of some of the principal components utilized in an individual heater control arrangement such as that illustrated in FIG. 1.
Figure 3:
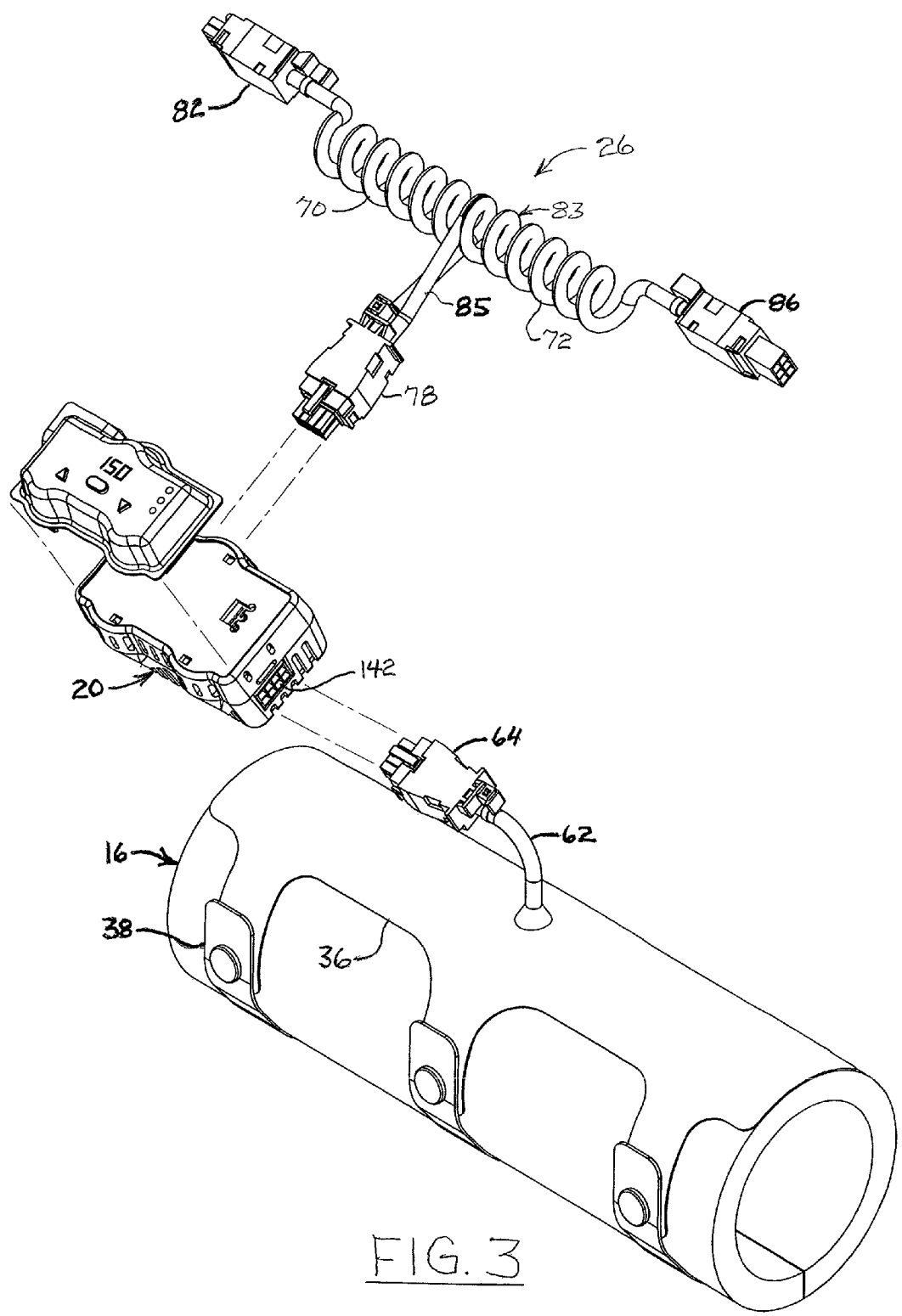
FIG. 3 is an isometric view of the principal components in FIG. 2, but from a different perspective to illustrate the connective components.
Figure 5:
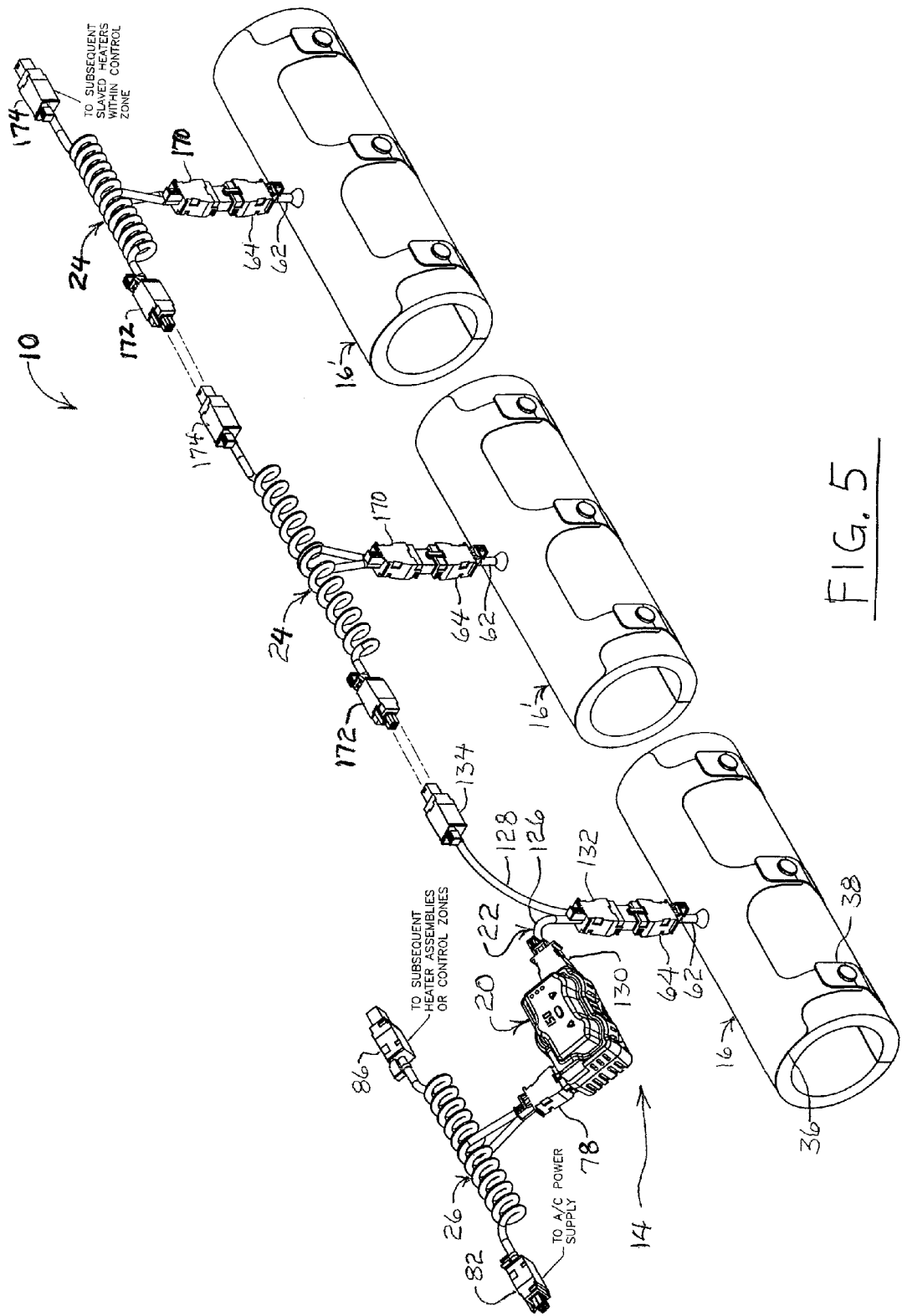
FIG. 5 is an isometric view of an example arrangement of the multiple heater control system in which a single point heater control is used for controlling a gang or zone comprising a master heater and one or more slave heaters.
Figure 6:
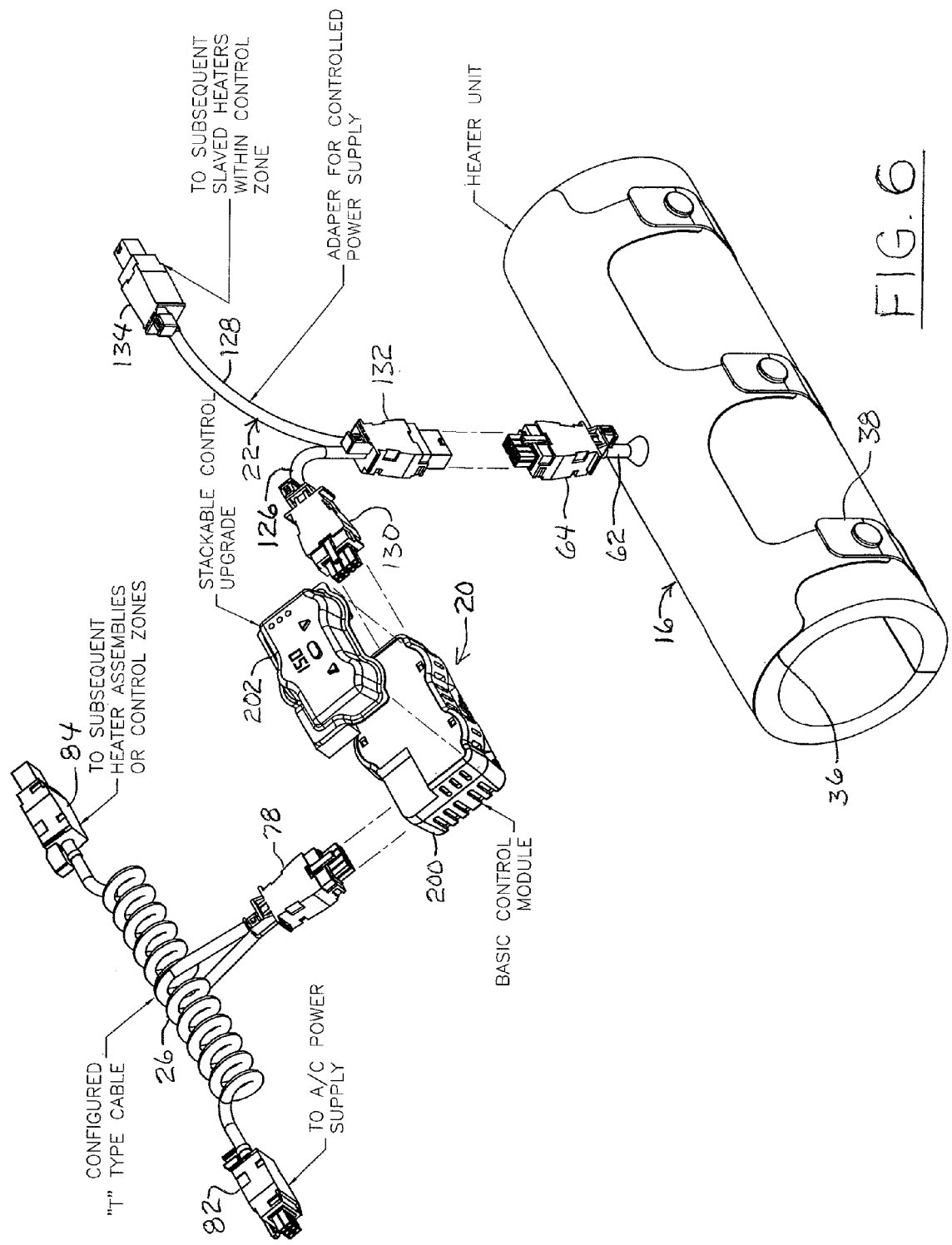
FIG. 6 is an isometric view of some of the principal components utilized in a single point control arrangement for a master and slave heater combination such as that illustrated in FIG. 5.
Figure 7:
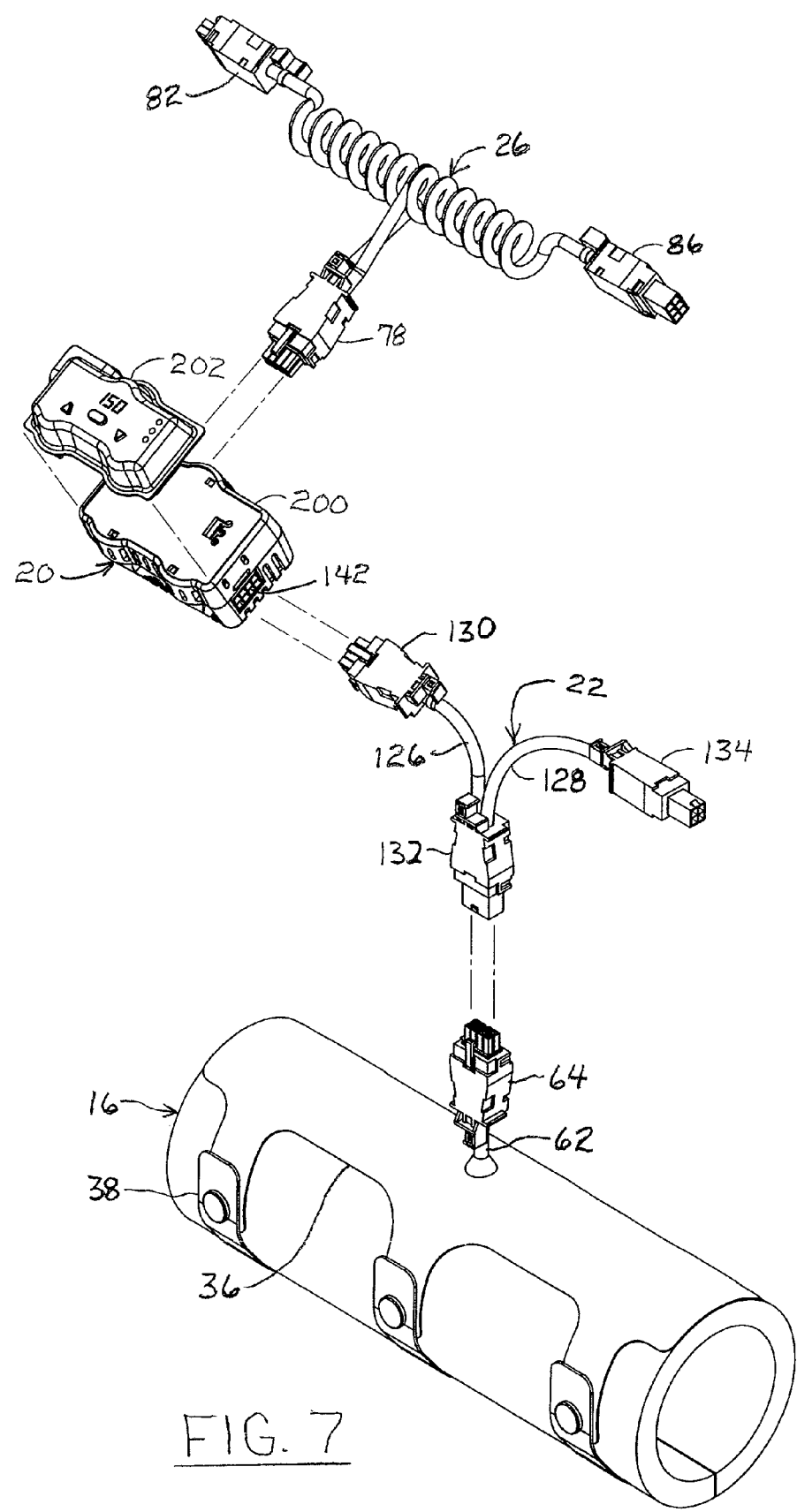
FIG. 7 is an isometric view of the principal components in FIG. 6, but from a different perspective to illustrate the connective components.

The multiple heater control system 10 illustrated generally in FIGS. 1 and 5 is based on flexible and expandable modularity facilitated by the example components so that various components and combinations of components of the system can be assembled and connected in a variety of ways to serve a variety of heater monitoring and control configuration needs. The system 10 is best described in relation to two basic configurations—an individual local heater control configuration 12 illustrated, for example, in FIG. 1, and a single point control arrangement for multiple heaters in a zone or gang configuration 14 illustrated for example in FIG. 5. Other combinations and variations of these basic heater control system configurations 12, 14 can be created by using selected ones or all of the principal components of the system 10, as will become apparent to persons skilled in the art as the description of these example embodiments and components continues.

The multiple heater control system 10 is designed primarily for pipe heaters 16, as illustrated in FIGS. 1 and 5, although it can be used for other kinds of heaters as well. Therefore, for convenience, this description will proceed in the context of multiple pipe heaters 16 with the understanding that it can apply to other kinds of heaters as well.

Referring primarily to FIG. 1 for the individual local heater control configuration 12, a plurality of the pipe heaters 16 is shown. They are typically arranged and aligned for mounting on a pipe (not shown in FIGS. 1-4, but illustrated in FIG. 9), as will be described in more detail below. In this embodiment, there is a separate controller 20 for each heater 16. Therefore, as illustrated in FIGS. 1-4, each controller 20 is connected directly to each heater 16 in a manner that delivers and controls high voltage AC line (source) power to the heater element 32 (FIG. 9) in the heater 16 as well as derives temperature information from the temperature sensors 50, 52 (FIG. 9) in the respective heater 16 to which the controller 20 is connected. Therefore, each controller 20 responds to the temperature sensors 50, 52 in the individual heater 16 to which it is connected and turns the high voltage power on and off to that heater 16 according to settings in the controller 20, as will be described in more detail below. Therefore, the high voltage AC power delivered to the heaters 16 by the controllers 20 is sometimes referred to herein as "controlled AC power," whereas the high voltage AC power that is received by the controller from an AC power source, which is sometimes referred to herein as "source AC power" or "AC source power" or just "source power". The term "high voltage" in this context means anything above thirty (30) volts. For example, typical heaters are often powered by ordinary 110-120 volts, 220-240 volts, 440-480 volts, or any other voltage that provides enough power to meet the heat production requirements of a particular installation. AC means alternating current, which can be 50 hertz, 60 hertz, or any other alternating current frequency that is used to power heating elements in heaters.

Figure 4:
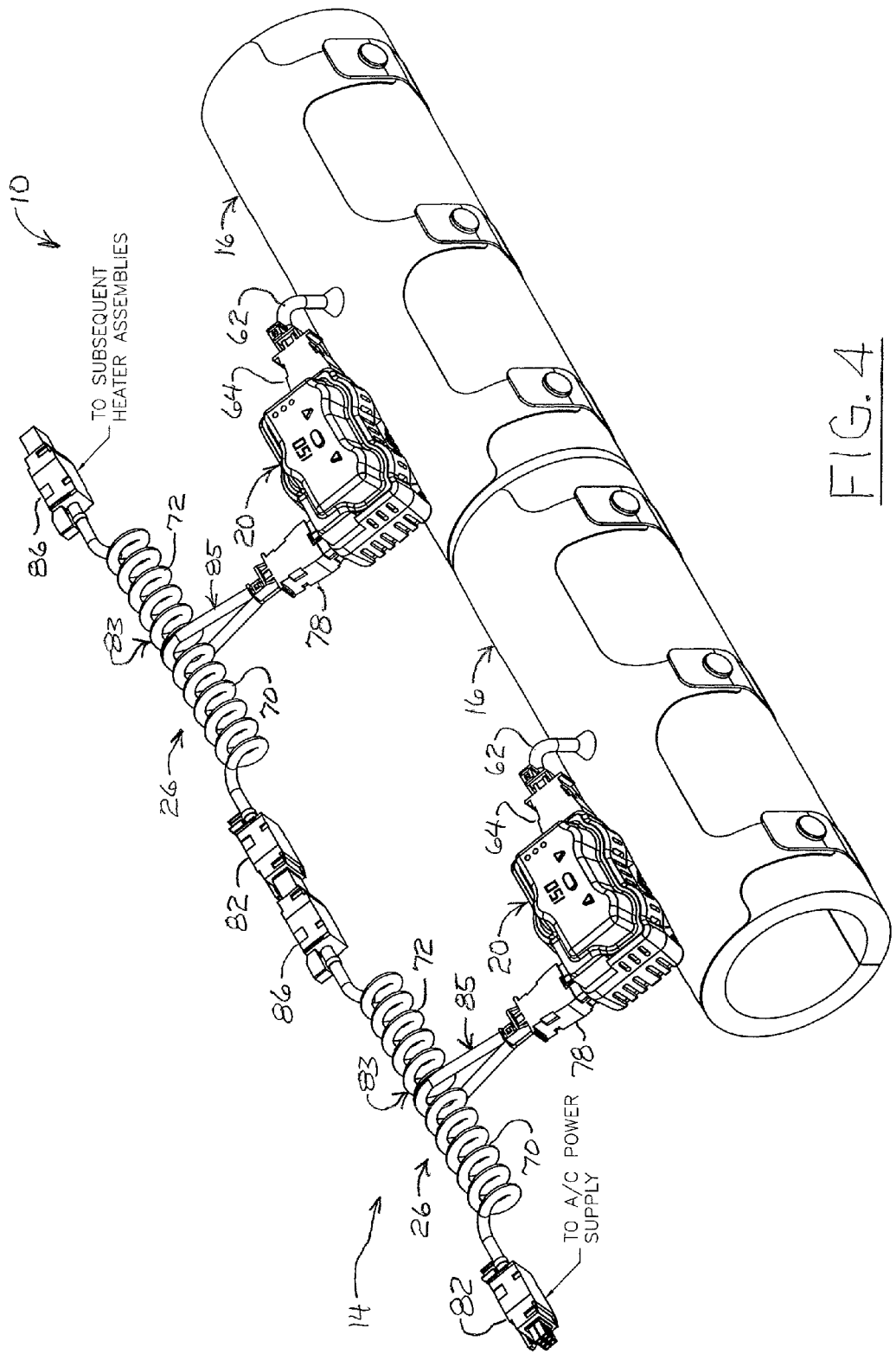
FIG. 4 is an isometric view of the individual heater control arrangement in FIG. 1 in its assembled condition.

The plurality of controllers 20 in the individual local heater control configuration 12 are daisy chain connected to the high voltage AC power source 13 (FIG. 27), which can be associated with remote monitor and/or control equipment 15 (FIG. 27) by the T-type source power/signal cables 26, which contain both high voltage power lines for carrying source AC power to the controllers 20 and low voltage signal lines, which comprise a low voltage temperature range alert signal that can be used for any purpose and will be described in more detail below. The term "low voltage" in this description generally means any voltage that does not exceed 30 volts. Also, as indicated in FIGS. 1 and 4, any number of additional heater 16 and controller 20 assemblies can be daisy chain connected together by additional T-type source power/signal cables 26 and with a linear-type power/signal cable 108 (FIG. 27) (not shown in FIGS. 1-4 but described below) connected to the last controller 20 in the daisy chain.

Also, any combination of individually controlled heaters 16 and slave heaters 16' can be accommodated. For example, as indicated in FIGS. 5-8, additional individually controlled heaters 16 and/or additional single point control zones of slave heaters 16' can be connected to the T-type source power cable 26.

For more detailed descriptions of example embodiments and implementations, it is helpful to refer to the heater elements and to temperature sensors in example heaters, not for limitation, but to aid in understanding. In general, there are many varieties, materials, and structures of heaters that can be controlled by these systems. Therefore, this invention is not limited to any particular heater or heater structure. However, to facilitate the description, an example pipe heater 30 mounted on a pipe P is shown in cross-section in FIG. 9. This pipe heater 16 has many similarities to those described in U.S. Pat. Nos. 5,714,738 and 6,894,254, both of which are incorporated herein by reference, but there are several different or additional features that will also be described below.

Figure 9:
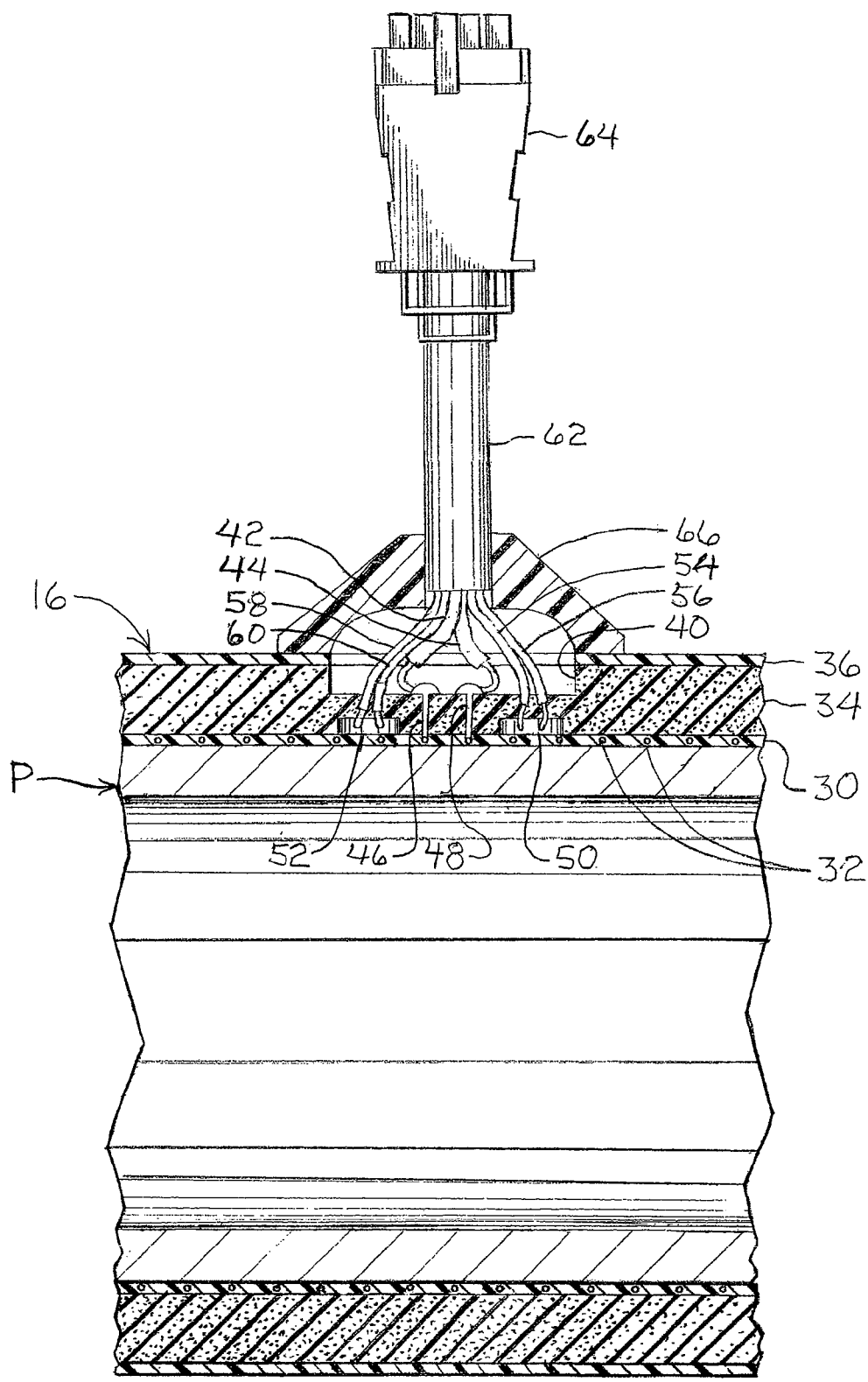
FIG. 9 is a cross-section view of a pipe heater mounted on a pipe for use with either the individual heater control arrangement or the single point control a master and slave heater arrangement of the multiple heater control system.

In brief, the example pipe heater 16 in FIG. 9 comprises a high density silicon rubber heater mat 30 with a heating element 32 comprising resistive wires or other resistive, heat producing material embedded in it. The heating element 32 creates heat when an electric current flows through it, usually at standard, high voltage levels, such as 110-120 volts, 220-

240 volts, or any other voltage level that provides enough power to create the heat needed for a particular application. The heater mat 30 is surrounded by a thermally insulating heater jacket 34 comprised of low density, closed cell silicon rubber foam or any other suitable insulating material. A fastening halter 36 with straps 38 (FIGS. 1-8) can be provided to secure the heater 16 in place on the pipe P or on other components that are to be heated.

The heater 16 has a cavity 40 where high voltage power lines 42, 44 are connected to leads 46, 48 from the heating element 32. Two temperature sensors 50, 52, such as thermocouples, thermistors, or any other suitable temperature sensing devices, are embedded in the foam insulating jacket 34 adjacent the heater mat 30 so that they can detect temperatures at or near the heater mat 30. Signals from one of the temperature sensors, e.g., temperature sensor 52, is used by the controller 20 for normal operational or process heater control functionality, and signals from the other temperature sensor, e.g., temperature sensor 50, is used by the controller 20 for upper temperature limit control, as will be described in more detail below. One temperature sensor could be used for both of those functions, but it is better to provide the redundancy of two temperature sensors, especially for the high temperature limit function, which has to shut down the heater if the process temperature sensor and/or the process control circuit in the controller fails and causes a runaway heater situation. Some safety certifying agencies require such redundancy for safety certification.

The low voltage wires 54, 56 for the first ("high-limit") temperature sensor 50 and 58, 60 for the second ("process") temperature sensor 52 are routed through the cavity 40 and through a flexible cord 62 to a cable connector 64, for example, a Molex™ connector. A boot 66 anchors the flexible cord 62 to the pipe heater 16 and covers the cavity 40. The heater cord 62 can be any desired length. In some embodiments, the cord 62 is long enough to place the controller 20 (FIGS. 1-8) and connector 64 far enough away from the heater 16 to avoid heat damage to the controller 20, especially in high temperature applications. Of course, as shown in FIGS. 1-8, the controllers 20 are connected to the pipe heater 16 through the connector 64, either directly as illustrated in FIGS. 1-4 for the individual heater control configuration 14 or via a slave adapter 22 and slave heater cables 24 (FIG. 5) and 184 (FIG. 18), as will be described in more detail below.

Figure 27:
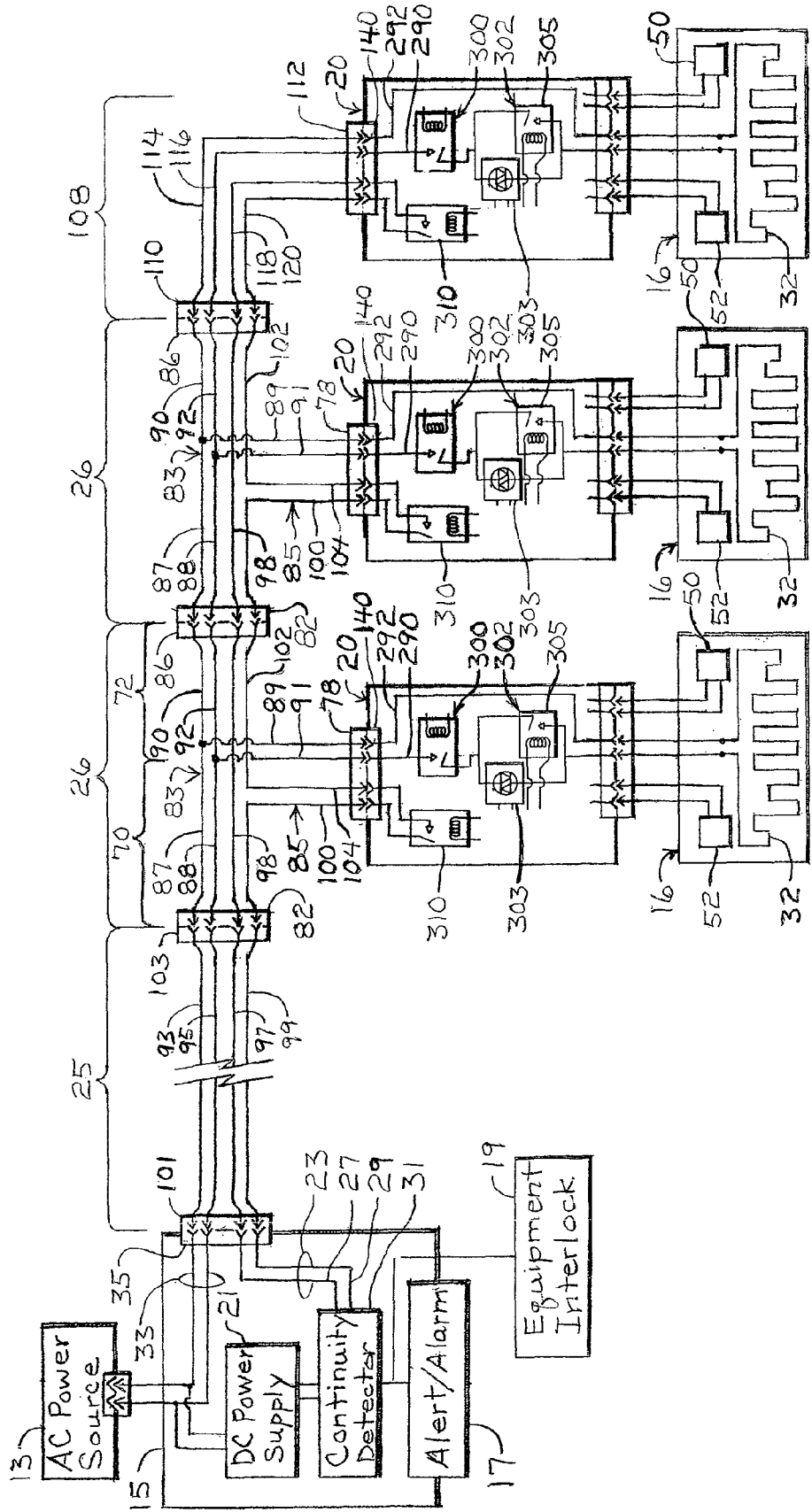
FIG. 27 is a schematic circuit diagram of an example multiple individual heater control configuration connected to an AC power source and to an alert/alarm signal circuit located, for example, at a remote monitoring station.

Before proceeding further with structural details of individual component parts of the multiple heater control system, reference is made now to FIG. 27, which, in conjunction with FIGS. 1 and 9, provides an overview of some of the electrical components and functions of the system and is helpful for an understanding of other components and features that will be described below. Therefore, as shown in FIG. 27 with secondary reference to FIGS. 1 and 9, a plurality of controllers 20 can be connected individually to respective heaters 16 primarily, but not exclusively, for providing controlled AC power to the heaters 16 in order to maintain the heaters 16 operating within certain desired temperature ranges.

A daisy chain connected series of cable sections 25, 26, 108 that connect together in daisy chain fashion to form a source power trunk line that delivers AC source power to the controllers 20. The controllers 20 then switch the AC power on and off to deliver the controlled AC power to the heaters 16, as necessary for the heaters 16 to produce the heat needed for maintaining the desired temperatures. The controllers 20 turn the AC power on and off with a process power switch arrangement 302, which can be a solid state switch, such as a triac 303, in parallel with a mechanical relay 305 to minimize arcing and heat production, or any other controllable switch to produce the controlled AC power. It is also possible to use a variable power controller, such as a variac transformer (not shown), for adjusting the controlled AC power up and down, but they are much larger, bulkier, and more expensive than switch devices. Control of the process power switch arrangement 302 using temperature signal feedback from the second (process) temperature sensor 52 in the heater 16 is described in more detail below.

A high temperature limit switch (also called a high-limit switch) 300 is also provided for shutting off the AC power to the heater 16 in the event the temperature of the heater 16 rises to an unsafe level as sensed by the first (high-limit) temperature sensor 50. Such an unsafe temperature level could be due to a malfunction of the process power switch 302, the process temperature sensor 52, or the process control circuit 296 (FIG. 28), or it could be due to some external cause, such as a high temperature purge or cleaning cycle in the pipe, or any other cause. Control of the high-limit switch 300 using temperature feedback or input from the temperature sensor 50, including a latching function to keep the AC power turned off once it has been turned off pending an operator intervention, is described in more detail below.

An alert/alarm function is also provided, which signals an alert/alarm at the remote monitor station 15 when any one of the controllers 20 in the daisy chain connected series detects that the heater 16 which it controls is at a temperature above or below a desired or needed operating temperature range. For example, if it is necessary to keep the pipe P (FIG. 9) within a certain temperature range for a chemical process, transport, or other activity to proceed, this alert/alarm function 17 can notify an operator at the remote monitor station 15 if any one of the controllers 20 detects a heater 16 temperature outside of that temperature range, and/or it can produce a signal to an equipment interlock 19 to prevent operation of, or shut down of, equipment until the heaters 16 are all producing temperatures in the desired range, as will be understood by persons skilled in the art. The depiction of the monitor station 15 in FIG. 27 as a defined block is only schematic. The various components and functions, e.g., DC power supply 21, continuity detector 31, signal circuit 23, and alert/alarm 17, can be in one location or in divers locations, so the use of the term "remote monitor station" in this description is for convenience only and does not limit the components or functions described or depicted to being together at one location or in any unitary configuration or assemblage.

To implement this alert/alarm function (also sometimes called the temperature range signal), a low voltage DC power supply 21 at the remote monitoring station 15 provides a low voltage DC potential on a signal circuit 23 comprising a pair of conductors 27, 29 that runs via the daisy chain cable sections 25, 26, 108 to all of the controllers 26. Low voltage is generally considered to not exceed 30 volts, which is how the term is used herein. Therefore high voltage is anything above 30 volts. One of the conductors, e.g., conductor 29, extends through each controller 20, where it is connected in series to opposite terminals of a relay switch 310. Therefore, any of the series connected relay switches 310 in any of the controllers 20 can open the circuit 23, i.e., prevent current from flowing in the signal circuit 23. Conversely, all of the relay switches 310 in all of the controllers 20 have to be closed in order for the signal circuit 23 to be closed. The term "relay switch" as used herein can mean any switch, mechanical or solid state, in which a control signal input can be applied to open and/or close the switch, i.e., to block and/or allow current flow through the switch.

A continuity detector 31 associated with the remote monitoring station 15 detects whether the signal circuit 23 is opened or closed. Upon detection that the signal circuit is open, which can be caused by any of the relay switches 310 being opened or by any disconnect or break in the daisy chain cables 25, 26, 108, the continuity detector 31 generates a signal to the alert/alarm 17 and/or to an equipment interlock 19, or to any other device or function desired by the operator. In other words, the signal from the continuity detector 31 can be used to initiate an alert or alarm, or it can be used to stop equipment in any use, as will be apparent to persons skilled in the art upon reading this description. A variety of continuity detectors that can perform this function, e.g., current detector circuits, voltage detector circuits, and the like, are readily available and well known to persons skilled in the art or can easily be constructed by persons skilled in the art, so no further description is required for an understanding of this feature. For convenience, but not for limitation, the signal circuit 23 is sometimes called the "alert/alarm signal circuit" or "temperature range signal circuit", even though the signal can also be used for equipment interlock and other purposes.

The relay switch 310 in each controller 20 is controlled to open and close by a process control circuit 296 (FIG. 28) in the controller 20, which uses temperature information from the process temperature sensor 52 to determine if the sensed temperature at the heater 16 connected to that controller 20 is within the desired operating range. If not, it outputs a signal to open the relay switch 310, which opens the signal circuit 23. The open signal circuit 23 is detected by the continuity detector 31, which generates the alert/alarm signal. The relay switch 310 can be a mechanical relay or a solid state relay, as is well known to persons skilled in the art.

The daisy chain connection components for connecting the controllers 20 electrically to the AC power source 13 and to the temperature alert/alarm circuit 23 at the remote monitoring station includes at least one T-type source power/signal cable section 26 ("T-type source power/signal cable" or "T-type source power cable" or just "T-type source cable" for short) and at least one linear-type terminating linear source power/signal cable section 108 ("linear-type power/signal terminating cable" or "linear-type terminating source power cable" or just "terminating source cable" for short) as shown in FIGS. 1-4 and 27. The T-type source cables 26 are used to connect the first and intermediate controllers 20 in the daisy chain connected series to the AC power source 13 and to the alert/alarm signal circuit 23. The terminating source cable 108 is used to connect the last controller 20 in the daisy chain connected series to the AC power source 13 and to the alert/alarm signal circuit 23 via the T-type source cable(s) 26, as shown in FIGS. 1-4 and 27. The first T-type source cable 26 can be connected directly to the monitor station 156 if it is close enough, or, as shown in FIG. 27, an optional linear-type source power/signal extension cable ("source power/signal extension cable" or just "source extension cable" for short) 25 of any necessary length, can be used to connect the first T-type source cable 26 to the monitor station 15, as indicated schematically in FIG. 27.

To implement the functions of providing AC source power to the series of daisy chain connected controllers 20 and routing the alert/alarm signal circuit 23 through the relay switches 310 in each of the controllers 20, as described above, the T-type source cables and the linear-type source cable 108 (and optional source extension cable 25, if needed) are constructed and configured not only to perform those electrical functions, but also to provide a neat, tidy appearance. The structure and configuration also makes it almost foolproof to connect the AC power source and alert/alarm signal circuit 23 with as many controllers 20 as desired. As shown in FIG. 27, each terminating source cable 108 is fairly straight forward in that one pair of high voltage wires 114, 116 ("AC power wires" or just "power wires" for short) and one pair of low voltage wires 118, 120 ("signal wires" for short) extend all the way straight through the terminating source cable 108 from the inlet connector 110 to the outlet connector 112.

Any type of connector that can connect four wires from one cable to four wires of another cable can be used. Molex™ connectors work well because they are available in configurations that accommodate four, six, or more high voltage and low voltage wire pairs in a manner that mates with corresponding connectors on other components in only one orientation so that they cannot be improperly connected. Also, both the male and female pins are sheathed so it is difficult to accidentally short them. In this description, for convenience and not for limitation, the term "inlet" is used to designate the connector or cable end that receives AC source power and the term "outlet" is used to designate the connector or cable end that delivers AC source power, regardless of whether those connectors or cable ends also receive and/or deliver low voltage signals.

For the linear-type terminating source cable 108, the inlet connector 110 has at least two power pins for the AC source power wires 114, 116 and at least two signal circuit pins for the signal circuit wires 118, 120 and is configured to mate with a trunk outlet connector 86 on the T-type source cable 26. The outlet connector 35 at the remote monitoring station 15, which delivers source power to the daisy chain components 25, 26, 108 and connects the signal circuit 23 to those components, is also configured the same as the trunk outlet connector 86 on the T-type source cable 26. Therefore, the inlet connector 110 of the terminating source cable 108 could be plugged directly into the monitoring station outlet connector 35 in situations where there is only one controller 20 in a heater system.

As will be discussed in more detail below, the terminating source cable 108 has to be used to connect the last controller 20 in a daisy chain connected series or the only controller 20, if there is only one, to the remote monitoring station 15 so that the signal circuit 23 can be closed. A daisy chain terminated with a T-type source cable 26 would leave the signal circuit 23 open, regardless of whether all of the relay switches 310 in all of the controllers 20 are closed, which would render signal circuit 23 inoperative for its intended purpose as described above.

The outlet connector 112 of the terminating source cable 108 also needs at least two power pins for the source power wires 114, 116 and at least two pins for the signal circuit wires 118, 120, and it is configured to mate with the inlet connector 140 of the controller 20. The inlet connector 140 of the controller 20 has a different configuration than the inlet connectors 82, 110 of the T-type source cables 26 and terminating source connectors 108, respectively, so the outlet connector 112 of the terminating source cable 108 also has to be different than the trunk outlet connectors 86 of the T-type source cables and different than the outlet connector 35 at the remote monitoring station 15. This different configuration for the inlet connectors 140 of the controllers 20 is provided for the purpose of orderly use of one AC source power cable section per controller, which is easy for users. Of course, the inlet connector 140 of the controller 20 could have the same configuration as the inlet connectors 82, 110, if desired.

The T-type source cables 26 are used for connecting the first and any intermediate controllers 20 to the source power circuit 33 and the signal circuit 23 at the remote monitoring station 15, as mentioned above. Each T-type source cable 26 has a trunk section 83 extending between the inlet connector 82 and the trunk outlet connector 86 and a branch section 85 extending from the trunk section 83 to the branch outlet connector 78. As best seen in FIG. 27, with secondary reference to FIG. 1, the trunk power wires, comprised of power wires 87, 88 of the inlet trunk segment 70 and the power wires 90, 92 of the outlet trunk segment 72 extend uninterrupted between the trunk inlet connector 82 and the trunk outlet connector 86. The branch power wires 89, 91 are connected electrically in parallel to the trunk power wires 87, 88 and to the branch connector 78 so that, when the controller 20 is connected to the branch section 85, the power circuit comprising the power conductors 290, 292 in the controller 20 are in parallel electrically with the trunk power wires 87, 88 and with the power circuits comprising the power conductors 290, 292 in the other daisy chain connected controllers 20. In the T-type source cable 26 shown in FIGS. 10, 11, the branch wires are very short jumpers within the connector 78 itself, and, alternatively, they could even be eliminated by joining wires 87, 88 and 90, 92 together at or adjacent the pins 2, 1, all of which are equivalents as will be understood by persons skilled in the art.

The signal wires 98, 102 in the inlet trunk segment 70 and outlet trunk segment 72 are connected together to extend electrically uninterrupted through the trunk 83 of T-type source cable 26 from the inlet connector 82 to the outlet connector 86, electrically bypassing the branch segment 85 and the branch outlet connector 78. The other signal wires 100, 104, of the signal wire pairs in the T-type source cable 26, however, detour from the trunk section 83 to extend through the branch section 85 to respective separate pins in the branch outlet connector 78. Therefore, when the branch outlet connector 78 is connected to the controller 20, the signal circuit 23 extends in series through the relay switch 310 in the controller 20. With multiple controllers 20 daisy chain connected in this manner, all of the relay switches 310 of all the controllers 20 are connected in series in and to the extended signal circuit 23, so all of the relay switches 310 in all of the controllers 20 have to be closed in order to have a closed signal circuit 23, as explained above. The branch outlet connector 72 is configured to mate with the inlet connector 140 of the controller 20 and the trunk outlet 86 is configured to mate with the inlet connector 82, so that any number of the T-type source cables 26 can be daisy chain connected together to deliver source power to any number of controllers 20, while maintaining continuity in the signal circuit 23, as explained above.

As also mentioned above, the extension source cable 25 shown in FIG. 27 can be provided in any length needed to connect the daisy chain components 26, 108 to the source power 33 and the signal circuit 23 at remote monitoring station 15. The power wire pair 93, 95 and the signal wire pair 97, 99 extend electrically uninterrupted from the inlet connector 101, which is configured to mate with the outlet connector 35 at the remote monitoring station 15, to the outlet connector 103, which is configured to mate with the inlet connector 82 of the T-type source cable 26 and with the inlet connector 110 of the terminating source cable 108.

Figure 10:
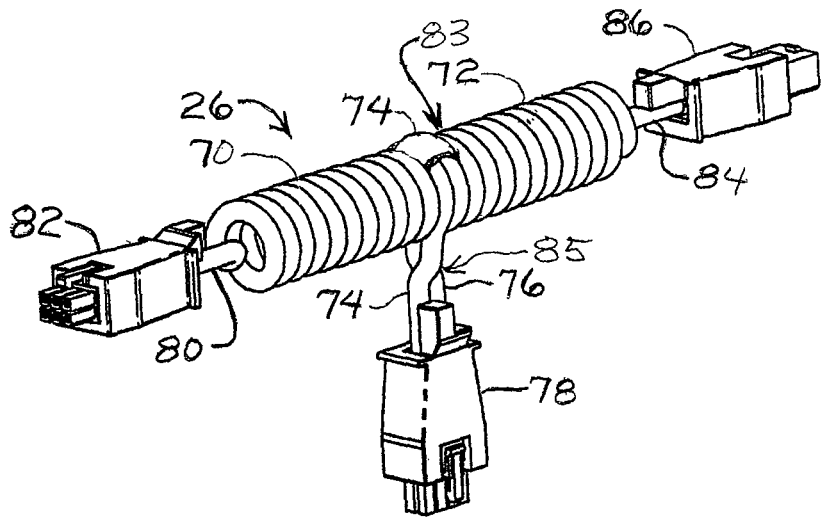
FIG. 10 is an isometric view of a T-type source power cable section.

Referring now primarily to FIG. 10 in conjunction with FIGS. 1-9, the T-type source cable 26 can, but does not have to, comprise two coiled trunk cable segments 70, 72 fastened together with a band 74 to form a neat, T-shaped, coiled, source power cable section 26. Both of the trunk cable segments 70, 72 have respective ends 74, 76 that are terminated in the common branch cable connector 78. The other end 80 of the inlet trunk cable segment 70 is terminated in the inlet cable connector 82, and the other end 84 of the outlet trunk cable segment 72 is terminated in the outlet trunk connector 86. Any suitable cable connectors can be used, for example, Molex™ connectors, as discussed above.

Figure 11:
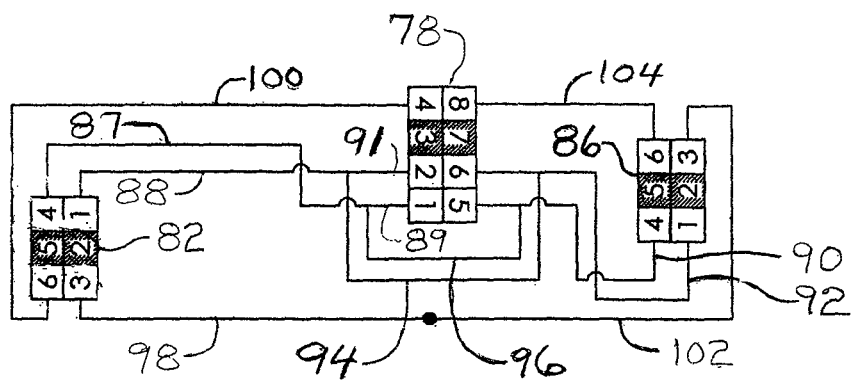
FIG. 11 is a schematic circuit diagram of the T-type source power cable section of FIG. 10.

FIG. 11 is a schematic circuit diagram of the T-type source cable 26. Each trunk segment 70, 72 contains at least two power wires, e.g., the power wires 87, 88 in trunk segment 70 and the power wires 90, 92 in the trunk segment 72, for carrying source power to the controllers 20. The power wires 87, 88 in the inlet trunk cable segment 70 are terminated in pins 1, 4 in trunk inlet connector 82 and in pins 1, 2 in the common branch outlet connector 78. The power wires 90, 92 in the outlet trunk cable segment 72 are terminated in pins 1, 4 in trunk outlet connector 86 and in pins 5, 6 in the common branch outlet connector 78. Source power from a source, for example, the AC power supply 13 (FIG. 27), is usually connected to the inlet trunk segment 70 via the trunk inlet connector 82, and both trunk segments 70, 72 are connected to a controller 20 via the common branch outlet connector 78 (see FIGS. 1-8), so source power is supplied to the controllers 20 via pins 1, 2 in the common connector 78. However, by-pass connections 94, 96 are provided to connect the power wires 87, 88 to the power wires 90, 92 in the outlet trunk cable segment 72 in order to supply source power to the pins 1, 4 in the trunk outlet connector 86 for other controllers 20 and pipe heaters 16 that may be daisy chain connected to the trunk outlet connector 86 as described above.

One of the low voltage signal wires, e.g., wire 98, in the inlet trunk segment 70 is connected directly to a corresponding signal wire 102 in the outlet trunk segment 72 so that pin 3 in connector 82 of the inlet trunk segment 70 is at a common potential with pin 3 in the trunk outlet connector 86 of the outlet trunk segment 72. However, those signal wires 98, 102 by-pass the branch outlet connector 78, so they do not get connected to the controllers 20. The other signal wire 100 in inlet trunk segment 70, however, does connect the pin 6 in the trunk inlet connector 82 to a pin 4 in the branch connector 78. Likewise, the other signal wire 104 in the outlet trunk segment 72 connects pin 6 in the trunk outlet connector 86 to pin 8 in the common branch outlet connector 78. Therefore, the controllers 20 can either close or open the signal circuit comprising the two signal wires to either maintain or interrupt a closed circuit comprising the signal wires, for example, to cause the circuit continuity detector 31 (FIG. 27) to detect that the signal circuit 23 is opened and to trigger the alert/alarm 17 at the remote monitoring station 15 (FIG. 27) in the event the controller 20 detects a heater problem or to trigger some other function, as mentioned above. The unused pins 2, 5 in the trunk inlet connector 82, the unused pins 3, 7 in the common branch outlet connector 78, and the unused pins 2, 5 in the trunk outlet connector 86 are optional and can serve the function of maintaining a spatial distance between high and low voltage connections to avoid electrical noise or interference in the low voltage signals by the high voltage AC power.

Figure 12:
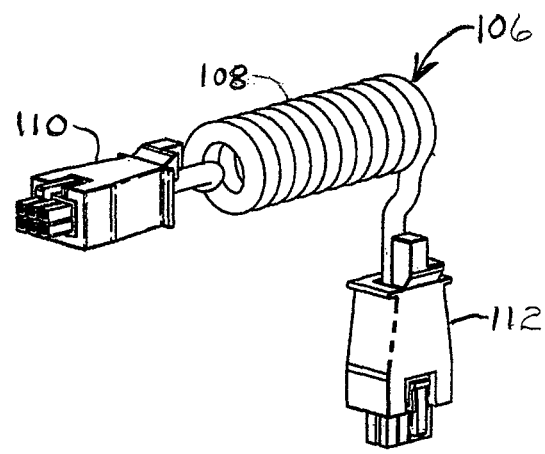
FIG. 12 is an isometric view of a linear-type terminal source power cable section.

The linear-type terminated source power cable 106 shown in FIG. 12 is used to connect AC source power and the signal circuit 23 to the last controller 20 in a daisy chained plurality of controllers 20 or optionally to a sole controller 20 in a heater system that has only one controller 20, as mentioned above. It comprises one cable 108, preferably, but not necessarily, coiled to maintain a neat structure. It is terminated at one end with the inlet connector 110 that mates with the trunk outlet connector 86 of the T-type source cable 26 and at the other end with the outlet connector 112 that, like the branch outlet connector 78 of the control power cable 26, mates with the inlet connector 140 (FIGS. 20-21 and 29) on the controllers 20. As shown in the schematic circuit diagram in FIG. 13, this terminated source cable 106, like the T-type source cable 26, contains at least two power wires 114, 116 and at least two signal wires 118, 120. The power wires connect the pins 1, 4 of the inlet connector 110 to pins 2, 1 of the outlet connector 112, and the signal wires connect pins 3, 6 of the inlet connector 110 to the pins 8, 4 of the outlet connector 112. The terminated source cables 106 are used to provide source power from an AC power source 13 (FIG. 27) and the signal circuit 23 from the remote monitor station 15 (FIG. 27) to the last controller 20 in a series of daisy chain connected controllers 20, instead of using a T-type source cable 26, because the T-type source cables 26 at the end of a daisy chain would leave the two signal wires unconnected, thus always an open circuit voltage situation that would prevent operation of the temperature range alert/alarm signal function, which will be described in more detail below.

In the single point control configuration 14 for zoned master 16 and slave heaters 16' shown in FIGS. 5-8, a single controller 20 is connected via a slave adapter, for example, the slave adapter cable 22 or a slave adapter junction box 324 described below in relation to FIGS. 33-36, to one or more T-type controlled slave cables 24 to control a plurality of heaters 16, 16' in a ganged group or zone of heaters with the single controller 20. The first heater 16 in the zone, which is connected to the single controller 20 by the slave adapter cable 22, is considered to be the master heater for the zone because the controller 20 responds to temperature sensors 50, 52 (FIG. 9) in that first heater 16 to control both that master heater 16 and the rest of the slave heaters 16' in the zone. The rest of the heaters 16' in the zone, other than the master heater 16, are called the slave heaters, because they simply heat or not heat as the AC power is switched on and off, i.e., controlled, by the controller 20 without providing any temperature feedback to the controller 20. For convenience, the T-type controlled power slave cables 24 are so designated because they carry controlled AC power from the controller 20 to the slave heaters 16', as opposed to the T-type source power cables 26 described above, which carry AC source power to the controllers 20.

The master heater 16 and the slave heaters 16' in typical installations are usually identical for convenience and standardization, which is how they are shown and described herein as an example, although identical master and slave heaters is not a requirement for every embodiment of the invention. The slave heaters are designated 16' instead of 16 just for convenience in this description for indicating their slaved functions as distinct from the master functions of the master heater 16. As will be explained in more detail below, the temperature sensors 50, 52 (FIG. 9) in the slave heaters 16', if they exist, are not used. Therefore, the slave heaters 16' could be made without temperature sensors, if desired, and still be used with this invention. However, as mentioned above, the slave heaters 16' can be the same as the master heater 16, in which case the slaved heater cables 22, 24, 184 used for connecting the slave heaters 16' to the controller 20 are configured in a way that isolates the temperature sensors 50, 52 (FIG. 9) in the slave heaters 16' and that does not route the signals from those temperature sensors to the controller 20, thereby rendering the temperature sensors 50, 52 of the slave heaters 16' effectively inoperative in the system, as will be described in more detail below.

Figure 8:
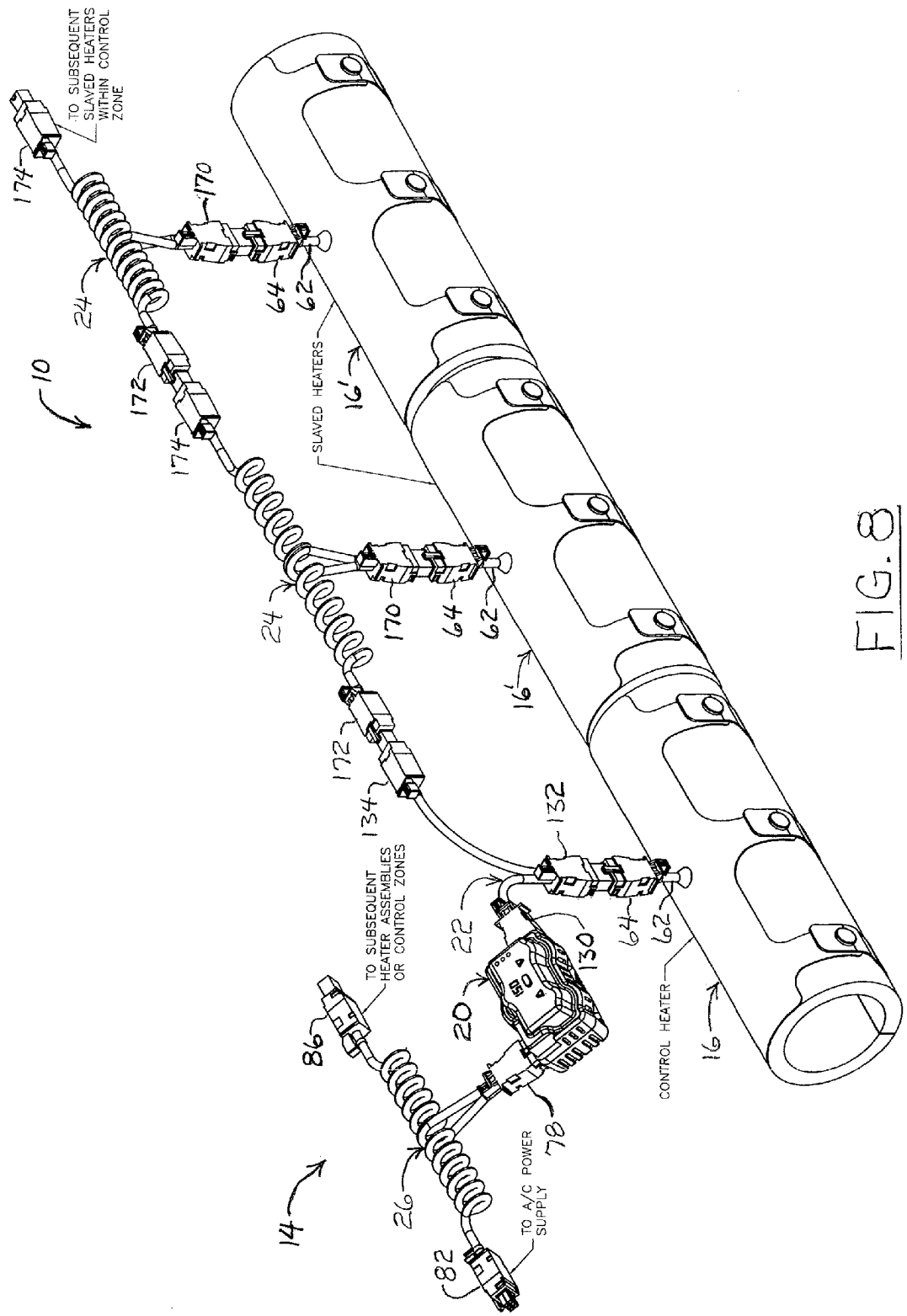
FIG. 8 is an isometric view of the single point control apparatus for the master and slave heater arrangement in FIG. 5 in its assembled condition.

As indicated in FIGS. 5 and 8, there can be any number of slave heaters 16' in the grouping or zone controlled by the one controller 20. Subsequent slave heaters 16' in the zone can simply be connected in a daisy chain manner to the last T-type controlled slave cable 24 shown in FIGS. 1 and 4 by additional T-type controlled slave cables 24 and a terminating controlled cable 184 (FIG. 18), which is not shown in FIGS. 5-8 but will be described in more detail below.

To summarize, the T-type controlled slave cables 24 only conduct electricity to the heater coils (FIGS. 9 and 32) in the slave heaters 16'. The electricity for powering the slave heaters 16' is controlled by the controller 20, so when the controller 20 switches on electric power to the slave heaters 16', they produce heat. When the controller 20 switches off the electric power to the slave heaters 16', they stop producing heat. No temperature information is derived by the controller 20 from any of the slave heaters 16'.

The master heater 16 also produces heat when the controller 20 switches on the electric power, and it stops producing heat when the controller 20 switches off the electric power. However, the controller 20 also receives temperature information from temperature sensors 50, 52 (FIGS. 9 and 32) in the master heater 16 and turns the power on and off in response to sensed temperature levels in the master heater 16. Therefore, when the sensed temperature in the master heater 16 is low, based on settings in the controller 20, the controller 20 will turn on the power, and all of the master and slave heaters 16, 16' in the zone will be turned on in unison. Likewise, when the temperature sensed in the master heater 16 is high, based on settings in the controller 20, the controller 20 will turn off the power, and all of the master and slave heaters 16, 16' in the zone will be turned off in unison.

Electric power is provided to the controller 20 in FIG. 5 via a T-type source power cable 26. The T-type source cable 26 looks similar to the T-type controlled power slave cables 24 from the outside, but it also has at least a pair of low voltage signal wires in addition to the pair of high voltage power wires, as described above, whereas the T-type controlled power slave cables 24 have the pair of high voltage power wires for powering the heater elements in the slave heaters 16' but not the signal circuit wires for the alert/alarm circuit described above.

Figure 14:
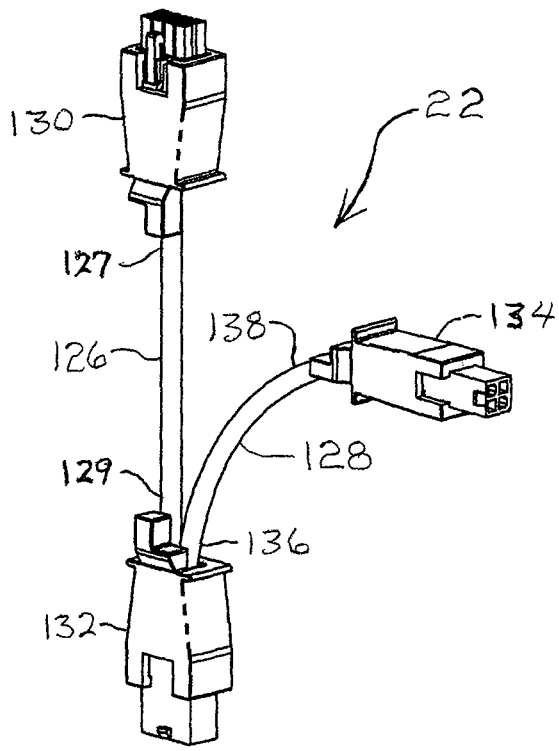
FIG. 14 is an isometric view of an example slave adapter cable.

The slave adapter cable 22 shown in FIG. 14 is used, as shown in FIGS. 5-8, to connect a controller 20 to the master heater 16 and to one or more slave heaters 16', as explained above. The slave adapter cable 22 is comprised of two cable segments, a master controlled power cable segment 126 and a slave controlled power cable segment 128, which are so designated for convenience because they carry controlled (e.g., switched on and off) power from the controller 20 as opposed to source power to the controller 20. One end 127 of the master controlled power cable segment 126 is terminated at an inlet connector 130, which, like the inlet connector 64 on the heater cord 62 (FIGS. 1-9), has at least six pins to handle at least two high voltage power wires to conduct AC controlled power to the heating element 32, and two pairs of signal wires for the two temperature sensors 50, 52 (FIG. 9) in the master heater 16 (FIGS. 5-9). In some embodiments, the signal wires can be low voltage, while in other embodiments at least one of the pairs of signal wires may also be high voltage, depending on the kind of temperature sensor used for the high-limit control, as will be described in more detail below. Therefore, the inlet connector 130 can be the same configuration as the inlet connector 64, which provides the option of connecting a heater cord 62 directly to the output connector 142 in the controller 20, as is shown in FIGS. 1-4 for the individual local heater control configuration 12, or of connecting the heater cord 62 to a controller 20 via a slave adapter 22, as is shown in FIGS. 5-8 for the single point control configuration 14 for a zone comprising master and slave heaters 16, 16'. The other end 129 of the master controlled power cable segment 126 is terminated at a common outlet connector 132, which is configured like the outlet connector 142 on the controller 20 (FIGS. 3, 7, 20, 21) so that it can mate with the inlet connector 64 of the heater cord 62, which, again, provides the option of connecting the heater 16 directly to a controller 20 for individual heater 16 control or to the slave adapter 22 for a single point control configuration 12. The slave cable segment 128 of the slave adapter 22 contains two high voltage power wires for powering the slave heaters 16', but it does not have to have wires for the temperature sensors 50, 52, as will be explained in more detail below. One end 136 of the slave cable segment 128 is terminated in the common outlet connector 132 and the other end 138 is terminated in a slave outlet connector 134.

Figure 15:
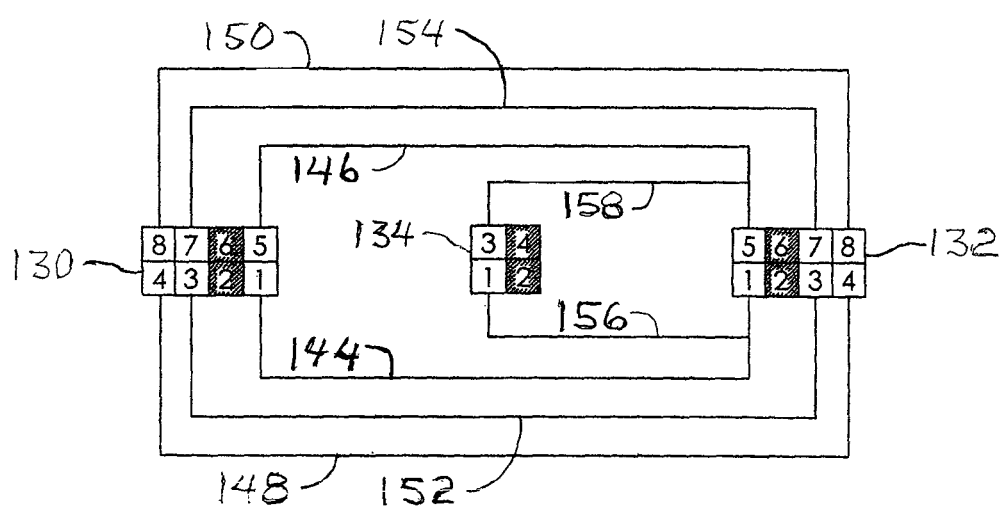
FIG. 15 is a schematic circuit diagram of the slave adapter cable of FIG. 14.

As shown in the schematic circuit diagram in FIG. 15 for the slave adapter cable 22, and as mentioned above, the master cable segment 126 has at least two power wires 144, 146, which connect pins 1, 5 of the inlet connector 130 to pins 1, 5 of the outlet connector 132 for providing high voltage AC power to the heater elements 32 in the master heater 16 (FIGS. 1-4 and 9). The master cable segment 126 also has two pairs of signal wires, e.g., a first pair of wires 148, 150 and a second pair of wires 152, 154, for connecting the two temperature sensors 50, 52 (FIG. 9), respectively, in the master heater 16 to the single point controller 20 (FIGS. 5-8). The signal wire pair 148, 150 connect pins 4, 8 of inlet connector 130 to pins 4, 8 of the outlet connector 132, and the other signal wire pair 152, 154 connect pins 3, 7 in the inlet connector 130 to pins 3, 7 in the outlet connector 132. However, as explained above, the controller 20 in the single point control configuration 14 (FIGS. 5-8) gets temperature information only from the master heater 16, not from the slave heaters 16'. Therefore, the slave cable segment 128 of the slave cable adapter 22 does not need any signal wires. Its only function is to provide controlled high voltage power to the slave heaters 16', so the slave cable segment 128 contains two high voltage power wires 156, 158, as shown in FIG. 11. Also, by not having signal wires in the slave cable segment 128, use of the slave cable adapter 22 automatically isolates the temperature sensors 50, 52 of subsequent heaters in a daisy chain, which makes them function as slave heaters 16'. Also, since there does not have to be any signal wires in the slave cable segment 128, the outlet connector 134 can be simpler with fewer pins than the connectors 130, 132. Also, this smaller outlet connector 134 with its different configuration prevents mistaken connection of a source power cable 26 or a terminated source power cable 106 to the slave adapter cable 22, which could inadvertently connect the temperature sensors 50, 52 of more than one heater 16 to the single point controller 20. Of course, the smaller, differently configured connector 134 also requires a smaller mating connector 172, 190 on subsequent slave heater cables 24, 184, which will be discussed in more detail below. Those smaller connectors 172, 190 also prevent those slave cable sections 24, 184, which do not have signal wires, from being inadvertently connected into the power/signal trunk line, which does have signal wires, as described above.

As shown in FIG. 15, the high voltage power wires 156, 158 of the slave adapter cable 22 connect pins 1, 5 of the connectors 130, 132 to the pins 1, 3 of the outlet connector 134 so that high voltage source power provided from the controller 20 (FIGS. 5-8) through the inlet connector 130 is also provided to the outlet connector 132 for the master heater 16 and to the outlet connector 134 for the slave heaters 16'. Again, the pins 2, 6 in the connectors 130, 132 are unused and provide space between the high voltage connections and the signal connections. Pins 2, 4 in the outlet connector 134 are not used.

Figure 16:
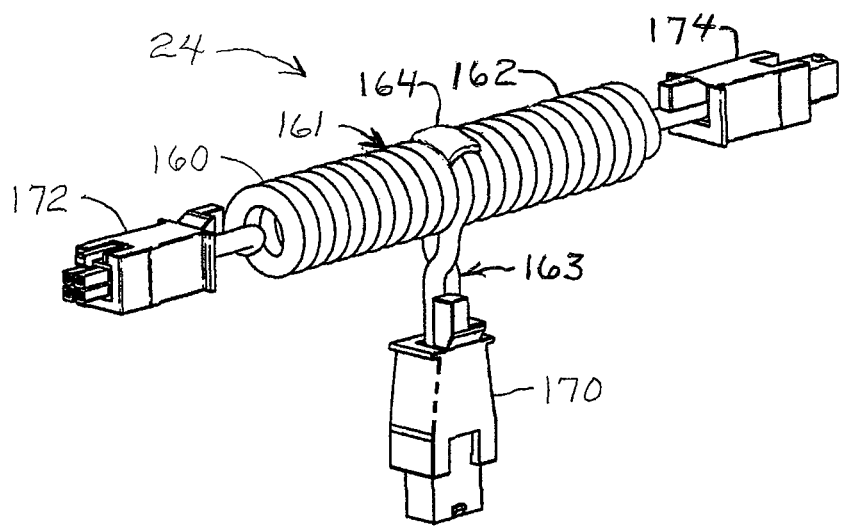
FIG. 16 is an isometric view of a T-type slave controlled power cable section.
Figure 17:
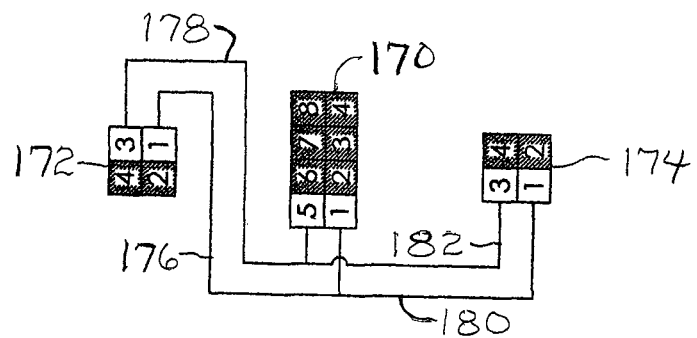
FIG. 17 is a schematic circuit diagram of the T-type slave controlled power cable section of FIG. 16.

The T-type controlled power slave cable 24 is best seen in FIG. 16, and its schematic circuit diagram is shown in FIG. 17. This T-type controlled power cable 24 comprises two trunk segments 160, 162, preferably, but not necessarily, coiled and banded together with a band 164 to create and maintain a neat structure. Since this T-type controlled power cable 24 only provides high voltage controlled power to the slave heaters 16' (FIGS. 5-8) as discussed above, these first and second slaved trunk segments 160, 162 contain high voltage power wires 166, 168, but they do not have to contain any signal wires. Further, with no signal wires in the T-type controlled power slave cable 24, the selection and use of these T-type controlled power slave cables 24 to get controlled AC power to a heater, instead of connecting a controller 20 directly to the heater, automatically isolates the temperature sensors 50, 52 of the heater, thus makes the heater function as a slave heater 16' instead of as master heater 16. Also, since the branch outlet connector 78 of the T-type source power cable 26 described above is configured different from the branch outlet connector 170 of the T-type controlled power slave cable 24 in the example embodiment described above, the T-type source power cable 26, which does have signal wires, cannot be connected to the heater.

One end of each trunk segment 160, 162 of the T-type controlled power slave cable 24 is terminated in a common branch outlet connector 170, and the opposite end of the inlet trunk segment 160 is terminated in a inlet daisy chain connector 172 while the opposite end of the slave outlet trunk segment 162 is terminated in a trunk outlet slave daisy chain connector 174. The slave inlet daisy chain connector 172 is configured to mate with the slave outlet daisy chain connector 134 of the slave adapter cable 22 (FIGS. 5-8 and 14). The trunk outlet slave daisy chain connector 174 is configured the same as the daisy chain outlet connector 134 of the slave adapter cable 22 so that any T-type controlled power cable 24 can be connected either to the slave adapter cable 22 or to another T-type controlled power cable 24.

The common slaved heater outlet connector 170 is configured to mate with the inlet connector 64 of the heater cord 62 so that it can deliver high voltage power to the slave heaters 16' (FIGS. 5-8). Therefore, even though the T-type controlled power cable section 24 does not have to have any signal wires, the common slave branch outlet connector 170 is the same configuration as the outlet connector 132 of the slave adapter cable 22 and as the outlet connector 142 in the controller 20 so that it can mate with the inlet connector 64 of the heater 16'. As shown in FIG. 17, the high voltage controlled power wires 176, 178 in the slave inlet trunk segment 160 connects the pins 1, 3 of inlet connector 172 to the pins 1, 5 of the common branch outlet connector 170, which is the same as the high voltage power connections to pins 1, 5 in the outlet connector 132 of the slave adapter cable 22. The high voltage power wires 176, 178 of the inlet trunk segment 160 are also connected to the high voltage power wires 180, 182 of the outlet trunk segment 162 in order to provide high voltage power at the pins 1, 3 of the outlet slave daisy chain connector 174. As shown in FIG. 17, there are numerous unused pins 2-4 and 6-8 in the branch outlet connector 170, but having no signal wires connected to the pins 3, 7 and 4, 8 isolates the temperature sensors 50, 52 in the pipe heater 16' and prevents them from being connected to the controller 20, which makes the heater function as a slave heater 16'.

It should be apparent from this description, therefore, that the same heaters can be used as either: (i) individually controlled heaters 16 in an individual local heater control configuration; (ii) a master heater 16 in a single point heater control configuration; or (iii) a slave heater 16' in a single point control configuration. No modification or change is needed in either the controller 20 or the heater 16 to make this selection or to implement these functions. The desired function of the heater—individually controlled, master, or slave— is implemented merely by choosing to either: (i) connect the heater directly to a controller 20 for an individually controlled heater 16; (ii) connect the heater to controller 20 via a slave adapter, e.g., a slave adapter cable 22, for a master heater 16; or (iii) connect the heater to a controller 20 via a slaved heater controlled power cable section 24 for a slave heater 16'.

Figure 18:
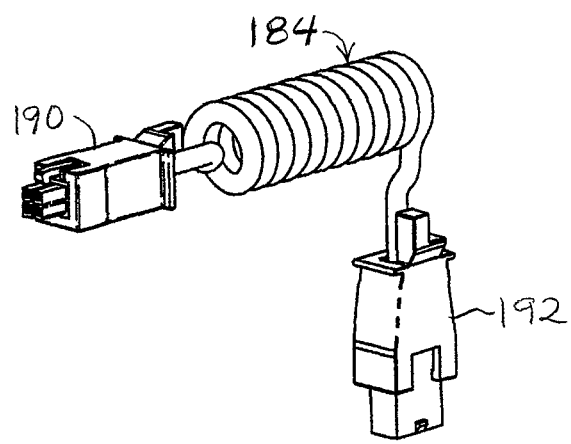
FIG. 18 is an isometric view of a linear-type terminal slave controlled power cable section.
Figure 19:
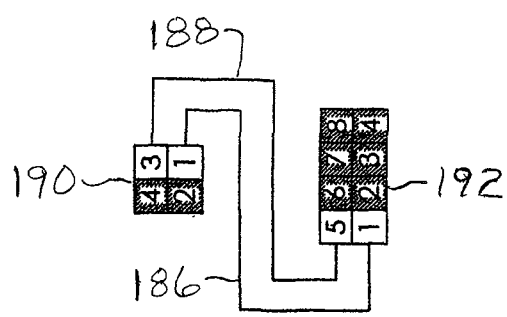
FIG. 19 is a schematic circuit diagram of the linear-type terminal slave controlled power cable section of FIG. 18.

The selection of a heater to function as a slave heater 16' can also be made for the last slave heater 16' in a zone of heaters in a single point heater control configuration by using a terminated controlled power cable 184, which is best seen in FIG. 18 with its schematic circuit diagram in FIG. 19. Essentially, the terminated controlled power cable 184 is substantially the same as the inlet trunk segment 160 of the T-type controlled power cable 24 (FIG. 16). It only has to have two high voltage power wires 186, 188, a inlet connector 190 that is the same as the inlet connector 172 in the T-type controlled power cable 24, and an outlet connector 192 that is the same configuration as the outlet connector 170 of the T-type controlled power cable 24. The high voltage power wires 186, 188 connect the pins 1, 3 in the inlet connector 190 to the pins 1, 5 in the outlet connector 192. In use, the outlet connector 192 is connected to the inlet connector 64 on the heater (FIG. 9), which makes it a slave heater 16' because there are no signal wires connected to the pins 3, 7 and 4, 8 of outltet connector 192, which isolates the temperature sensors 50, 52 in the heater (FIG. 9), as explained above. The inlet connector 190 can be connected to the outlet connector 134 of the slave adapter cable 22 (FIGS. 5-8 and 14), if there is only one slave heater 16', or to a connector 174 of the T-type controlled power cable 24, if the heater 16' is the last in a series of more than one slave heater 16'.

The controller 20 is modular so that it can be used in a simpler arrangement with factory-preset parameters or so that it can be expanded, if desired, to accommodate more user interface and settable parameter options. As best seen in FIGS. 20-23, the controller 20 has a base module 200, which includes circuit components that are necessary for the basic functions of the controller 20 with factory-preset parameters, including, but not limited to: (i) Monitoring the temperature sensors 50, 52 in the heater 16 (FIG. 9); (ii) Turning the high voltage power to the heater elements 32 on and off according to factory-preset temperature parameters and hysteresis; (iii) Disconnecting the high voltage power in the event of an over-temperature event according to a factory-preset upper temperature limit; (iv) Initiating an alarm signal to a remote monitoring station if the high voltage power is disconnected due to a high-temperature event; and (v) Displaying several status indicators, e.g., low temperature, high temperature, in-range, high voltage power to the heater(s) on or off, and high voltage power disconnected due to a high temperature event.

Figure 20:
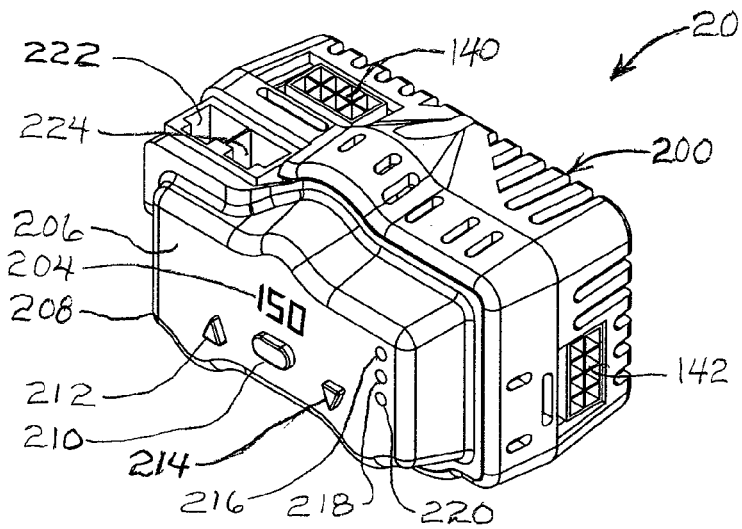
FIG. 20 is an isometric view of an example basic heater controller with an enhanced control expansion module installed on the base module to provide additional functionality to the heater controller.
Figure 21:
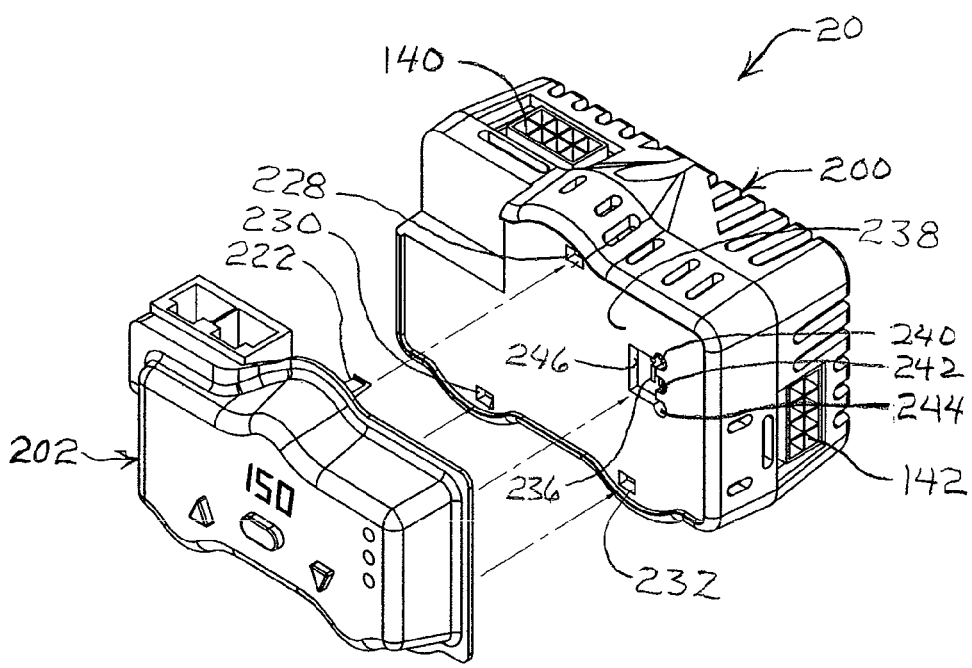
FIG. 21 is an isometric view of the basic heater controller with the enhanced control expansion module in a position poised to be installed on the base module of the heater controller.
Figure 22:
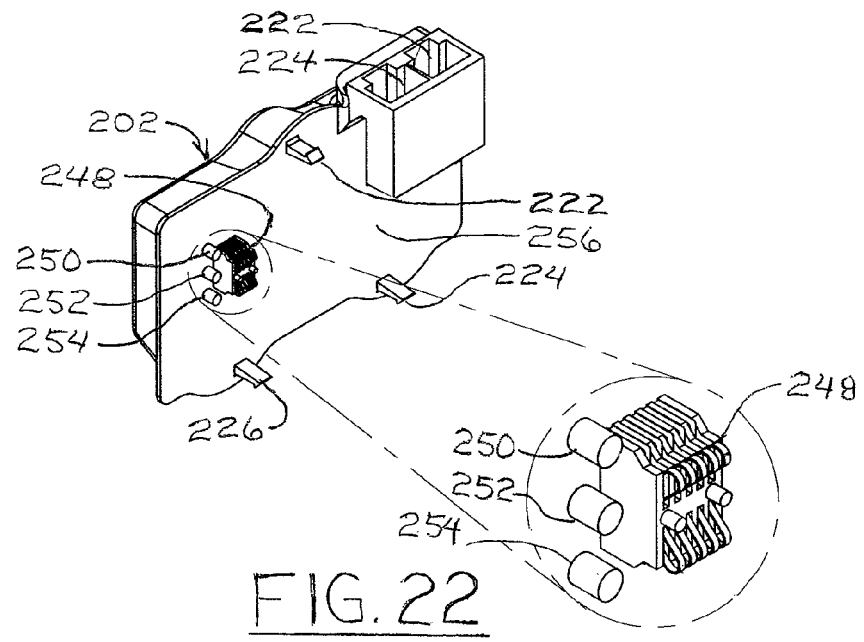
FIG. 22 is an isometric view of the enhanced control expansion module from a different perspective to illustrate the example expansion module contact pad and light transmissive boss components, which are enlarged for better definition of these features.

Additional functionality and user interface capabilities, such as re-settable parameters, data communications, system monitoring, alpha-numeric visual display capabilities, and others can be added to the controller 20 by attaching an expansion module 202 to the base module 200, as shown by FIGS. 21 and 22, as well as in FIGS. 2, 3, 6, and 7. The example expansion module 202 shown in FIGS. 21 and 22 includes a circuit (not shown in FIGS. 21 and 22) that processes user inputs either from inputs on the expansion module 202 itself or from a remote location via the communication components or other communications implementations as explained below. It also communicates with process control and, in some embodiments, with high temperature limit control circuits 296, 298 (FIG. 29) in the base module 200 to view, set, reset, and monitor some or all functions of the base module 200 depending on the level of adjustability built into the base module 200 and the level of capabilities built into a particular expansion module 202. As shown in FIGS. 20 and 21, the expansion module 202 has an alpha-numeric display 204 that is visible through a transparent front face portion 206 of a housing 208, user input buttons 210, 212, 214, and status LED display nubbins 216, 218, 220, all of which will be discussed in more detail below. The expansion module 202 can also have data line communication ports 222, 244 to transmit and receive data to and from a remote station and/or to and from another controller 20 in a daisy chain connected system. It should also be noted that different expansion modules 200 can also be made with fewer than or more than these features so that users can select and install particular expansion modules with a particular package of capabilities and features, depending on what they want or need for their particular heater control systems. Also, wireless communication components, such as infrared, RF, or other wireless communications implementations and components for such implementations (not shown) can also be included in the expansion module, if desired, as is understood by persons skilled in the art. Therefore, the communications ports and components shown in the drawings are examples—not exclusive or limiting embodiments.

The expansion module 202 attaches very easily to the base module 200 as best seen in FIGS. 21 and 22 by simply aligning a plurality, e.g., three, latch dogs 222, 224, 226 protruding from the back side 234 of the expansion module 202 with a plurality, e.g., three, corresponding or mating latch holes 228, 230, 232 in the front panel 288 of the base module 200 and snap it into place. It can be removed just about as easily by simply pulling the expansion module 202 apart from the base module 200.

The circuit board in the base module 20 has a set of electric contacts, for example, the pad of contacts 236, or any other suitable plug receptacle, and a plurality, e.g., three, LEDs 240, 242, 244 adjacent an opening 246 in the front panel 238. A correspondingly aligned and mating contact assembly 248, or a suitable plug, protrudes from a circuit board in the expansion module 202 through the rear panel 256, which, when the expansion module 202 is snapped into place on the base module 200, protrudes through the opening 246 and into contact with mating electrical contacts on the contact pad 236 or into the plug receptacle (not shown) in the base module 200 in order to connect the expansion module 202 electrically to the base module 200 to receive power and to communicate data. Also, there are a plurality, e.g., three, transparent or at least translucent bosses or wave guides 250, 252, 254 mounted in the circuit board in the expansion module 202 that are aligned with and extend from the display nubbins 216, 218, 220 on the front face 206 to protrude out the back panel 256 toward the base module 200. These protruding bosses 250, 252, 254 align with the LEDs 240, 242, 244 in the base module 200, so that, when the expansion module 202 is snapped into place on the base module, the bosses 250, 252, 254 are positioned adjacent the LEDs 240, 242, 244 so that they transmit light from the LEDs 240, 242, 244 to the display nubbins 216, 218, 220 on the front face 206.

Figure 23:
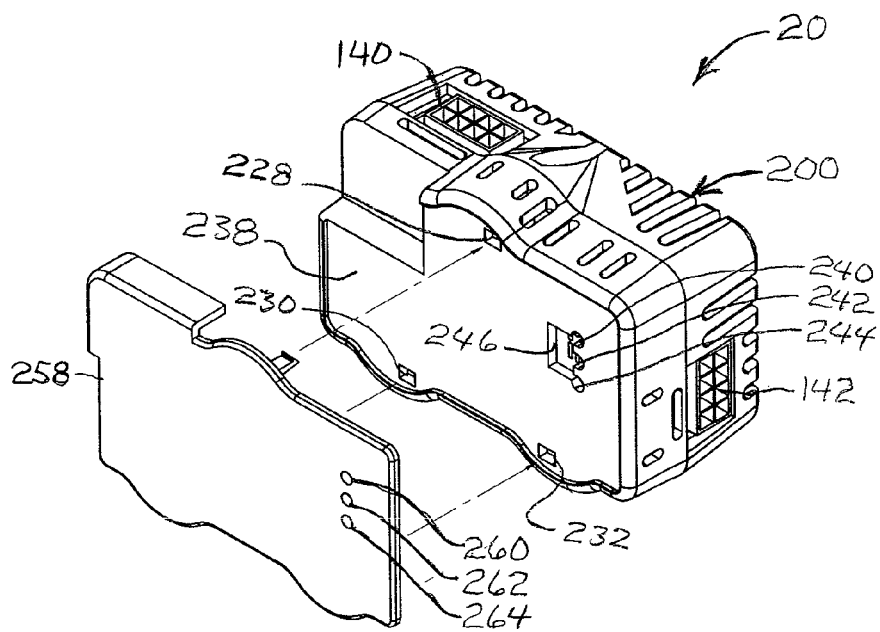
FIG. 23 is an isometric view of the basic heater controller with a substitute dust cover poised in position to be installed on the heater controller base module.

When the base model 200 is operated alone, without the expansion module 202, a dust cover 258 is provided to snap into place on the base module 202 in place of the expansion module 200, as best seen in FIG. 23, in order to prevent dust and debris from entering the base module 200 through the opening 246. The dust cover also has latch dogs similar to those on the expansion module 202 that align with and snap into the latch holes 228, 230, 232 to hold the dust cover 258 in place on the base module 200. The dust cover 258 has three bosses 260, 262, 264 similar to the bosses 250, 252, 254, but shorter, that extend from the front of the dust cover 258 into the hole 246 to the LEDs 240, 242, 244 so that they transmit light from the LEDs to the front of the dust cover for status displays.

Of course, more or fewer LED status displays can be provided for either the expansion model display or the dust cover display. The three LED status displays 216, 218, 220 on the expansion module 202 and the three LED status display 260, 262, 264 on the dust cover 258 in the example embodiment described herein may be, for example, an "Alert/Alarm" when the controller 20 detects a condition that needs attention, such as a heater not working so that the sensed temperature, e.g., from the process temperature sensor 52, is too hot or too cold, an "In Range" mode to indicate the temperature of the heater is in the preset desired operating range, and an "Output" mode, which shows that the controlled AC power to the heater is turned on, i.e., being output to the heater.

As mentioned above, the expansion module 202 can be equipped or programmed to provide more or fewer of the functions, capabilities, and/or features described herein. Also, some expansion modules 202 can be made with more or fewer of these functions, capabilities, and/or features than other expansion modules 202. Also, one of the expansion modules 202 can be moved from one base unit 200 to another base module 200 to check and/or reset parameters in the first controller and then to check and/or reset parameters in the second and/or any number of additional base modules 200. Therefore, if desired, a single expansion module 202 can be used on one or more base modules 200, if desired.

Figure 24:
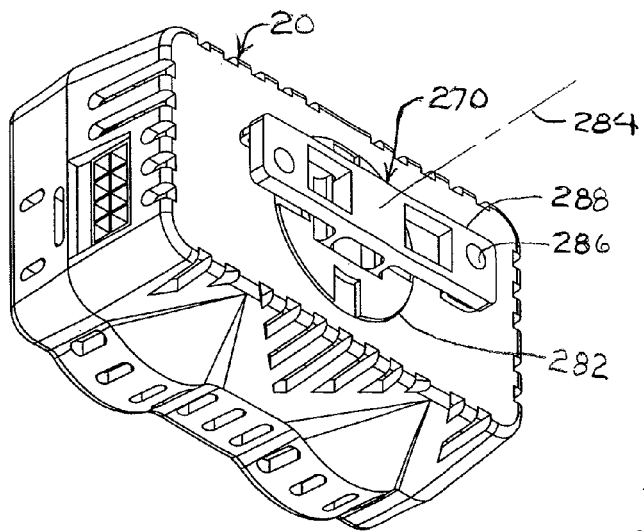
FIG. 24 is an isometric view of the heater controller base module from a different perspective to illustrate a module mounting apparatus.
Figure 26:
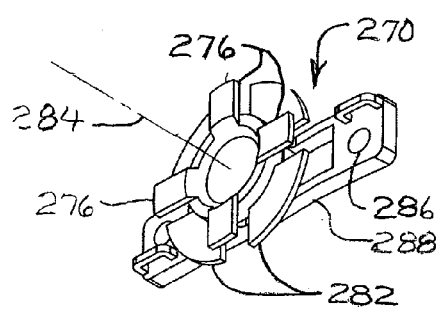
FIG. 26 is an isometric view of the mounting apparatus in FIGS. 24 and 25, but from a different perspective to illustrate the operative attachment components.
Figure 25:
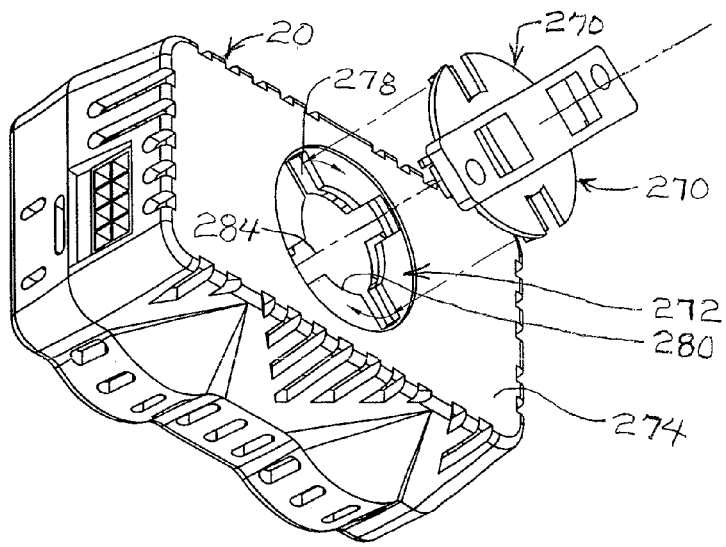
FIG. 25 is an isometric view of the heater controller base module similar to FIG. 24, but with the mounting apparatus in a position poised for connection to the heater controller.

To help hold the controller 20 and associated wiring away from hot heaters, which could damage its electronic components, and to help maintain a neat, daisy chained connection layout, the controller 20 is provided with a convenient wall mount bracket 270 and mating locking socket 272 in the back panel 274, as best seen in FIGS. 24-26. The bracket 270 has a plurality of radially extending ears 276, which are sized to slip through mating radially extending slots 278 between adjacent sector plates 280 in the socket 272. Then, when the controller 20 is rotated, the ears 276 are captured under the sector plate guides 280 so that the bracket 270 cannot be withdrawn from the socket 272. Several backing plate guides 282 on the bracket that are recessed axially behind the ears 276 contact the sector plate guides 280 when the bracket 270 is inserted into the socket 272, so when the controller 20 is rotated about an axis 284 of the socket 272, the sector plate guides 280 get captured between the ears 276 and the backing plate guides 282 to hold the bracket 270 firmly and securely in the socket 272.

In use, the wall bracket 270 can be fastened to a wall or other structure (not shown) by screws or other fasteners (not shown) through the holes 286 in the cross piece 288. Alternatively, the bracket 270 can be fastened to an object, e.g., to a heater 16, with a strap, wire, tape, or other material (not shown) wrapped around the cross piece 288 and around the object. The controller 20 is then positioned adjacent the bracket 270, axially aligned with the bracket 270 on axis 284, and axially pushed toward the bracket 270 to pass the ears 276 through slots 278 into the socket 272. The controller 20 is then rotated about the axis 284 to lock the controller 20 in place on the bracket 270, as shown in FIG. 24. The controller 20 can be easily removed from the bracket 270 by reversing those steps.

Figure 28:
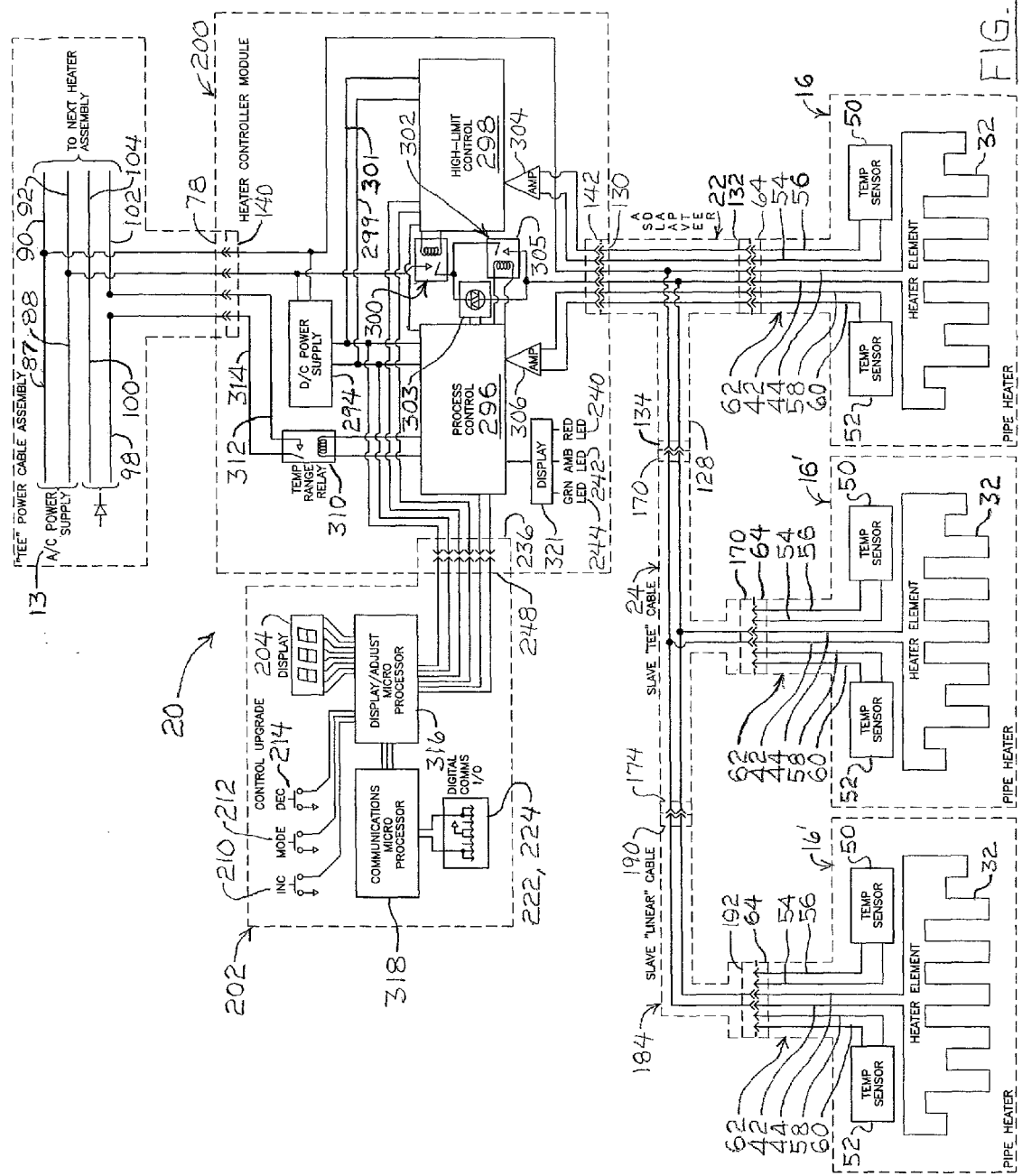
FIG. 28 is a schematic circuit diagram of the heater controller base unit and the enhanced control expansion module connected to the T-type source power cable and to multiple pipe heaters via a slave adapter cable, T-type slaved heater cable, and a terminal slave controlled power cable in an example single point control arrangement.

The functions and control logic in one embodiment can be described by reference primarily to the schematic circuit diagrams in FIGS. 28-31 in conjunction with the logic flow diagram in FIG. 32. The schematic circuit diagram in FIG. 28 depicts the multiple heater control system 10 of the present invention in a single point heater control configuration 14 as illustrated in FIGS. 5-8 and described above. In summary, the master heater 16 is connected to the controller 20 via a slave adapter cable 22 to the base module 200 of controller 20. The controller 20 is connected to a high voltage power source, e.g., an AC power supply, by the T-type source power cable 26 connected to the controller 20. The high voltage source power is delivered to the controller 20 by the high voltage wires 87, 88 in the T-type source power cable 26 and is represented in the controller 20 by high voltage conductors 290, 292. In the controller 20, the high voltage source power is tapped by a DC power supply 294 which supplies low voltage DC power to the process control chip 296, to a high limit control chip 298 in the embodiment shown in FIGS. 28-31, and to the contact pad 236 or plug receptacle (not shown), where it is available to the expansion module 202, if the expansion module 202 is installed. The high voltage controlled power is also routed to the outlet connector 142, where it is available to heaters 16, 16' via the slave adapter cable 22, T-type slave controlled power cable 24, and slave terminating controlled power cable 184. In the master heater 16 and slave heaters 16', the high voltage controlled power from conductors 290, 292 in the controller is conducted to the heater elements 32 by the high voltage wires 42, 44.

In the example controller 20 embodiment shown in the schematic diagrams in FIGS. 28-31, the high-limit control circuit 298 is depicted as including a digital logic circuit, such as a microprocessor, which can be programmed to perform the high-limit cutoff functions. In such a digital logic, high-limit control circuit, one high voltage conductor 292 is routed directly to the outlet connector 142, from where it connects directly to the high voltage wire 44 in each heater 16, 16'. However, the other high voltage conductor 290 is routed through two switch devices 300, 302. The first switch device 300 is in front of the second switch device 302 and is controlled by a microprocessor or other logic circuit in high-limit control circuit 298 to disrupt and turn off the high voltage power to everything behind the first switch device 300, including all the heaters 16, 16' and the second switch device 302. Therefore, when the high limit control 298 opens the first switch 300, such as due to an excess temperature event, nothing downstream from the relay switch can operate until the first switch 300 is reset. In this description, "upstream" and "in front of" refers to the side, direction, or relative position from which the electricity comes, e.g., from the AC power source or supply 13 (FIG. 27). In complementary fashion, "downstream" or "in back of" or "behind" refers to the side, direction, or relative position away from the source, e.g., the direction in which the power goes away from a component, etc.

The first high voltage power switch 300 is preferably, but not necessarily, a mechanical relay that is normally open, so power (current through the relay coil) is required to close it. Also, once the power switch (relay) 300 is opened, it is preferred, although not essential, that the power switch 30 cannot be reset (closed) without some operator or user intervention. In other words, when the temperature at the heater recedes, the relay switch 300 does not reset or close automatically. Instead, an operator or user has to actively do something to reset (close) the relay switch 300 in order to restart the controller 20 to deliver controlled power to the heaters. A mechanical relay switch is preferred, although not essential, for the high-limit switch 300, because a solid state switch, such as a triac, has more resistance, thus would produce more unnecessary heat and would be an unnecessary power drain.

A conventional latching relay device could perform the functions described above, but conventional latching relay devices that could be used in these kinds of heater control applications are large, bulky devices that require a second coil and substantial power to operate. Therefore, an embodiment of this invention includes a high-limit control circuit 298 that is configured to cause an ordinary, normally open mechanical relay switch to remain open, even after the heater temperature recedes below the upper temperature limit, until an operator or user intervenes. Several example high-limit control circuits 298, one digital and two analog, that enable an ordinary, normally open mechanical relay switch to function in this manner in the heater control system 10 are included in this description.

An ordinary, normally open mechanical relay switch is a relay switch with at least one set of electrical contacts that are spring biased to an open mode or position and a coil, which, when powered, generates a magnetic field or bias that overcomes the spring bias to close the contacts. When the power to the coil is turned off so that no current or not enough current flows through the coil to create a strong enough electromagnetic field or bias to overcome the spring bias, then the spring bias re-opens the contacts.

One example high-limit control circuit 298 for controlling the high-limit mechanical relay switch 300 to function as described above includes a digital logic microprocessor or other logic circuit as indicated diagrammatically in the schematic circuit diagram of the controller 20 in FIGS. 28-31. In this example, the microprocessor or other digital logic circuit of the high-limit circuit 298, upon startup, is programmed to progress through a series of startup logic steps, which include: (i) comparing the temperature sensed by the first (upper-limit) temperature sensor 52 to a preset high temperature limit, and (ii) if the sensed temperature does not equal or exceed the preset high temperature limit, generating a signal to close the normally open relay switch 300. For example, but not for limitation, the signal can be applied to the gate of a low voltage, solid state switch, e.g., a transistor (not shown) to turn on a flow of low voltage DC electric current through the coil of the mechanical relay switch 300 to cause it to close. If the sensed temperature does equal or exceed the preset high temperature limit, the startup logic does not generate the signal that would cause the relay power switch 300 to close. Therefore, in one example implementation, if the relay power switch 300 is not closed, the DC power that powers the high-limit control circuit has to be turned off and then turned on again to make it go through its reboot or restart logic when the sensed temperature does not exceed the preset high temperature limit in order to close the relay power switch 300 after it has been opened. Such turning off or removal of DC power to the high-limit control circuit 298 can be accomplished in a number of ways. For example, but not for limitation, since the DC power supply 294, which provides DC power to operate the high-limit control circuit 298 in the example implementation in FIG. 28 is tapped into the AC power in the AC power leads 290, 292, the removal of DC power from the high-limit control circuit 298 can be accomplished simply by unplugging or disconnecting the controller 20 from the AC source power, which also cuts off power to the DC power supply 294, thereby removing power from the high-limit control circuit 298. Then, reconnecting the controller 20 to the AC source power will re-power the high-limit control circuit 298, thereby causing it to reboot and go through its startup logic again, which will close the relay power switch 300 if the startup logic determines that the sensed temperature does not equal or exceed the preset high temperature limit, as explained above. Of course, other ways of turning the DC power to the high-limit circuit 298 on and off could also be provided, for example, a manually operated switch (not shown) in front of the DC power supply 294 or between the DC power supply 294 and the high-limit circuit 298 could also be provided. A suitable logic circuit for the high-limit control circuit 298 can include, for example, an ATmega168 microprocessor manufactured by Amtel Corporation, San Jose, Calif., although other integrated circuit chips that can be programmed to perform the described functions are readily available commercially and are well known to persons skilled in the art.

Again, a purpose of this example digital implementation is to require an operator or user to actively intervene in order to restart a heater that has been turned off by the upper-limit control circuit 298, and thereby make it more likely that the operator or user will check on the cause of the high-limit shutoff of the heater before turning it back on and leaving it unattended. At the same time, the use of the mechanical relay switch 300 controlled in the manner described above, i.e., to open and shut off AC power to the heater in a reliable manner at or near a predetermined high temperature limit and then being closable again by a simple operator intervention, avoids the disadvantages of a thermal fuse in the heater that either has to be replaced or renders the heater unusable. It also avoids the disadvantages of a conventional latching relay, e.g., large, bulky, and a power drain, and it avoids the disadvantages of a solid state switch, e.g., resistance, heat production, and power drain. Also, in the digital implementation described above, the upper temperature limit or parameter is adjustable, which provides additional options and flexibility for users.

As persons skilled in the art know, there is little, if any, substantive difference between a logic step that generates an action if a parameter is "equal to or greater than" a value or just "greater than" the value, other than the particular logic statement that the programmer chooses to use. Likewise, there is little, if any, substantive difference between a logic step that generates an action if a parameter is "equal to or less than" a value or just "less than" the value. In other words, for example, if the logic step of the high-limit circuit is described or claimed as generating a signal to open the relay 300 when the sensed temperature equals or is greater than a preset upper temperature limit parameter, it is considered equivalent to generating a signal to open the relay 300 when the sensed temperature exceeds, i.e., is greater than, the upper temperature limit parameter. Therefore, unless specified otherwise, >= is considered to be equivalent to > and vice versa, and <= is considered to be equivalent to < and vice versa.

As long as the temperature in the master heater 16 remains below the high temperature limit set in the high-limit control 298, the first switch remains closed, and the heaters 16, 16' are controlled by the process control 296 in the controller 20 based on temperature signals from the second temperature sensor 52 in the master heater 16, which can be, for example, a thermocouple or thermistor. As shown in FIG. 28, the signals from the second temperature sensor 52 are fed by the low voltage wires 58, 60 in the heater 16 and by a low voltage wire pair through the slave adapter cable 22 (FIG. 15) to an amplifier 306 in the controller 20, where they are conditioned and amplified for use by the process control 296.

Figure 32:
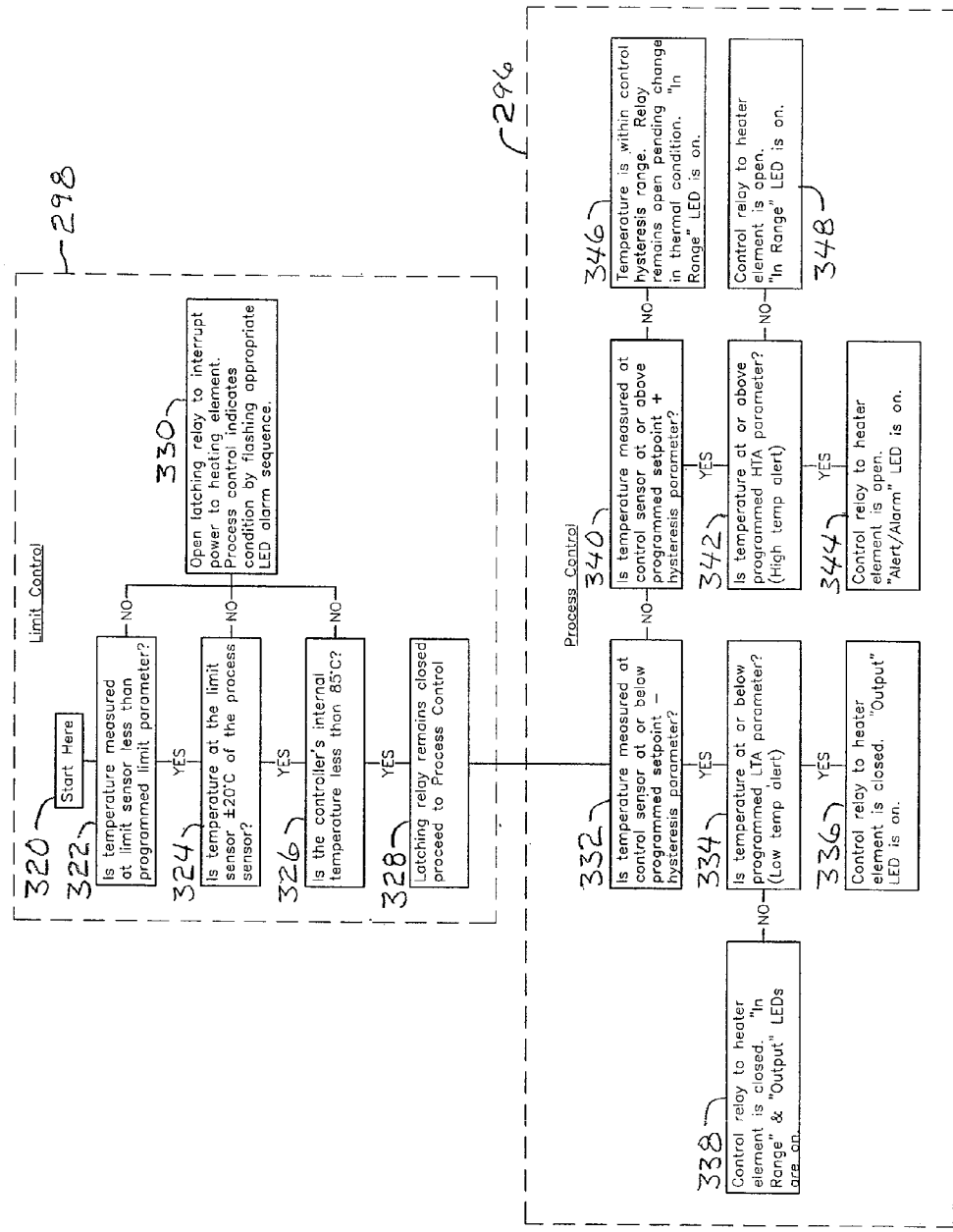
FIG. 32 is a logic flow diagram illustrating an example logic for the heater controller.

Essentially, the process control 296 operates the second power switch assembly 302 to turn on and off the high voltage AC power to the heaters 16, 16' in order to maintain the temperature sensed by the second temperature sensor 52 within a predetermined range that is set in the process control 296, as is shown in more detail in FIG. 32. The switch assembly 302 in the example embodiment illustrated in FIG. 28 comprises two switches, e.g., a mechanical relay switch 303 and a solid state triac switch 305, in parallel to minimize arcing and heat. The triac 305 turns on just before, e.g., about 20 milliseconds before, the relay switch 303 closes to minimize arcing in the relay switch 303 during the initial closing of the contacts in the mechanical relay switch 303. The triac 305 then turns off, e.g., about 20 milliseconds after the mechanical relay switch is closed, i.e., to avoid heat production in the triac 305 while the relay switch 303 is closed and conducting the controlled AC power to the heaters 16, 16'. Then, the triac 305 turns on again just before the relay switch 303 opens to minimize arcing in the relay switch 303 as it opens. These functions are controlled by the process control circuit 296, as is understood by persons skilled in the art. Mechanical relay switches and triac power switches are readily available commercially in many sizes and configurations from numerous manufacturers, as is well-known by persons skilled in the art.

The process control 296 also provides a number of other functions shown in more detail in FIG. 32, including, but not limited to, processing information to operate the display of, for example, green, amber, and red LED light displays 240, 242, 244, communicating information back and forth between the expansion module 202 and the base module 200, and receiving signals from the high-limit control for processing for displays and output relating to the status of the first switch 300. The process control circuit can also comprise an ATmega168 manufactured by Amtel Corporation, although myriad other microprocessors that could also serve these and other functions are well known and readily available to persons skilled in the art.

One of the functions provided by the process control 296 is processing temperature input information for producing temperature range signals (sometimes also called "alert/alarm signals") to be delivered to a remote monitoring location to confirm that the heater or heaters 16 are operating within a desired temperature range. This function can serve a number of uses. For example, if the heater temperature is outside of a certain desired operating range, which may or may not be related to the high temperature limit discussed above, this electronic temperature range signal can be used to trigger a mechanism (FIG. 27) for equipment interlock, i.e., preventing or interrupting an industrial process that depends on the heaters 16 operating properly to maintain the heat within a particular temperature range. Another use for such an electronic temperature range signal may be to generate a notice or alarm function for operators at a remote location to notify them that a heater or group of heaters is outside of a desired operating range, i.e., either too cold or too hot. Of course, the uses for such an electronic temperature range or "out-of-range" signal are not limited to these examples.

To implement an electronic temperature range signal (also called "alert/alarm signal") in this invention, an electronic relay device 310, which can be operated by the process control 296, is provided in the controller 20. A desired temperature range for the heater 16, either factory-preset or user determined, is programmed into the process control 296. The range can be set in absolute degrees or upper and lower limits, or it can be in incremental values around some operating temperature setting that can be either fixed or floating, depending on the operator's requirements.

A low voltage, such as thirty (30) volts or less, supplied by a remote monitoring device 15 (FIG. 27), is delivered to the controller 20 via the low voltage wires 98, 100 and/or 102, 104 provided in the T-type source power cable sections 26 and/or via the low voltage wires 118, 120 in a terminated source power cable section 106, as explained above and shown in FIGS. 10-13, depending on whether the controller 20 is or is not either the last controller 20 in a daisy chained series of controller 20 or the only controller 20 in a system.

Figure 13:
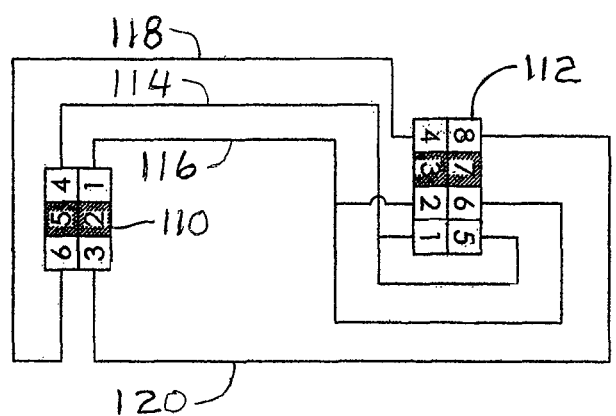
FIG. 13 is a schematic circuit diagram of the linear-type terminal source power cable section of FIG. 12.
Figure 29:
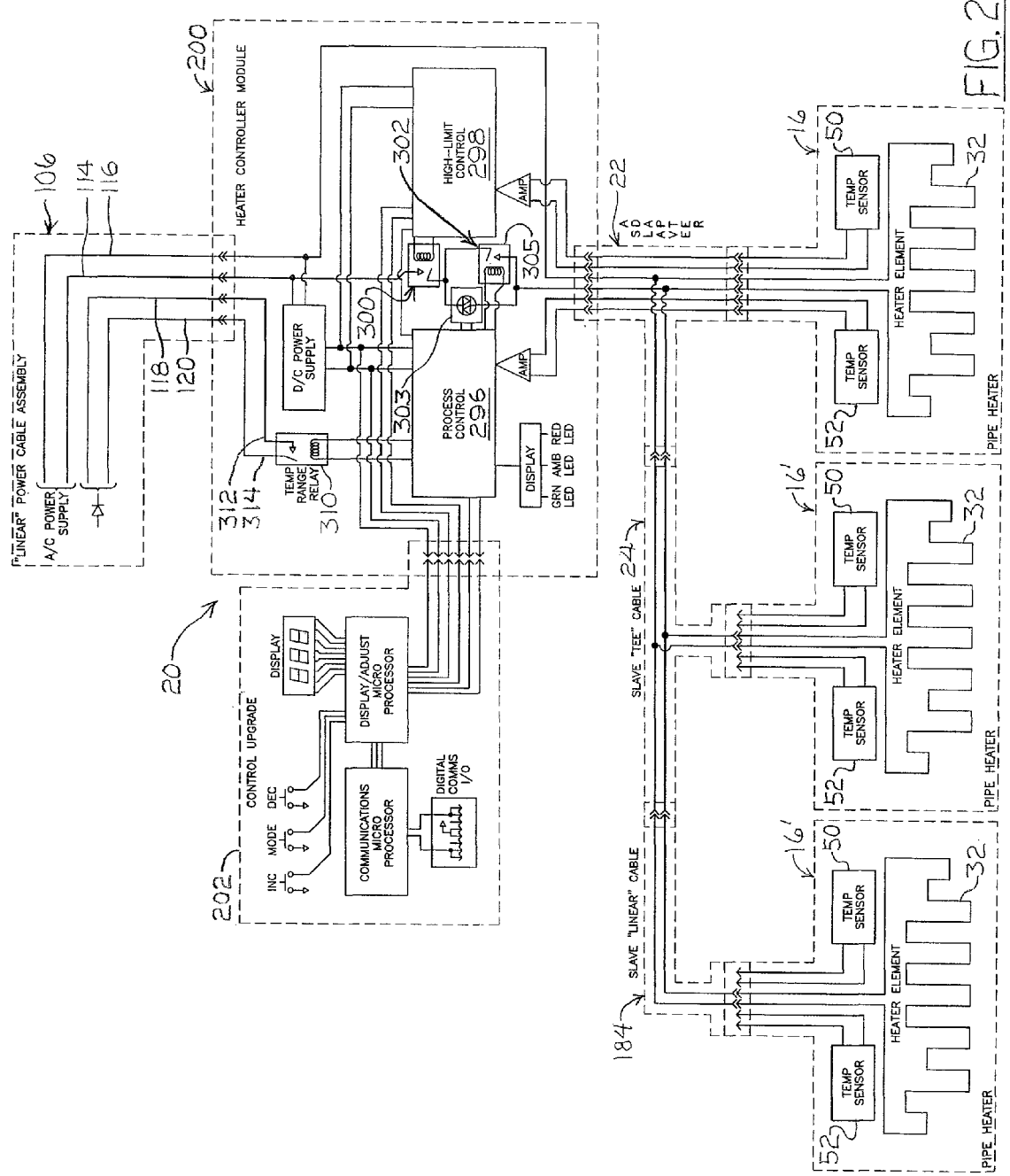
FIG. 29 is a schematic circuit diagram similar to FIG. 28, but with the controller connected to a terminal source power cable section.

In the controller 20, one of the low voltage signal conductors is routed through the relay device 310, as shown by the traces 312, 314 in FIG. 28, before it is routed back into the T-type source power cable 26 or terminated source power cable 106 (not shown in FIG. 28—see FIGS. 12-13). A remote monitor device (FIG. 27) at the remote location 15 is connected to the low voltage wires 98, 100 and/or 102, 104 in the T-type source power cable 26 and/or 118, 120 in the terminated source power cable 106 for monitoring the voltage and/or current on these low voltage wires. For example, if all the relay devices 310 in all the controllers 20 connected to the remote monitoring device at 15 via one or more of the T-type source power cables 26 or the terminating source power cable 106 are closed, then a current will flow and/or the voltage will drop. On the other hand, if any one of the relay devices 310 in any of the controllers 20 is open, no current will flow in the low voltage lines in any of the source power cables 26, 106 and/or the voltage will be the highest, i.e., the open circuit voltage that is applied to the low voltage wires by the remote monitoring device 15. Such voltage and/or current conditions are monitored by the continuity detector 31 in the remote monitoring station 15, which can thereby detect whether all the relay devices 310 of all the controllers are closed, thus indicating that all of the heaters 16 are operating within the desired temperature range (closed signal circuit condition), or it can show that at least one of the heaters 16 is not operating within the desired temperature range (open signal circuit condition). Therefore, it becomes apparent from this description why the last or only controller 20 in a daisy chain connected series has to be connected to the remote monitoring device via terminated control power cable 106, as shown in FIGS. 12-13, and not with a T-type source power cable 26, as shown in FIGS. 10-11 and 28. Specifically, if there is no controller 20 connected to the last T-type source power cable 26, the low voltage signal circuit will always be open at the unconnected connector 112, e.g., unconnected wires 102, 104 in FIG. 28, thus falsely indicating a heater 16 operating outside the desired range. The linear-type terminated source power cable 106 prevents that problem, as shown in FIG. 29.

In summary, each controller 20 in a series that is daisy chain connected with the T-type source power cables 26 and the last controller 20 in the series that is connected with the terminated source power cable 106, has programmed in it a desired temperature operating range. As long as the control process 296 of a controller 20 determines that its temperature sensor 52 or both temperature sensors 50, 52 do not indicate a temperature outside the desired temperature range, the control process circuit 296 keeps the relay device 310 closed. However, if the controller 20 determines from the sensed temperature information that the heater 16 is not operating within the desired temperature range, it will open the relay device 310, thereby opening the low voltage signal circuit, which is detectable by the continuity detector 31 at the remote monitoring location 15 (FIG. 27). In response, the signal from the continuity detector 31 can then trigger some alarm, notice, and/or control or interlock signal for whatever purpose is desired, as discussed above.

As also discussed above and as can be seen in FIG. 28, the temperature sensors 50, 52 in the master heater 16 are connected to the controller 20 by the slave adapter cable 22, and the controller 20 uses signals from those temperature sensors 50, 52 in master heater 16 in the process described. However, even though the slave heaters 16' are identical in structure to the master heater 16 in some embodiments, including having the same temperature sensors 50, 52, those temperature sensors 50, 52 of the slave heater 16' are not connected to the controller 20. With no low voltage wires in the slave cable segment 128 of the slave adapter cable 22, and no low voltage conductors in either the T-type slaved heater cable 24 or the terminated controlled power slave cable 184, the controller 20 does not get any temperature signals from the sensors 50, 52 in the slave heaters 16', which is what makes them function as slave heaters 16'. Whatever the controller 20 determines to do, whether it is turning on and off the high voltage power, operating the temperature range relay 310, or other functions based on heater temperature, it is based on the temperatures sensed by the sensors 50, 52 in the master heater 16.

As mentioned above, all of the parameters needed by the high-limit control 298 and the process control 296 to operate as described can be preprogrammed or preset into the process control 296 and the high-limit control 298, which is built in the base module 200 of the controller 20. However, if more control, functionality, monitoring, or other capabilities are desired, such additional control functionality, monitoring or other capabilities can be provided in the expansion module 202 that attaches to the base module 200 (FIGS. 20-22) as explained above. The example expansion module 202 shown schematically in FIG. 28 includes a display/adjust microprocessor 316, an alpha-numeric display 204, user interface buttons 210, 212, 214, digital communications input/output portals 222, 224, and a communications microprocessor 318. The display/adjust microprocessor 316 can also be an Atmega168 manufactured by Amtel Corporation, although myriad other microprocessor circuits can also be used.

The display/adjust microprocessor 316 is connected to the user interface buttons 210, 212, 214, which can be used to retrieve and reset various parameters and information, which the display/adjust microprocessor 316 gets from, and inputs to, the process control 296 and/or the high-limit control 298, which it also sends to the display 204. Such information that can be retrieved, displayed, and reset with the microprocessor 316 can include, but is not limited to, desired operating temperature set point, high temperature safety limit, high temperature alert set point, low temperature alert set point, hysteresis, output PID (proportional band, integral, and deviation), cycle time, ambient temperature (read only), modbus device address, modbus band rate, and temperature units (Celsius or Fahrenheit). Other read only information such as base release version, base build number, interface release version, interface prototype version, and interface build number can also be retrieved and displayed.

The communications microprocessor 318 enables external data communications with a remote monitoring or control station, service computers, and the like to input and output information, make adjustments, modify programming, and the like, via the input/output ports 222, 224. The communications microprocessor 318 can be, for example, a MAX3157 manufactured by Maxim Integrated Products, Sunnyvale, Calif., which has a transmitter and a receiver, although myriad other microprocessors could also be used for this function, as is known by persons skilled in the art.

Figure 30:
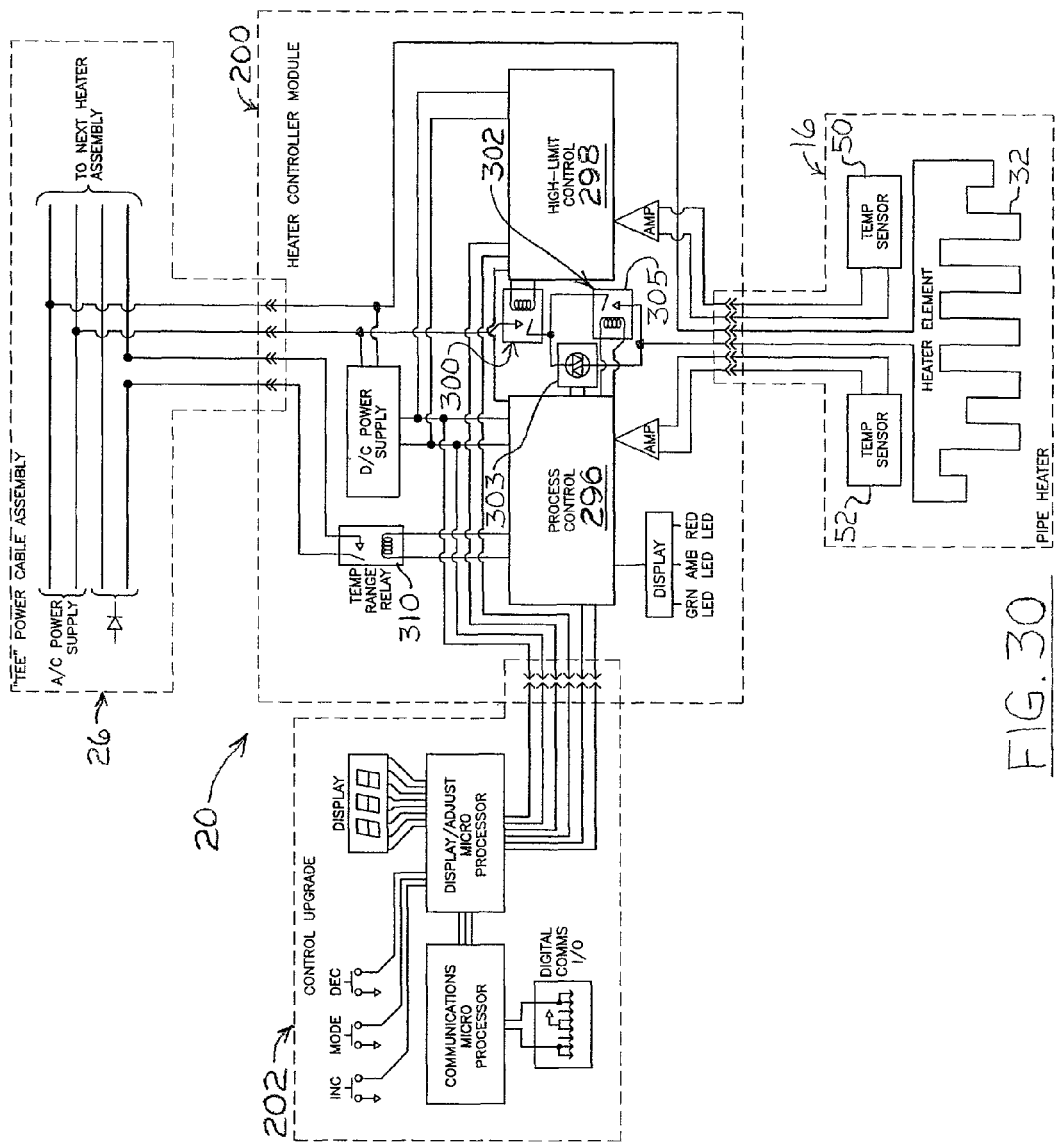
FIG. 30 is a schematic circuit diagram of the heater controller base unit with the enhanced control expansion module, the T-type source power cable, and the pipe heater components connected directly to the heater controller base unit as could be done for a single pipe heater or for multiple local control configurations such as those illustrated in FIGS. 1-4.

The schematic circuit diagram in FIG. 30 illustrates a heater 16 connected directly to a controller 20, as is done in the multiple local heater control configuration of FIGS. 1-4. All of the connections and functionalities described for the controller 20, base module 200, process control 296, high-limit control 298, first switch 300, second switch 302, temperature range relay 310, heater 16, temperature sensors 50, 52, heating element 32, expansion module 202 and other components are the same as explained above for FIG. 28, except that heater 16 is connected directly to the controller 20. Therefore, there is no slave adapter cable in this configuration, thus no slave heaters.

Figure 31:
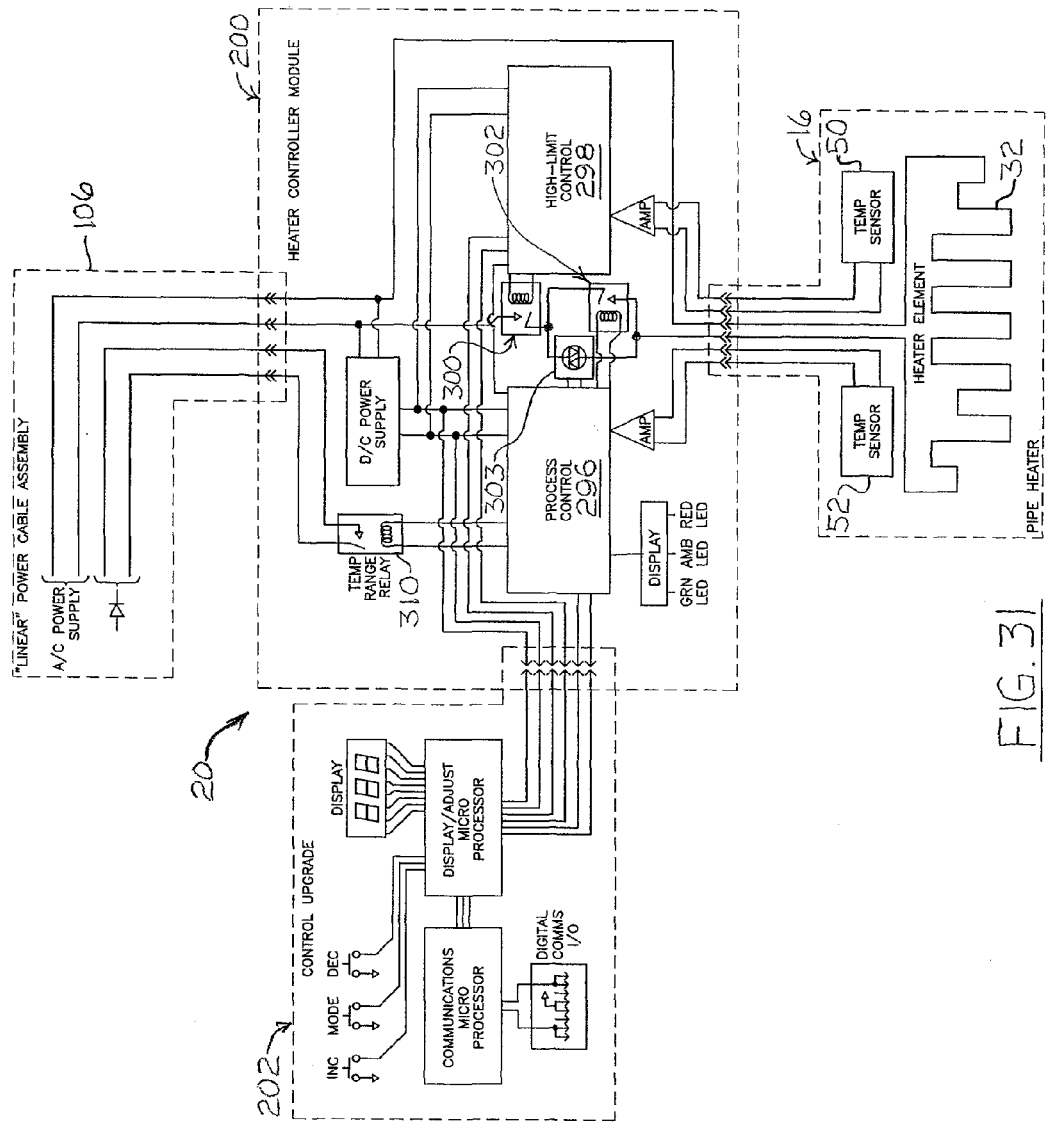
FIG. 31 is a schematic circuit diagram similar to FIG. 30, but with the high voltage power and the low voltage signal circuit connected to the controller directly with a terminated controlled power cable to illustrate an individual heater control arrangement where the heater is either the only heater or the last heater being controlled in a series of multiple, individually controlled heaters.

The schematic circuit diagram in FIG. 31 is also for a controller 20 connected directly to a heater 16, thus no slave adapter cable and no slave heaters. Therefore, the circuit in FIG. 31 is the same as the circuit in FIG. 30, except that it is either the last controller 20 in a series or the only controller 20, so it has the terminated source power cable 106 instead of the T-type source power cable 26 for supplying the high voltage source power and the low voltage electronic temperature range circuit to that controller 20 shown in FIG. 31.

An example operating logic for implementing the present invention is shown in FIG. 32. The logic as well as the values and parameters in FIG. 32 and used in this description are examples and not intended to be limiting. The illustrated logic starts in the upper-limit control 298. From start 320, a temperature measurement is taken from the first (high-limit) temperature sensor 50 at 322 and compared to the upper temperature limit parameter. If the actual measured temperature from the high-limit temperature sensor 50 is less than the high-limit parameter in step 322, then the next step 324 tests whether that actual temperature from sensor 50 is within 20° C. of the second (process) temperature sensor 52. This comparison 324 is done as a test to determine if the temperature sensors 50, 52 are measuring reasonably accurate in relation to each other. If yes, then the temperature of the controller itself is measured at 326 to be sure it is not overheated, i.e., is less than 85° C. Overheating could occur, for example, if the controller 20 is too close to the heater 16, and it could damage the electronic components in the controller 20. If the controller 20 is found at 326 to not be overheated, then the high-limit control 298 keeps the relay switch 300 closed, as indicated at 328, so that the high voltage AC power remains available for control by the process control 296 to power the heater(s) 16, 16'.

On the other hand, if any of the tests at 322, 324, 326 are negative, i.e., the sensed temperature is over the high temperature limit, then the high-limit control 298 opens the relay switch 300 at 330, which interrupts the AC power to the heater(s) 16, 16'. It also sends a signal to the process control 296 that indicates the relay switch 300 is opened, and, in response, the process control 296 activates an alarm signal and/or flashes the appropriate (red) LED 240.

Continuing with the process control 296, a temperature measurement from the second (process) temperature sensor 52 is compared at 332 with the programmed set point (desired operating temperature) minus the set hysteresis parameter (e.g., about 3° C.). If the actual process temperature measured by the process sensor 52 is at or below the set point minus hysteresis, then the actual temperature is compared at 334 to the programmed low temperature alert (LTA) parameter, i.e., to see whether the temperature is below the desired operating range. If the temperature is at or below the LTA (e.g., about 20° C. below the set point temperature), then the process control 296 closes the second (process) switch 302 at 336 to provide AC power to the heater(s) 16, 16', and it turns on the output LED 244 (e.g., green) to indicate that the heater(s) 16, 16' are turned on. On the other hand, if the temperature at 334 is not at or below the low temperature alert (LTA) parameter, then the process switch (relay) 302 is closed as indicated at 338, but the LED 242 (e.g., amber) is turned on to indicate that the actual process temperature is in the proper operating range.

If the comparison at 332 shows that the actual process temperature measured by the process temperature sensor 52 is not at or below the set point minus the hysteresis, then the temperature is checked at 340 to see if it is at or above the set point plus the hysteresis parameter. If it is, then the temperature is checked at 342 to see if it is at or above the programmed high temperature alert (HTA) parameter (e.g., about 20° C. above the set point temperature). If so, then the control relay switch 302 is opened at 344 to turn off the AC power to the heater(s) 16, 16', and the "Alert/Alarm" LED (red) 240 is turned on.

On the other hand, if the temperature at 340 is not at or above set point plus hysteresis, then the temperature is within the control hysteresis range, so the control relay switch 302 is kept open at 346 pending changes in the thermal condition, and the "In Range" LED is turned on or left on.

If the temperature from the process temperature sensor 52 is not found at 342 to be at or above the programmed HTA parameter, then the control relay switch 302 is open, as indicated at 348, and the "In Range" LED is on.

These and other functions are shown in the example drawings and described above as being performed by several control processors, e.g., 296, 298, 316, 318. However, these functions and others can be performed by one or more processors in various combinations and with various allocations of the functions among one or more microprocessors, as is understood by persons skilled in the art. Therefore, there can be more or fewer processors than shown in the drawings to perform these example functions.

Figure 33:
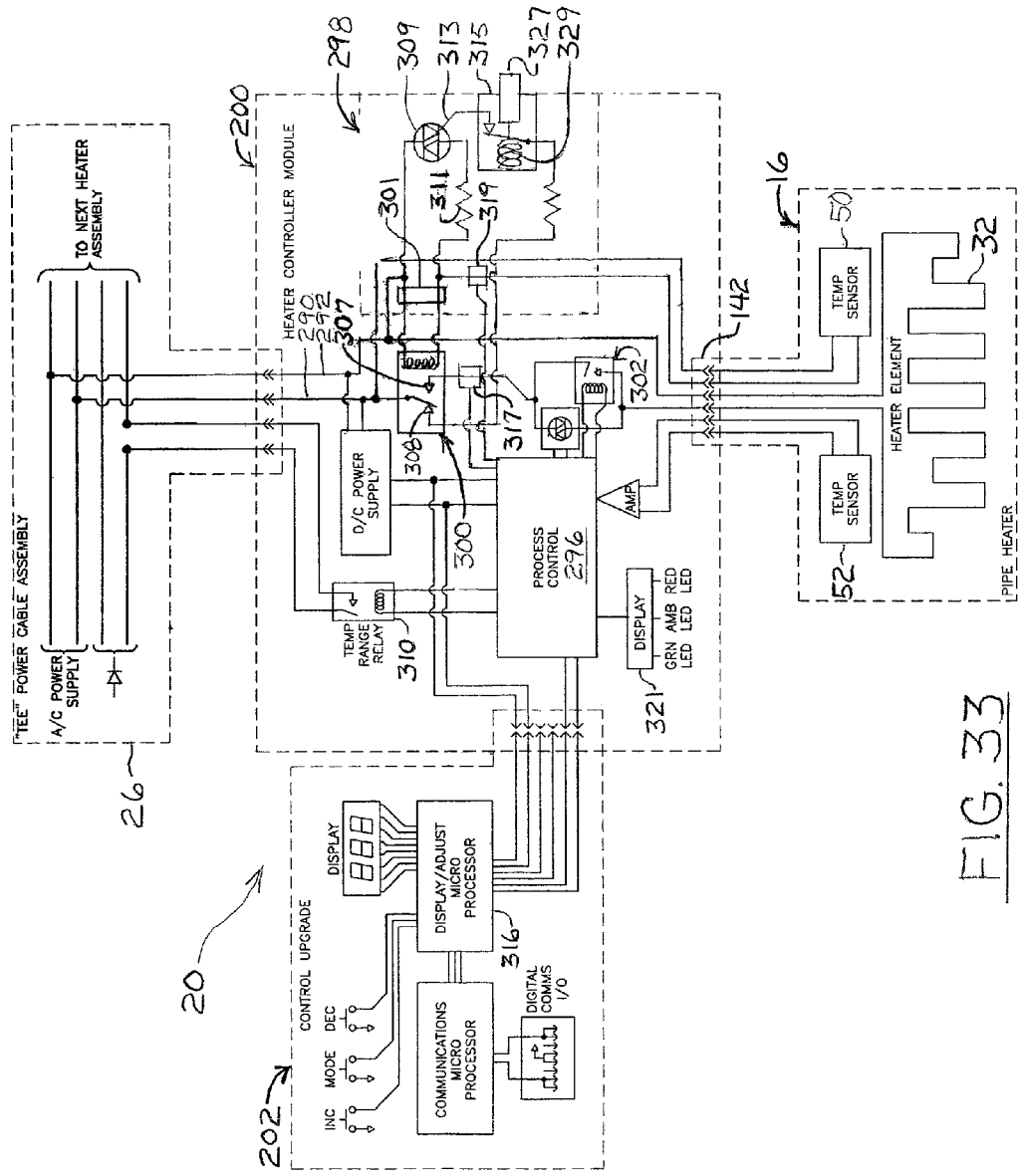
FIG. 33 is a schematic circuit diagram of an individual heater control arrangement similar to FIG. 30, but illustrating an example high-limit control circuit with a PTC thermistor temperature sensor.

Another example implementation of the high-limit control circuit 298 is illustrated in FIG. 33, wherein a switching positive temperature coefficient (PTC) thermistor semiconductor device is used for the upper-limit temperature sensor 50. Switching PTC thermistors are semiconductor devices that exhibit a very small negative temperature coefficient of resistance until the device reaches a critical temperature, often referred to as the switch or transition temperature, whereupon the device exhibits a sharp rise in the temperature coefficient of resistance as well as a large increase in resistance, e.g., a resistance change of as much as several orders of magnitude within a temperature span of a few degrees. Such switching PTC thermistors are readily available commercially with transition temperatures in ranges from 60° C. to 160° C. and can be manufactured with transition or switch temperatures at least as low as 0° C. and at least as high as 200° C. With the switching function inherent in the switching PTC thermistor device used as the high-limit temperature sensor 50, the high-limit control circuit 298 can be analog, as shown in FIG. 33, and still provide the desired features and functions of the normally open mechanical relay high-limit power switch 300 to open and shut off the AC power to the heater(s), whenever the heater temperature equals or exceeds an upper temperature limit and then not close and turn on the AC power again without an operator intervention or manual input when the heater temperature recedes below the upper temperature limit.

As shown in FIG. 33, the PTC thermistor temperature sensor 50 is positioned in the heater 16 adjacent the AC powered heating element 32 in order to sense temperatures caused by the heat produced by the heating element 32 as described above for the upper-limit temperature sensor 50 in previously described example implementations shown in FIGS. 9 and 27-30. The high-limit mechanical relay switch 300 is also positioned in the AC power circuit in the controller 20 to open and close at least one of the AC power conductors, e.g., the AC power conductor 290, as also described above and shown in FIGS. 27-30, so that it shuts off the AC power to the heater 16 when the normally open contact 307 is closed and turns off the AC power to the heater 16 when the normally open contact 307 is open. The other AC power conductor 292 passes through the controller 20 to the outlet connector 142, where it connects with the switched AC power conductor 290 to the heater 16, as described above.

The switching PTC thermistor used as the high-limit temperature sensor 50 is connected in series with a rectifier circuit 301 that powers the coil of the relay switch 300 so that current has to flow through the switching PTC thermistor of the temperature sensor 50 in order to power the coil to close the normally open contact 307 of the relay switch 300, i.e., to turn on the AC power to the heater 16. Therefore, in normal temperature operation, i.e., when the temperature sensor 50 is under the upper temperature limit, which is set by the switching or transition temperature of the PTC thermistor of the temperature sensor 50, the PTC thermistor has a low resistance that easily conducts enough AC current that, when rectified, flows through the coil of the relay switch 300 to create the magnetic field required to close the contact 307. Consequently, in such normal temperature operation, the AC power circuit in the controller 20, comprising the AC power conductors 290, 292, is closed and can conduct AC power to the heater 16, subject, of course, to the closed or open status of the process relay switch arrangement 302, as described above. However, if the temperature of the switching PTC thermistor of the high-limit temperature sensor 50 rises to or exceeds its switching or transition temperature, its resistance increases sharply and effectively turns off the rectified current to the coil of the relay switch 300, thereby allowing the normally open contacts 307 to open and the normally closed contacts 308 to close. Consequently, the open contacts 307 opens the AC power circuit of AC conductors 290, 292, thereby turning off the AC power to the heater 16. Rectifier circuits, for example, full-wave bridge rectifier circuits, are well known to persons skilled in the art, thus need no further description for an understanding of this circuit.

Then, when the temperature of the PTC thermistor of the upper limit temperature sensor 50 recedes back down to a temperature below the high temperature limit, i.e., below the switching or transition temperature of the PTC thermistor, and the current then again flows through the PTC thermistor, the high-limit control circuit 298 still prevents the coil of the relay 300 from re-closing the contacts 307 to turn the AC power back on to the heater 16 until there is an operator intervention. In the example upper-limit control circuit 298 shown in FIG. 33, there is a drain circuit comprising a switch 309, e.g., a triac as shown in FIG. 33 or other solid state or mechanical relay switch, and a drain resistor 311 connected parallel to the rectifier circuit 301 and coil of the relay switch 300. The drain resistor 311 has much less impedance than the coil of the relay switch 300, for example, an order of magnitude less, so that when the triac or other relay switch 309 is turned on, the current that flows through the PTC thermistor of the temperature sensor 50 is drained away from the rectifier 301 and coil of the relay 300, which prevents the coil from generating the electromagnetic field that is necessary to close the contacts 307 in the relay switch 300.

The triac 309 is turned on by AC current that flows through the relay switch 300, which is applied to the gate 313 of the triac 309 via the normally closed contacts 308 of the relay switch 300. Therefore, when the PTC thermistor of the temperature sensor 50 turns off the rectified current to the coil of the relay switch 300 upon the occurrence of a high temperature event at the heater 16, the normally open contacts 307 in the relay switch 300 open to turn off the AC power to the heater 16, as described above, and the normally closed contacts 308 close, as shown in FIG. 33, to apply the AC power to the gate 313 of the triac 309 to activate (close) the drain circuit. Consequently, when the temperature at the heater 16 recedes so that the temperature of the PTC thermistor of the temperature sensor 50 falls below its switching or transition temperature and again conducts current, the current is diverted away from the coil of the relay switch 300 and is instead drained through the drain resistor 311. With the current conducted by the PTC thermistor being drained away from the coil of the relay switch 300, the coil cannot create the electromagnetic field required to close the normally open contacts 307, so the AC power to the heater 16 remains turned off, even though the temperature at the PTC thermistor of the temperature sensor 50 has receded, and it is again conducting electric current.

To turn the AC power back on to the heater 16, therefore, a manually operated switch 315 is provided to break or open the gate power circuit and thereby to turn off the triac 309. As soon as the triac 309 is turned off by the manually operated switch 315, the drain circuit through the drain resistor 311 is deactivated, so the current from the PTC thermistor of the temperature sensor 50 again is rectified by the rectifier circuit 301 and flows through the coil of the relay switch 300. Therefore, the coil creates the electromagnetic field required to open the contacts 308 and to close the contacts 307 to thereby reactivate the AC power to the heater 16 and to remove the AC power from the gate circuit. Consequently, when the manually operated switch 315 returns to the closed mode, the triac 309 does not turn back on, because the current from the PTC thermistor keeps the contacts 308 open as long as the temperature at the temperature sensor 50 remains below the switching or transition temperature of the PTC thermistor. For the reasons described above, therefore, the provision of the drain circuit, which is disabled by the manually operated switch 315, an operator intervention, i.e., to operate the switch 315, is required to reactivate AC power to the heater 16 after it has been turned off due to a high temperature event in the heater 16 that equals or exceeds the switching or transition temperature of the PTC thermistor of the high-limit temperature sensor 50.

It should be noted that it is primarily heat from an external source, e.g., heat from the heating element 32 or from hot purge or other gases or liquids in the pipe itself, that causes the temperature of the PTC thermistor in this example implementation to rise to its switching or transition temperature to turn off the AC power to the heater 16. In contrast, temperature rises in PTC thermistors used in conventional thermal fuse or thermal circuit breaker applications are caused primarily by $I^2R$ heat generated internally in the PTC thermistors. In other words, PTC thermistors have inherent resistance (R) to current flow (I), and excessive current (I) flow in the PTC thermistor will cause substantial heat production in the PTC thermistor itself, and, if the temperature reaches the transition or switching temperature, the PTC thermistor will substantially shut off current flow.

Any of a variety of status signals from the high-limit circuit 298 can be provided to the process control circuit 296 for use in generating status and/or alert/alarm signals, or for use in process logic, and the like. For example, but not for limitation, a sensor 317, such as a current detector, can be used to indicate that the relay switch 300 is activated to provide AC power to the heater 16 or deactivated to shut off AC power to the heater 16. Also, for example, but not for limitation, a sensor 319, such as a current detector, can be used to indicate whether the temperature at the high-limit temperature sensor 50 is either (i) below the switching or transition temperature of the PTC thermistor, i.e., current is detected, or (ii) at or above the switching or transition temperature of the PTC thermistor, i.e., current is not detected. These and other status signals can be used by the process control circuit 296, for example, to generate status and/or alert/alarm signals to the LED display 321 and/or to the display/adjust microprocessor 316.

Figure 34:
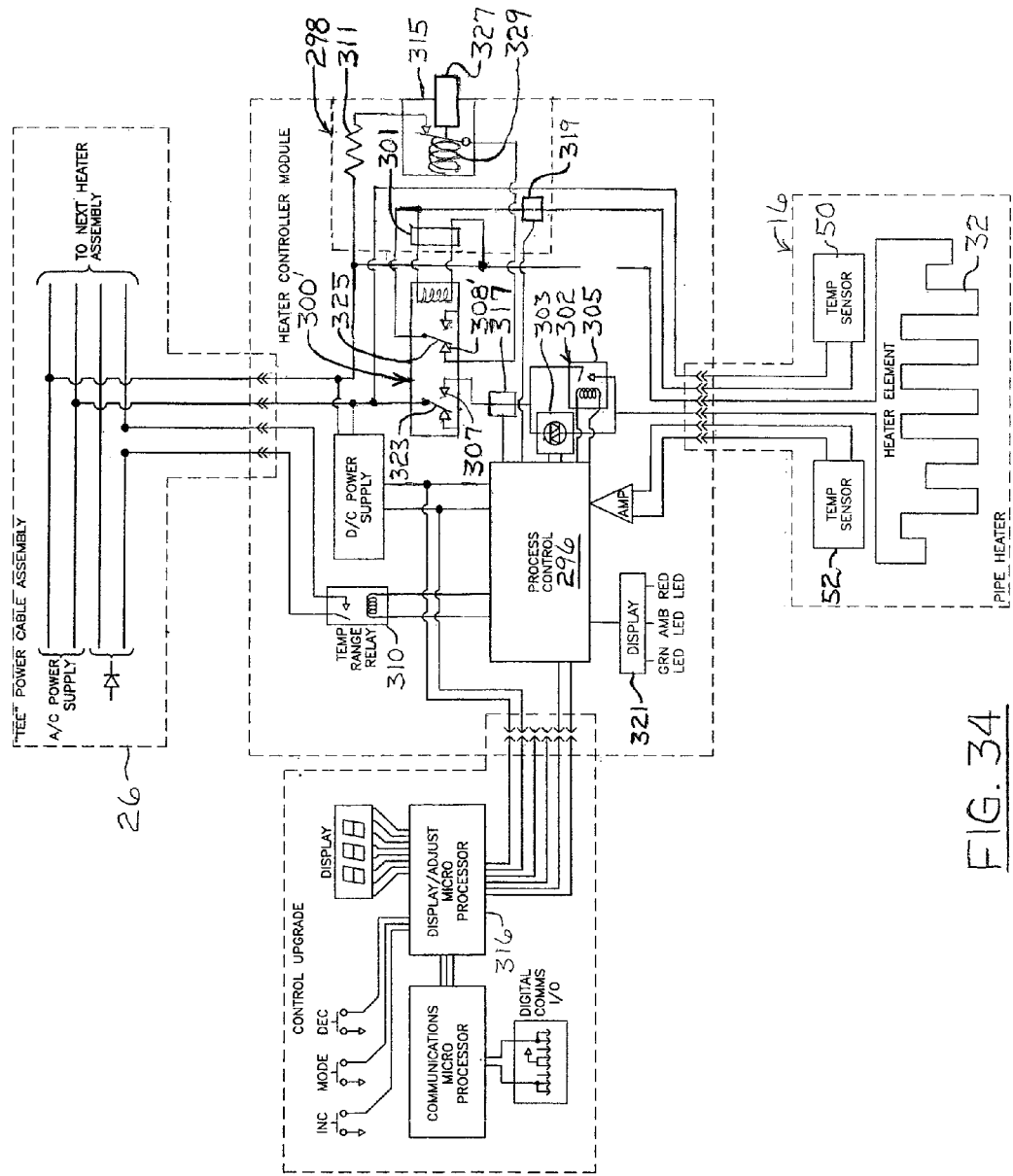
FIG. 34 is a schematic circuit diagram similar to FIG. 33, but with another example high-limit control circuit with a PTC thermistor temperature sensor.
Figure 35:
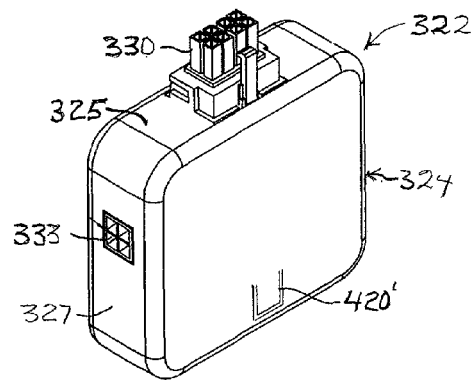
FIG. 35 is an isometric view of a slave adapter junction box.
Figure 36:
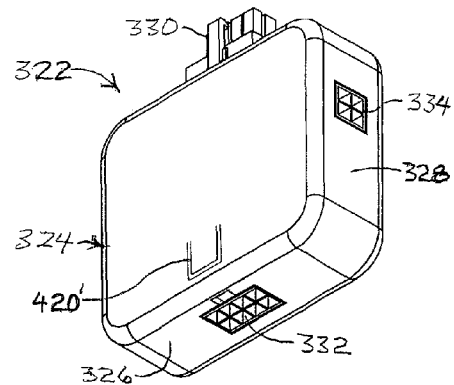
FIG. 36 is an isometric view of the slave adapter junction box of FIG. 35, but from a different perspective.

Another example implementation of the high-limit control circuit 298 utilizing a PTC thermistor for the high-limit temperature sensor 50 is shown schematically in FIG. 34. In this example implementation, the triac 309 of the FIG. 33 example is replaced by a second switch mechanism 325 in the relay switch 300', which is normally closed and is activated by the same coil that activates the first or primary switch mechanism 323 of the relay switch 300'. This second switch 325 could also be provided by a separate relay switch (not shown), but dual switch relays, such as the dual switch relay 300' shown schematically in FIG. 34 are readily available and more compact than two separate relay switches. In this FIG. 34 example, the relay switch is labeled 300' instead of 300, not for limitation, but only to distinguish this example relay switch 300' from the previously described relay switch 300. In other words, while the primary function of both of these example relay switches 300, 300' is to turn the AC power to the heaters off if there is a high temperature event, the relay switch 300' has the additional second switch 325 for the drain circuit in this implementation.

In the FIG. 34 example, the contact 307 of first switch 323 in the relay 300', which turns on and off the AC power to the heater 16, is normally open, as is the contact 307 of the FIG. 33 example, so current has to flow through the coil of the relay 300' to close the contact 307 so that the AC power can be provided to the heater 16, subject, of course, to the opening and closing of the process switch assembly 302 as described above. The coil of the relay 300' is powered by rectified current derived by the rectifier 301 from AC current that flows through the PTC thermistor of the high-limit temperature sensor 50 whenever the temperature of the PTC thermistor is below its switching or transition temperature, which defines the upper temperature limit. However, if the temperature at the temperature sensor 50 reaches or exceeds the switching or transition temperature of the PTC thermistor, the current flow through the PTC thermistor, thus also the rectified current through the coil of the relay 300', is stopped. With no current flow through the coil, the normally open first switch 323 opens the contacts 307, thereby turning off the AC power to the heater 16, and the normally closed second switch 325 closes the contacts 308', thereby closing or activating the drain circuit comprising the drain resistor 311.

When the temperature at the temperature sensor 50 recedes below the switching or transition temperature of the PTC thermistor so that it again conducts electric current, the closed drain circuit drains the current through the drain resistor 311, thereby depriving the coil of the relay 300' of the current required to re-close the AC power (first) switch 323. Again, as mentioned above, the drain resistor 311 has much smaller resistance than the coil, so, when the drain circuit is closed, the current will flow preferentially through the drain circuit instead of through the coil, which is connected electrically in parallel to the drain circuit. Therefore, even though the temperature at the temperature sensor 50 has receded below the upper temperature limit, the drain circuit prevents the relay 300' from providing AC power to the heater 16.

To restore AC power to the heater 16, an operator can open the drain circuit with the manually operated switch 315. By even momentarily opening the manually operated switch 315, the drain circuit is deactivated, so rectified current is restored to the coil of the relay 300'. With current flowing again through the coil, the contacts of the first switch 323 close to turn on the AC power to the heater 16, and the contacts of the second switch 325 open to disable the drain circuit. Therefore, when the manually operated switch 315 closes again, the drain circuit stays deactivated.

The manually operated switch 315 can be any of a variety of switch types, but the normally closed, push button switch illustrated schematically in FIGS. 33 and 34 is a convenient example switch type for this application. Depression of the button 327 causes the switch 315 to momentarily open. Then, when manual force is removed from the button 327, the spring 329 re-closes the switch.

Figure 37:
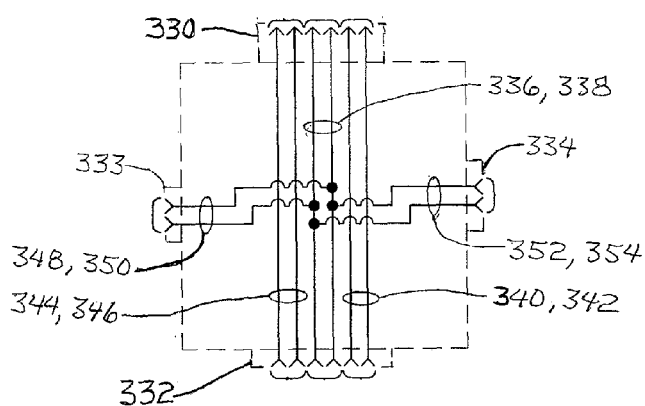
FIG. 37 is a schematic circuit diagram of the slave adapter junction box of FIGS. 35 and 36.

While the embodiments of the invention described above have the source power and signal circuit distributions made with cables sections, e.g., the T-type source power cable 26 with its branch 85 branching from the trunk 83 (FIG. 10), the slave cable adapter 22 with its slave cable segment 128 branching away from its master cable segment 126 (FIG. 14), and the T-type controlled power cable 24 with its branch 163 branching away from its trunk 161 (FIG. 16), these distributions can also be made with junction boxes. For example, but not for limitation, the function of the slave cable adapter 22 can also be provided by the slave adapter junction box 322 shown in FIGS. 35-37 and illustrated in use position in the schematic circuit diagram of FIG. 38 for a single point control system with two slave heater branches controlled by a single controller 20.

The slave adapter junction box 322 has a housing 324 with an inlet connector 330 and a master outlet connector 332 in opposite top and bottom walls 325, 326, of the housing 324 and two slave outlet connectors 333, 334 in opposite lateral side end walls 327, 328 of the housing 324. The inlet connector 330, like the inlet connector 130 of the slave adapter cable 22, is configured to mate with the outlet connector 142 of the controller 20 (FIG. 20). The master outlet connector 332, like the master outlet connector 132 of the slave adapter cable 22, is configured to mate with the heater input connector 64 on the heater cord 62 of a heater 16. Therefore, the pair of power conductor leads 336, 338 carry controlled power from the controller 20 to the master heater 16, while the two pairs of signal conductors 340, 342 and 344, 346 carry signals from the high-limit temperature sensor 50 and the process temperature sensor 52, respectively, to the controller 20.

The two slave outlet connectors 333, 334 of the slave adapter junction box 322 are configured the same as the slave outlet 134 of the slave adapter cable 22 so that they can mate with the inlet connectors 172 of the T-type slave controlled power cables 24 and the inlet connectors 190 of the linear-type terminating controlled power slave cables 194. One pair of power conductors 348, 350 connect the outlet connector 333 electrically in parallel to the controlled power conductors 336, 338, and another pair of power conductors 352, 354 connect the outlet connector 334 electrically in parallel to the controlled power conductors 336, 338.

Figure 38:
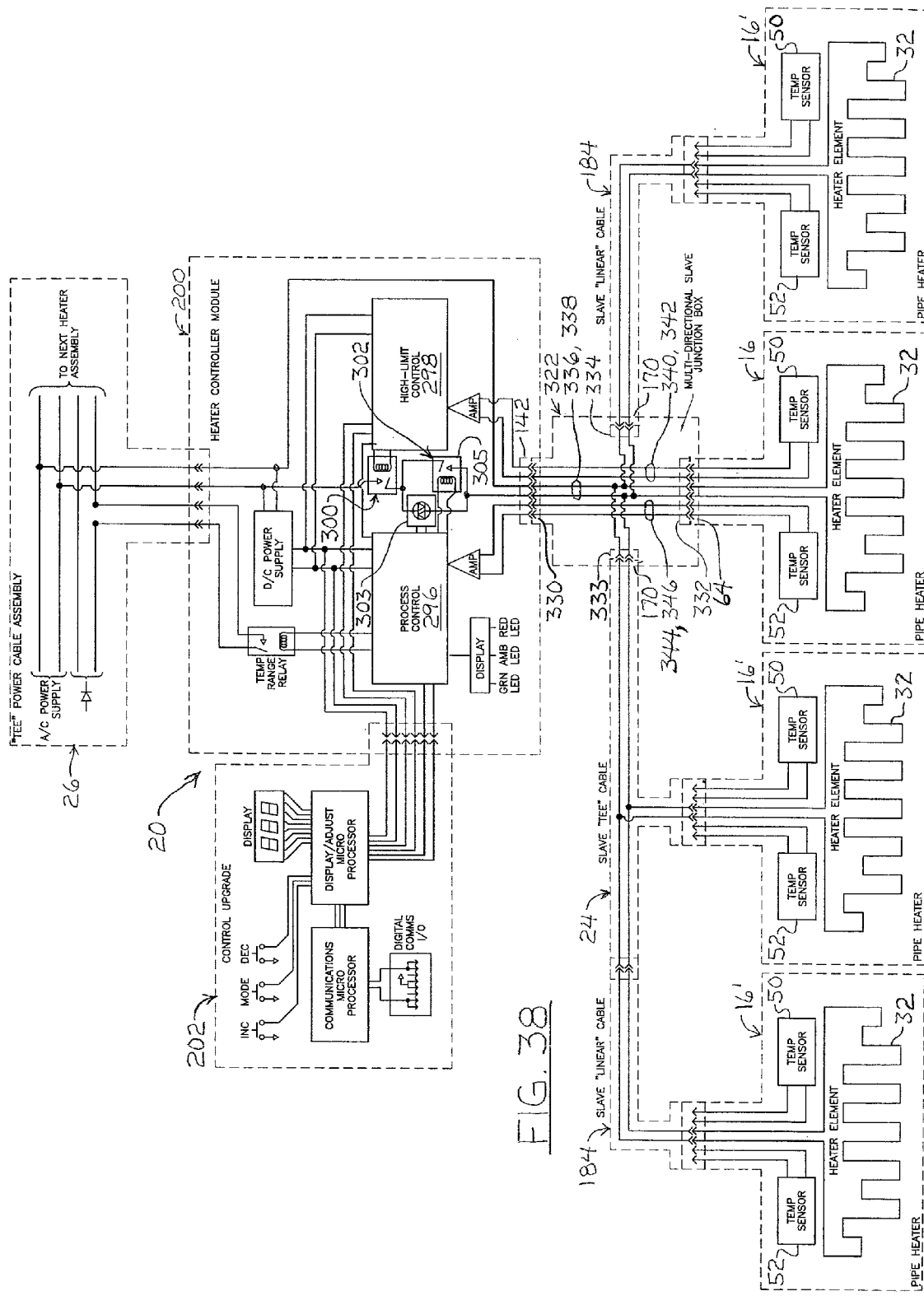
FIG. 38 is a schematic circuit diagram similar to FIG. 28, but with the slave adapter junction box of FIGS. 35-37 replacing the slave adapter cable illustrated in FIG. 28.

When the slave adapter junction box 322 is connected to the controller 20, as shown in FIG. 38, with one heater 16 connected to the master outlet connector 332 and other heaters 16' connected into the slave outlet connectors 333, 334, the slave adapter junction box enables the heater that is connected to the master outlet connector 332 to function as the master heater 16 and disables the temperature sensors 50, 52 of the heaters that are connected to the slave outlet connectors 333, 334 so that those heaters function as slave heaters 16'. Therefore, the controller receives temperature information from the master heater sensors 50, 52 and uses it to provide controlled power to the heating elements 32 of both the master heater 16 and the slave heaters 16'.

There can, of course, be more than two slave outlet connectors in the slave adapter junction box 322 to accommodate more than two daisy chain connected series of slave heaters. Also, while it is not shown in the drawings, split slave cables or additional junction boxes can be connected to the slave outlet connectors 333, 334 of the slave adapter junction box or to the slave outlet connector 134 of the slave adapter cable 22 to power additional daisy chain connected series of slave heaters 16' if desired or needed.

A source power junction box, for example, the source power junction box 350 shown in FIGS. 39-42, can be used in place of the T-type source power cable 26 in the assemblies shown in FIGS. 1-8. In the example source power junction box 350, a source power junction branch outlet connector 352 protrudes from the bottom surface 354 of the source power junction box 350 and is configured for mating connection to the inlet connector 140 of the controller 20 (FIGS. 20 and 21) so that the source power junction box 350 can be mounted directly on the controller 20 by plugging the source power junction branch outlet connector 352 to the inlet connector 140.

Figure 42:
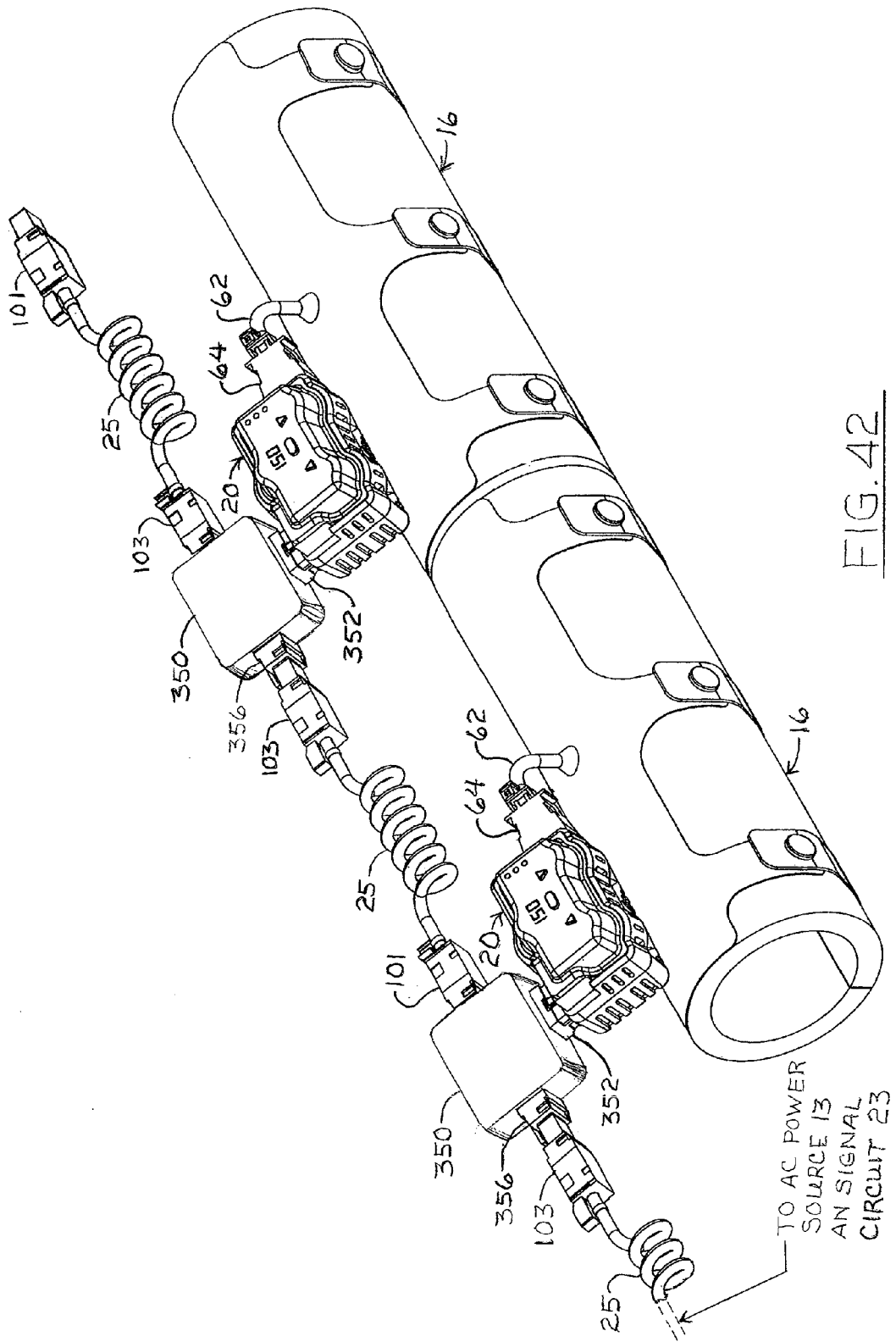
FIG. 42 is an isometric view of a plurality of the heater controllers as they are daisy chain connected with a plurality of the source power junction boxes of FIGS. 39 and 40.

A source power junction inlet connector 356 on a first lateral side surface 358 of the source power junction box 350 receives source power into the source power junction box 350 from, for example, a source power extension cable 25 as described above in relation to FIG. 27 and shown, for example, in FIG. 42. Therefore, the source power junction inlet connector 356 in FIGS. 39 and 40 can be configured the same as the inlet connector 82 of the T-type source power cable 26 for substitutable modular connectivity to the AC power source 13 (FIG. 27).

Figure 39:
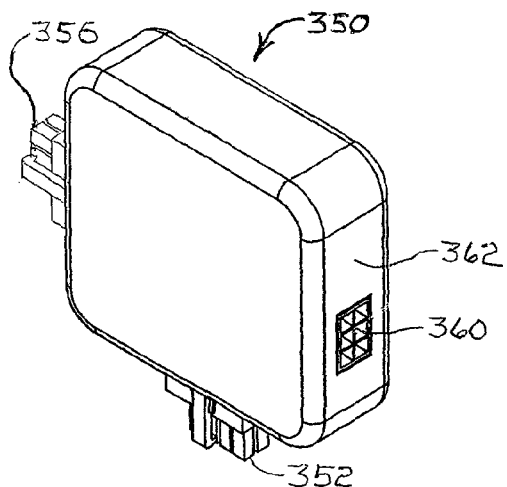
FIG. 39 is an isometric view of an example source power junction box.
Figure 40:
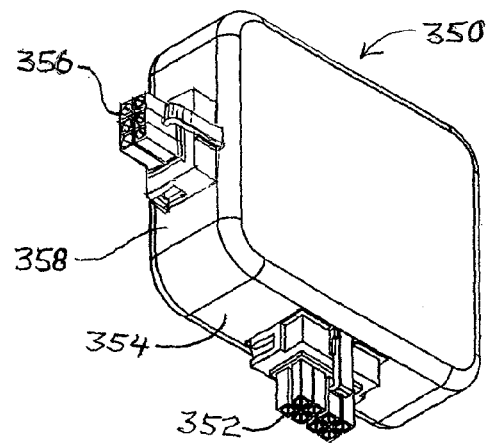
FIG. 40 is an isometric view of the example source power junction box in FIG. 39, but from a different perspective.

A trunk outlet connector 360 on a second lateral side surface 362 of the source power junction box 350 in FIGS. 39 and 40 is provided for daisy connection of one or more additional controllers 2, as shown in FIG. 42, and can be configured the same as the trunk outlet 86 of the T-type source power cable 26 (FIGS. 1-8) for substitutability with the T-type source power cable 26. Therefore, any of the following can be plugged into the trunk outlet 360 of the source power junction box 350: (i) another source power extension cable 25; (ii) a T-type source power cable 26; or (iii) a linear-type terminating source power cable 108.

Figure 41:
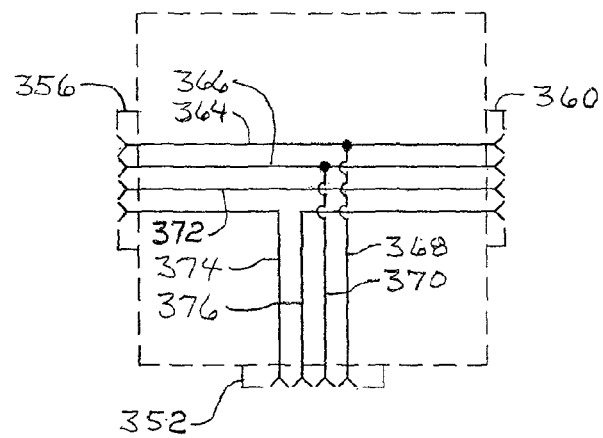
FIG. 41 is a schematic circuit diagram of the source power junction box in FIGS. 39 and 40.

An example schematic circuit diagram for the example source power junction box 350 is shown in FIG. 41. A pair of trunk source power connectors 364, 366 extends uninterrupted from the inlet connector 356 to the trunk outlet connector 360, and a pair of source power branch conductors 368, 370 extend from a parallel connection with the trunk source power conductors 364, 366 to the branch outlet connector 352. Therefore, the branch outlet connector 352 is connected electrically in parallel to the source power conductors in relation to the trunk outlet connector 360.

The branch outlet connector 352 is connected electrically in series, however, between the inlet connector 356 and the trunk outlet connector 360 with respect to the signal circuit conductors in the source power junction box 350. Therefore, as shown in FIG. 41, one of the signal circuit conductors, e.g., the trunk signal circuit conductor 372, extends straight through the junction box 350 from the inlet connector 356 to the trunk outlet connector 360. The other signal circuit conductor comprises an inlet branch signal circuit conductor 374 extending from the inlet connector 356 to the branch outlet connector 352 and an outlet branch signal circuit conductor 376 extending from the branch outlet connector 352 to the trunk outlet connector 360.

Therefore, while a plurality of controllers 20 can be daisy chain connected electrically in parallel via the power source junction box 350 to the AC power source 13 (FIG. 27), as shown in FIG. 42, they will be connected electrically in series via the power source junction box 350 to the signal circuit 23 (FIG. 27) in the same manner as described above for the T-type power source cables 26. Of course, any number of source power junction boxes 350 can be daisy chain connected together, with source power extension cables 25, as shown in FIG. 42, for any number of controllers 20.

Figure 43:
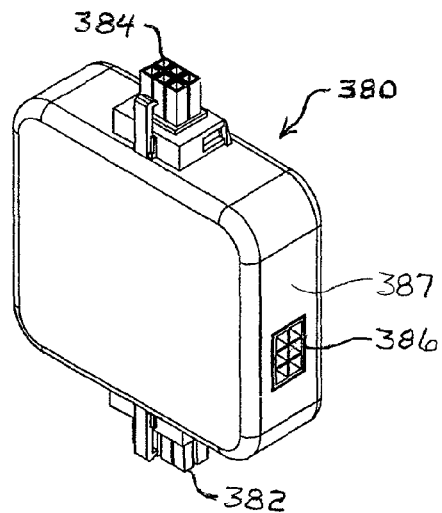
FIG. 43 is an isometric view of another example variation of a source power junction box with multiple trunk outlet connectors.
Figure 44:
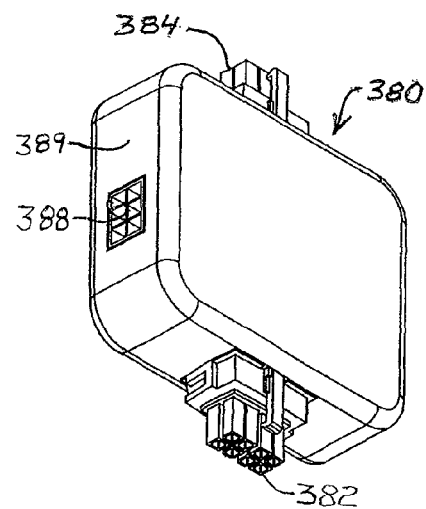
FIG. 44 is an isometric view of the source power junction box in FIG. 43, but from a different perspective.

Another example power source junction box 380 illustrated in FIGS. 43 and 44 has more than one trunk outlet. For example, but not for limitation, in addition to the inlet connector 384 and the branch outlet connector 382, which are substantially the same as the inlet connector 354 and branch outlet connector 352 described above for the junction box 350, the power source junction box 380 is shown in FIGS. 43 and 44 with two trunk outlet connectors 386, 388 in respective opposite sides 387, 389. Both of the outlet connectors 386, 388 are configured the same for daisy chain connectivity to additional power source extension cables 25, T-type source power connectors 26, and linear-type terminating source power cables 108 so that two separate daisy chain connected sets of controllers (not shown) can be connected to the AC power source 13 and to the signal circuit 23 via the source power junction box 380.

Figure 45:
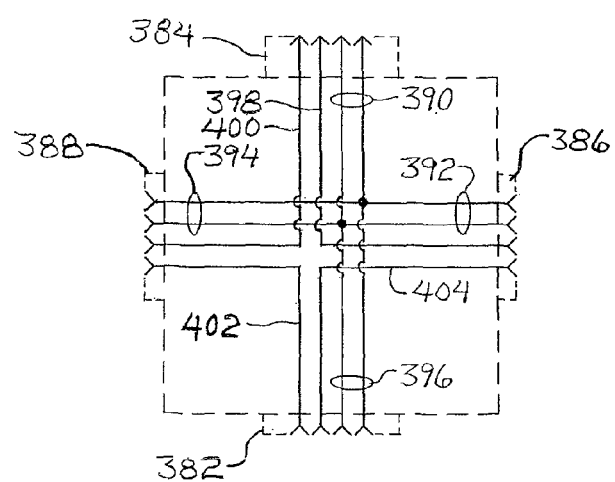
FIG. 45 is a schematic circuit diagram of the source power junction box of FIGS. 43 and 44.

As shown in the example schematic circuit diagram in FIG. 45 for the example power source junction box 380, the trunk source power conductor pairs 390, 392, 394 and the branch source power conductor pair 396 connect both of the trunk outlet connectors 386, 388 and the branch outlet connector 382 electrically in parallel to the inlet connector 384. The signal circuit conductors 398, 400, 402, 403, however, connect the trunk outlet connectors 386, 388 and the branch outlet connector 382 electrically in series to the inlet connector 384.

Of course, more than two trunk outlet connectors can be provided in the source power junction box 380, if desired, with substantially the same kinds of parallel source power and series signal circuit conductor connections as described above for each additional trunk outlet connector. Also, if desired, the branch outlet connector 382 could be eliminated so that the junction box 380 would then function only to connect a plurality of daisy chain connected series of controllers (not shown) to an AC power source 15 and to a signal circuit 23, but it would not be connectable directly to a controller inlet connector 140 without an intervening T-type source power cable 26, an intervening linear-type terminating source power cable 108, or a source power extension cable 25 (if the inlet connector 140 is configured for connection of a source power extension cable 25 as discussed above).

Figure 46:
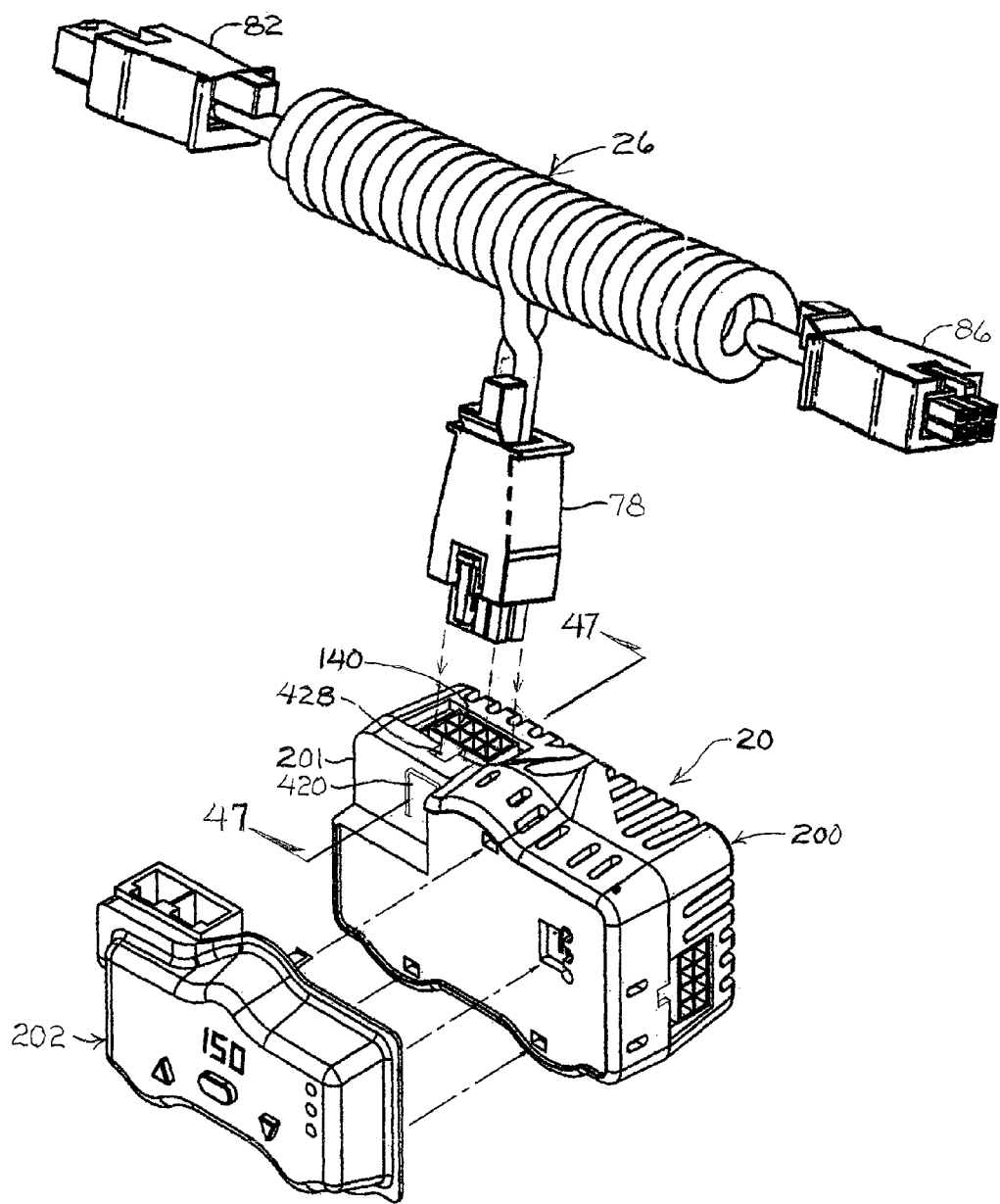
FIG. 46 is an isometric view of the controller base module and the expansion module with the branch outlet connector of a T-type source power cable poised for insertion into the inlet connector of the controller to illustrate a connector retainer feature comprising a resilient spring biasing tab.
Figure 47:
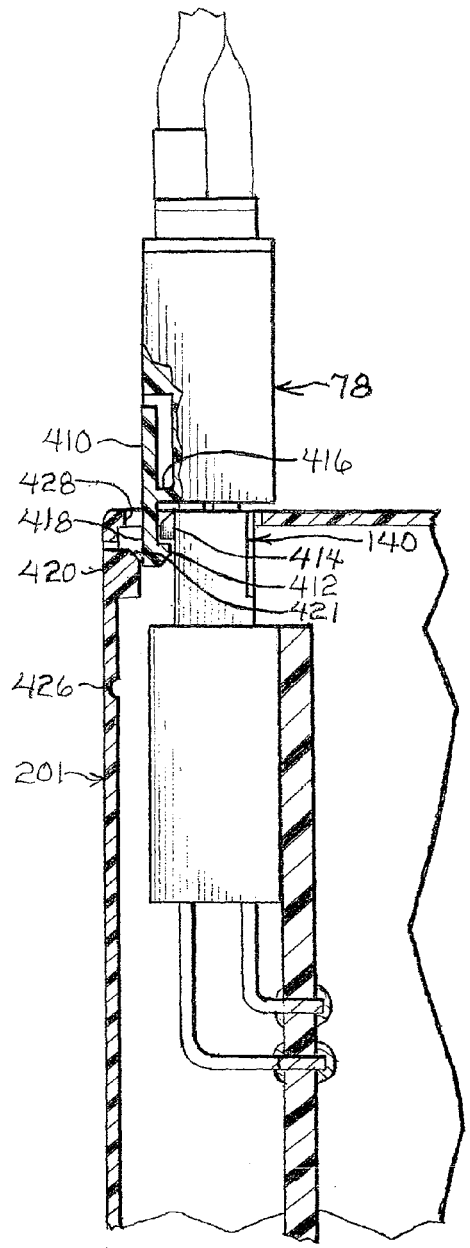
FIG. 47 is a cross sectional view of the latch and resilient spring biasing tab for the branch outlet connector and controller inlet connector with the branch outlet connector plugged into the controller inlet connector.
Figure 48:
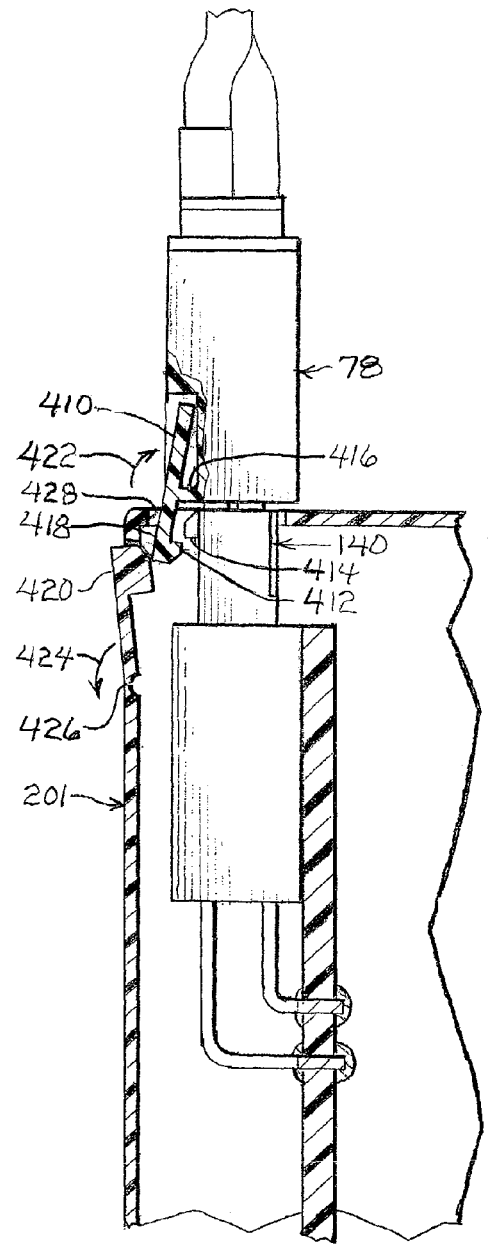
FIG. 48 is a cross-sectional view similar to FIG. 47, but showing the latch lever pivoted against the bias force of the resilient spring biasing tab for release of the latch.

A conventional connector latch feature on some commercially available connectors, such as Molex™ connectors include a latch lever, such as the latch lever 410 shown on the male connector 78 in FIG. 46, with a dog 412 on its distal end that is sized and shaped to engage a latch protrusion on the female connector, such as the protrusion 414 shown on the controller inlet connector 140 in FIG. 47. Such engagement of the latch protrusion 414 by the dog 42 on the latch lever 410 is intended to secure the male connector to the female connector until it is disengaged by pivoting the latch lever 410 on an elastic hinge 416, as shown in FIG. 48, which releases the male connector from the female connector and allows them to be disconnected or unplugged from each other. However, in some applications, such conventional latches are not secure enough, and it is too easy for the connectors to be unplugged unintentionally, for example, by bumping or rubbing past them in tight spaces, and the like.

Therefore, to provide further security and resistance to unintentional disconnection of the connectors, for example, of the connectors 78, 140 shown in FIGS. 46-48, a cantilevered resilient spring biasing tab 420 is positioned adjacent the distal end 418 of the latch lever 410. The biasing tab 420 bears against the distal end 418 of the latch lever 410 and has a resilient spring bias force that resists movement of the latch lever 410 in a manner that would disengage the dog 412 from the latch protrusion 414. However, when a user forces the latch lever 410 to pivot about the elastic hinge 416, which also acts as a fulcrum for the latch lever 410, as indicated by pivot arrow 422, the distal end 418 of the latch lever 410 pushes outwardly against the spring bias force of the biasing tab 420 and forces the biasing tab 420 to pivot outwardly, as indicated by pivot arrow 424 in FIG. 48. The elastic resilient spring bias of the tab 420 does yield under enough force to allow the dog 412 on the latch lever 410 to disengage from the latch protrusion 414 so that the branch outlet connector 78 can be unplugged from the controller inlet connector 140.

There are myriad ways to provide a spring biasing force to bear on the latch protrusion 414. One example implementation of this feature is to mold the biasing tab 420 as cantilevered part of the housing 201 of the base unit 200, as illustrated in FIGS. 46-48. Depending on how much bias force or how yieldable a particular application requires for the tab 420, a portion of the housing 201 at the cantilevered joint of the tab 420 to the rest of the housing 201 can be thinner to function as a resilient elastic hinge 426, as shown in FIGS. 47 and 48. A slot 428 can be provided in the housing to accommodate movement of the latch lever 410 into and out of the housing 201. A tapered cam surface 421 can be provided on the tab 420 to facilitate camming the tab 420 out of the way when the latch lever 410 is being inserted into the housing 201 as the outlet connector 78 is plugged into the inlet connector 140.

Figure 49:
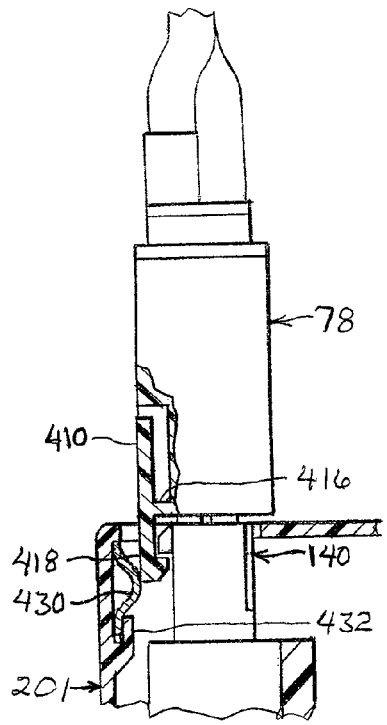
FIG. 49 is a cross-sectional view similar to FIG. 47, but showing a leaf spring for providing the securing bias force.
Figure 50:
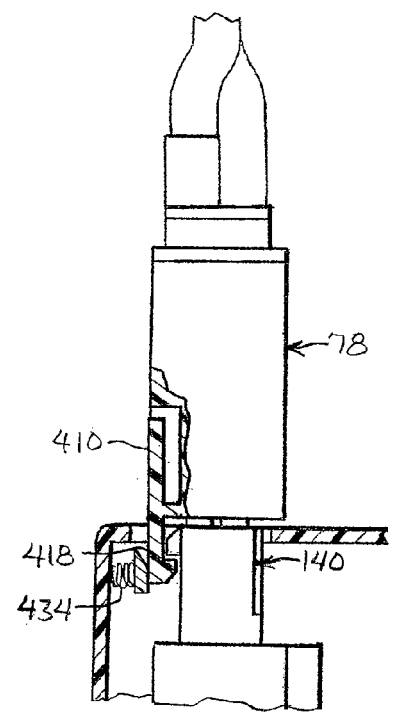
FIG. 50 is a cross-sectional view similar to FIG. 47, but showing a coiled compression spring for providing the securing bias force.
Figure 51:
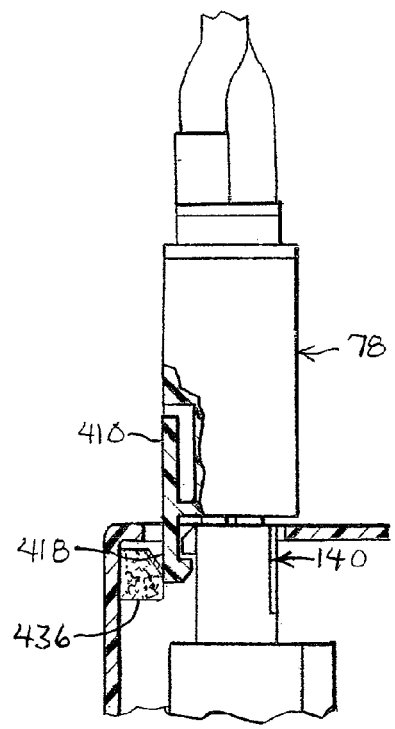
FIG. 51 is a cross-sectional view similar to FIG. 47, but showing a resilient compressible material for providing the security bias force.

As mentioned above, this bias force feature can also be implemented in other ways. Several examples are shown in FIGS. 49-51. In FIG. 49, the biasing force is provided by a compressible leaf spring 430 mounted in a bracket 432 on the inside of the housing 201. In FIG. 50, a coil compression spring 434 provides the bias force, and, in FIG. 51, an elastically compressible material 436, such as rubber, silicon rubber, a foamed elastomer, or other foamed material is shown to provide the bias force against the distal end 418 of the lever 410.

While the biasing tab 420 has been described above in relation to the branch outlet connector 78 and the controller inlet connector 140, it is also applicable to the controller outlet connector 142 and whatever interfacing inlet connector is plugged into the controller outlet connector, e.g., the heater inlet connector 64, slave adapter inlet connector 130, slave junction box inlet connector 330, etc., as described above. It can also be used in relation to the slave junction box outlet 322, as indicated by tab 420' in FIGS. 35 and 36.

Since these and numerous other modifications and combinations of the above-described method and embodiments will readily occur to those skilled in the art, it is not desired to limit the invention to any of the exact construction and process shown and described above. While a number of example aspects and embodiments have been discussed above, those of skill in the art will recognize certain modifications, permutations, additions, and sub-combinations thereof. It is therefore intended that the following appended claims and claims hereafter introduced are interpreted to include all such modifications, permutations, additions, and sub-combinations as are within their true spirit and scope. The words "comprise," "comprises," "comprising," "has," "have," "having," "include," "including," and "includes" when used in this specification and in the following claims are intended to specify the presence of stated features or steps, but they do not preclude the presence or addition of one or more other features, steps, or groups thereof.

The embodiments of the invention in which an exclusive property or privilege is claimed are defined as follows:

1. Heater control apparatus for controlling power to a heater that has an AC powered heating element which produces heat when connected to an AC power source, said heater control apparatus comprising:
   A. A first temperature sensor and a second temperature sensor positioned in close enough proximity to the heating element to sense heat produced by the heating element;
   B. A heater controller comprising:
      (i) an AC power circuit extending between an inlet connector in the heater controller and an outlet connector in the heater controller, wherein said inlet connector is connectable electrically to an AC power source and said outlet connector is connectable electrically to the heating element to provide AC power to the heating element via the AC power circuit;
      (ii) a high-limit power switch in the AC power circuit between the inlet connector and the outlet connector of the heater controller that is capable of opening and closing the AC power circuit;
      (iii) a high-limit control circuit that is connected to the high-limit power switch in a manner that causes the high-limit power switch to open the AC power circuit in response to a temperature sensed by the first temperature sensor exceeding a high-limit temperature parameter and that causes the high-limit power switch to close in response to the temperature sensed by the first temperature sensor not exceeding the high-limit temperature parameter and a power sequence condition;
      (iv) a controllable process power switch in the AC power circuit between the inlet connector and the outlet connector of the heater controller that is capable of opening and closing the AC power circuit to control the AC power provided at said outlet; and
      (v) a process control circuit that is connected to the process power switch in a manner that causes the process power switch to open and close the AC power circuit in response to comparison of the temperature sensed by the second temperature sensor with a preset desired set point temperature.

2. The heater control apparatus of claim 1, wherein the controllable power process switch is positioned in series electrically with the high-limit power switch.

3. The heater control apparatus of claim 2, wherein the controllable power process switch is positioned electrically in series between the high-limit switch and the outlet of the heater controller.

4. The heater control apparatus of claim 1, wherein the power sequence condition includes opening a drain circuit that, when closed, prevents the high-limit power switch from closing.

5. The heater controller apparatus of claim 1, wherein the power sequence condition includes a sequence comprising power to the process control circuit being terminated and then reestablished.

6. The heater controller apparatus of claim 5, wherein the high-limit control circuit is programmed to cause the high-limit power switch to open and thereby turn off AC power to the outlet connector if the temperature sensed by the first temperature sensor is higher than the high-limit temperature parameter.

7. The heater control apparatus of claim 6, wherein the high-limit control circuit is programmed to cause the high-limit power switch to close if the temperature sensed by the first temperature sensor is not higher than the high-limit temperature parameter and the power sequence condition has occurred.

8. The heater control apparatus of claim 1, wherein the process control circuit is programmed to cause the process power switch to open the AC power circuit if the temperature sensed by the second temperature sensor exceeds a preset hysteresis upper value in relation to a preset desired set point temperature and to close the AC power circuit if the temperature sensed by the second temperature sensor is below the preset hysteresis lower value in relation to the preset desired set point temperature.

9. The heater control apparatus of claim 7, wherein the heater controller also has a DC power supply connected electrically to the AC power circuit between the inlet connector of the heater controller and the high-limit power switch for converting AC power to DC power and providing the DC power to the high-limit control circuit, and wherein the power sequence condition includes the DC power to the high-limit control circuit being terminated and then reestablished.

10. The heater control apparatus of claim 1, wherein the high-limit power switch comprises a mechanical relay switch that opens and closes in response to signal input from the high-limit control circuit.

11. The heater control apparatus of claim 1, wherein the process power switch comprises a solid state power switch that turns off and on to open and close the AC power circuit in response to signal input from the process control circuit.

12. The heater control apparatus of claim 11, wherein the solid state power switch includes a triac.

13. The heater control apparatus of claim 1, including:
   (i) a temperature range signal circuit in the heater controller connected to the inlet connector for connection to a remote temperature range signal circuit; and
   (ii) a temperature range signal switch in the heater controller that opens and closes the temperature range signal circuit in response to temperature range signal input from the process control circuit.

14. The heater control apparatus of claim 13, wherein the process control circuit is programmed to compare the temperature sensed by the second temperature sensor to a preset desired operating temperature range and to generate the temperature range signal input to the temperature range signal switch to cause the temperature range signal switch to open the temperature range signal switch if the temperature sensed by the second temperature sensor is not within the preset desired operating temperature range and to close the temperature range signal switch if the temperature sensed by the second temperature sensor is within the preset desired operating temperature range.

15. The heater control apparatus of claim 1, wherein:
   (i) the high-limit control circuit is capable of being programmed with the high-limit temperature parameter and of receiving program signals for adjusting the high-limit temperature parameter; and
   (ii) the process control circuit is capable of being programmed with the desired set point temperature and the hysteresis and of receiving program signals for adjusting the set point temperature and the hysteresis.

16. The heater control apparatus of claim 15, including a base control module housing that contains the AC power circuit, the high-limit switch, the high-limit control circuit, the process power switch, the process control circuit, the inlet connector, and the outlet connector.

17. The heater control apparatus of claim 16, including an expansion module housing that contains a tactile data input interface connected electronically to an adjust/display microprocessor for inputting adjustment data for adjusting the high-limit temperature parameter, the desired set point temperature, the hysteresis, and the desired operating temperature range to the adjust/display microprocessor, a visual alpha-numeric display connected electronically to the adjust/display microprocessor for receiving electronic data signals from the adjust/display microprocessor for visual display, and an electronic data port with contacts for interfacing the adjust/display microprocessor electronically to the base module, and wherein the expansion module housing is physically attachable to the base module housing in a detachable manner with the contacts of the electronic data port of the expansion module in mating alignment with complementary contacts of a corresponding electronic data port on the base module housing, said adjust/display microprocessor being programmed to process input data signals from the tactile data input interface for delivery of queries and adjustments to the high-limit control circuit and to the process control circuit and for receiving and processing data from the high-limit control circuit and from the process control circuit for display, whereby attachment of the expansion module housing to the base module housing enables user input of adjustments of the preset high-limit temperature parameter, set point temperature, hysteresis, and desired operating temperature range as well as display of the preset high-limit temperature parameter, set point temperature, hysteresis, and desired operating temperature range.

18. The heater control apparatus of claim 17, wherein the expansion module also includes a communications port for receiving adjustment data from an external data generating device for adjusting the high-temperature parameter and the operating temperature set point, and a communications microprocessor with electronic connections to the communications port and to the adjust/display microprocessor, said communications microprocessor being programmed for feeding the received data to the adjust/display microprocessor, which is programmed for processing and sending the received data to the high-limit control circuit and the process control circuit.

19. The heater control apparatus of claim 18, wherein the communications microprocessor is also programmed for receiving and processing data from the high-limit temperature parameter data and the operating temperature set point, which are processed by the adjust/display microprocessor for transmission via the communications port to an external display.

20. The heater control apparatus of claim 17, wherein the process control circuit is also programmed to compare the temperature sensed by the second temperature sensor to a preset desired temperature operating range and to generate one or more of a plurality of status signals that indicate:
  (i) that the process control circuit has the AC power circuit turned on, i.e., in "output" mode;
  (ii) that the temperature sensed by the second temperature sensor is within the desired operating temperature range, i.e., "in range"; and
  (iii) that the temperature sensed by the second temperature sensor is not within the desired operating temperature range, i.e., "alert/alarm".

21. The heater control apparatus of claim 20, including a LED display in the base module that comprises a plurality of LEDs, individual ones of which light in response to respective ones of the status signals.

22. The heater control apparatus of claim 21, wherein the expansion module housing includes a front panel, a rear panel, and a plurality of light conductors that extend from the back panel to the front panel and that align with respective ones of the LEDs when the expansion module is attached onto the base module so that the light conductors conduct light from respective ones of the LEDs to the front panel of the expansion module for visual displays of the "output", "in range", and "alert/alarm" status.

23. A method of providing a high-limit thermal safety shutdown for a heater that is powered by AC power via an AC power circuit, comprising:
  positioning a high-limit switch in the AC power circuit that is capable of turning the AC power to the heater on and off; and
  controlling the high-limit switch with a high-limit control circuit that is powered by low voltage DC power from a DC power source and that is programmed to (i) compare a temperature sensed by a temperature sensor that is positioned in close enough proximity to the heater to sense heat produced by the heater to a preset high temperature limit parameter, (ii) cause the high-limit switch to turn off the AC power to the heater if the temperature sensed by the temperature sensor exceeds the preset high temperature limit, and (iii) cause the high-limit switch to turn on the AC power to the heater if the low voltage DC power to the high-limit control circuit has been stopped and then started again and if the temperature sensed by the temperature sensor does not exceed the preset temperature limit.

24. A method of providing a high-limit thermal safety shutdown for a heater that is powered by AC power via an AC power circuit, comprising:
  positioning a high-limit switch in the AC power circuit that is capable of turning the AC power to the heater on and off, said high-limit switch including a normally open relay switch that is powered by a coil to close and thereby to turn the AC power on and that opens when the coil is not powered; and
  positioning a PTC thermistor in the heater, directing electric current to flow through the PTC thermistor in series with a coil power circuit so that the coil is powered from current that flows through the PTC thermistor, providing a drain circuit that closes when current stops flowing through the PTC thermistor and that remains closed to drain current away from the coil when current starts flowing again through the PTC resistor.

25. High-limit thermal safety shutdown apparatus for a heater that is powered by AC power via an AC power circuit, comprising:
  a high-limit switch in the AC power circuit that is capable of turning the AC power to the heater on and off; and
  a high-limit control circuit that is powered by low voltage DC power from a DC power source and that is programmed to (i) compare a temperature sensed by a temperature sensor that is positioned in close enough proximity to the heater to sense heat produced by the heater to a preset high temperature limit parameter, (ii) cause the high-limit switch to turn off the AC power to the heater if the temperature sensed by the temperature sensor exceeds the preset high temperature limit, and (iii) cause the high-limit switch to turn on the AC power to the heater if the low voltage DC power to the high-limit control circuit has been stopped and then started again and if the temperature sensed by the temperature sensor does not exceed the preset temperature limit.

26. High-limit thermal safety shutdown apparatus for a heater that is powered by AC power via an AC power circuit, comprising:
  a high-limit switch in the AC power circuit that is capable of turning the AC power to the heater on and off, said high-limit switch including a normally open relay switch that is powered by a coil to close and thereby to turn the AC power on and that opens when the coil is not powered;

a PTC thermistor positioned in the heater and connected electrically in series with the coil by a PCT thermistor circuit;

a closable and openable drain circuit connected to the PTC thermistor circuit electrically in parallel with the coil in a manner that drains current away from the coil in a closed mode, said drain circuit including a drain circuit control that closes the drain circuit automatically in response to a no current condition in the PTC thermistor circuit and that opens the drain circuit in response to a manual input.

* * * * *